US007224650B2

(12) United States Patent
Hino et al.

(10) Patent No.: US 7,224,650 B2
(45) Date of Patent: May 29, 2007

(54) RECORDING MEDIUM, ITS CONTROLLER AND CONTROLLING METHOD

(75) Inventors: Yasumori Hino, Ikoma (JP); Toshio Matsumoto, Kyoto (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 131 days.

(21) Appl. No.: 10/415,755

(22) PCT Filed: Nov. 2, 2001

(86) PCT No.: PCT/JP01/09652

§ 371 (c)(1), (2), (4) Date: May 1, 2003

(87) PCT Pub. No.: WO02/39449

PCT Pub. Date: May 16, 2002

(65) Prior Publication Data

US 2004/0013062 A1 Jan. 22, 2004

(51) Int. Cl.
*G11B 7/00* (2006.01)

(52) U.S. Cl. ................................ 369/47.14; 369/275.3

(58) Field of Classification Search ............. 369/47.14
See application file for complete search history.

(56) References Cited

U.S. PATENT DOCUMENTS 5,271,018 A 12/1993 Chan
5,844,911 A * 12/1998 Schadegg et al. ........... 714/710
5,956,196 A 9/1999 Hull et al.
6,233,654 B1 * 5/2001 Aoki et al. ................. 711/114
6,292,451 B1 * 9/2001 Minoru et al. ........... 369/59.14
6,373,800 B1 * 4/2002 Takahashi ................ 369/53.15
6,587,407 B1 * 7/2003 Nakamura et al. ....... 369/44.14
6,751,173 B1 * 6/2004 Maeda .................... 369/47.31

FOREIGN PATENT DOCUMENTS

EP 0 952 573 A2 10/1999
JP 4-92258 A 3/1992
JP 05314664 A 11/1993
JP 06290496 A 10/1994
JP 08115571 A 5/1996
JP 9-231699 A 9/1997
JP 11021885 A 1/1999
JP 11-176104 A 7/1999
JP 11329265 A 11/1999
JP 2000-3562 A 1/2000

* cited by examiner

*Primary Examiner*—Thang V. Tran
*Assistant Examiner*—Lixi Chow
(74) *Attorney, Agent, or Firm*—Akin Gump Strauss Hauer & Feld LLP

(57) ABSTRACT

A recording medium which has a high recording density and realizes a short search time is provided. The recording medium according to the present invention is a recording medium which comprises addresses indicative of positions on the recording medium and which is for recording or reproduction using sectors as data rewrite units or data read units, and starting positions of said addresses and starting positions of said sectors are different in the recording medium.

28 Claims, 25 Drawing Sheets

FIG. 1
(a)
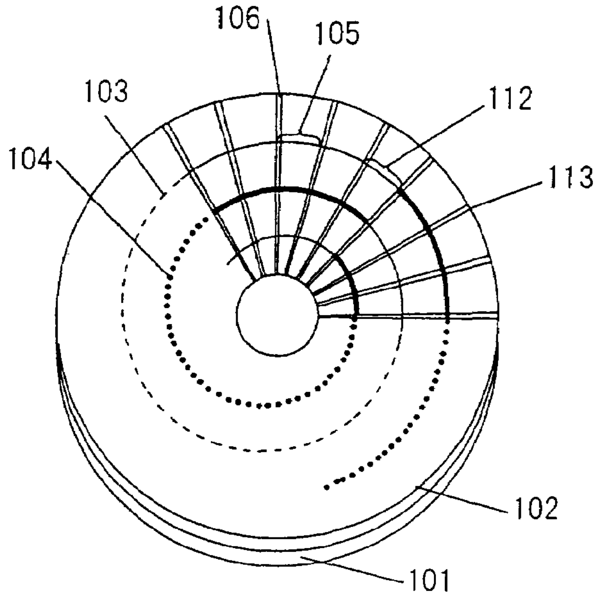
(b)
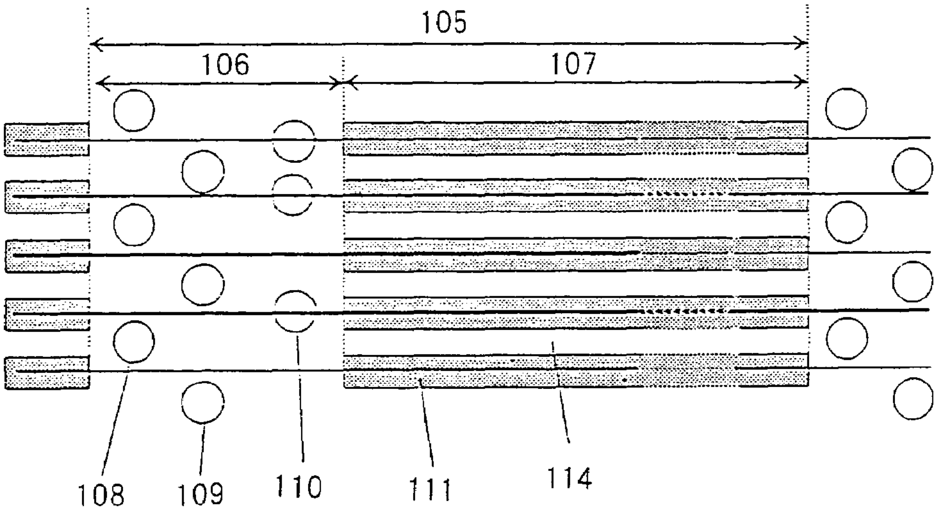
(c)
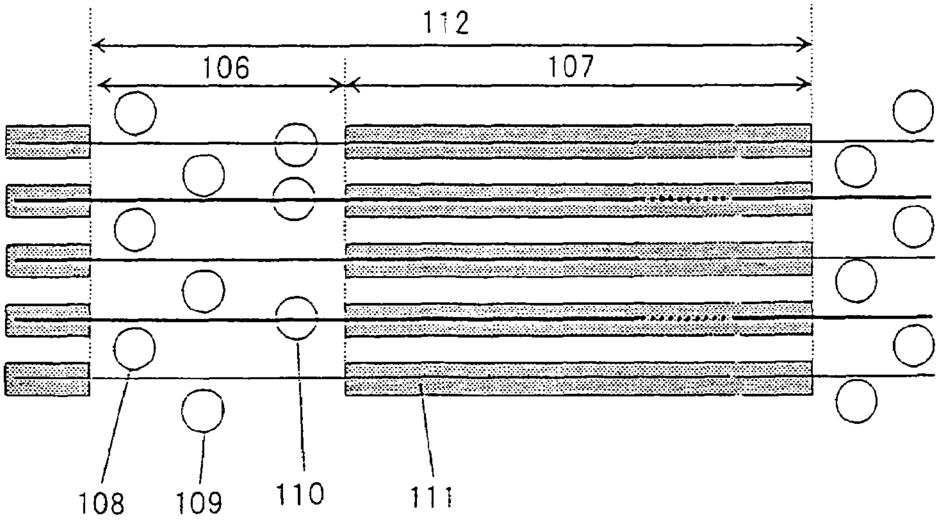

F I G. 3
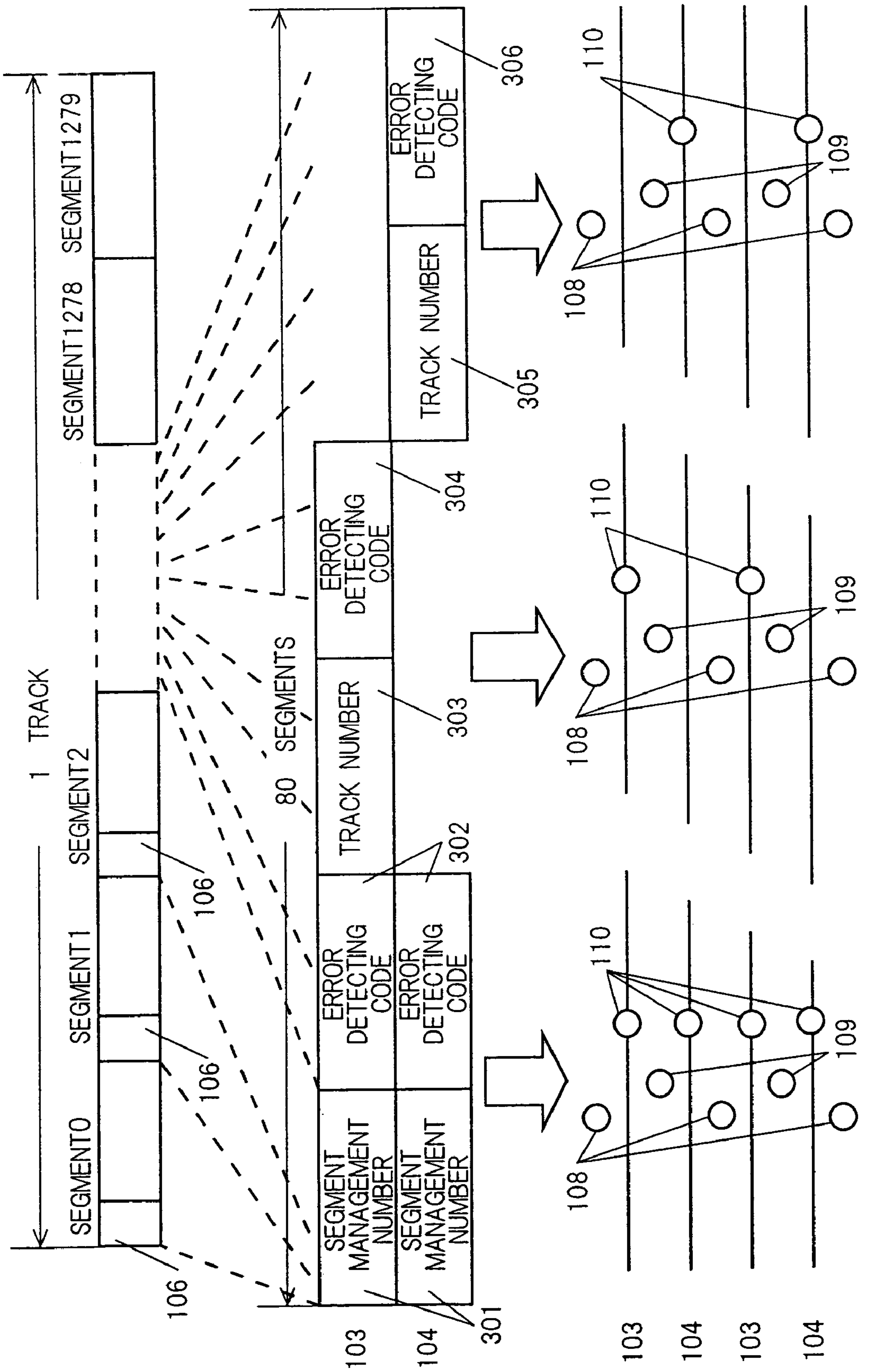

F I G. 4
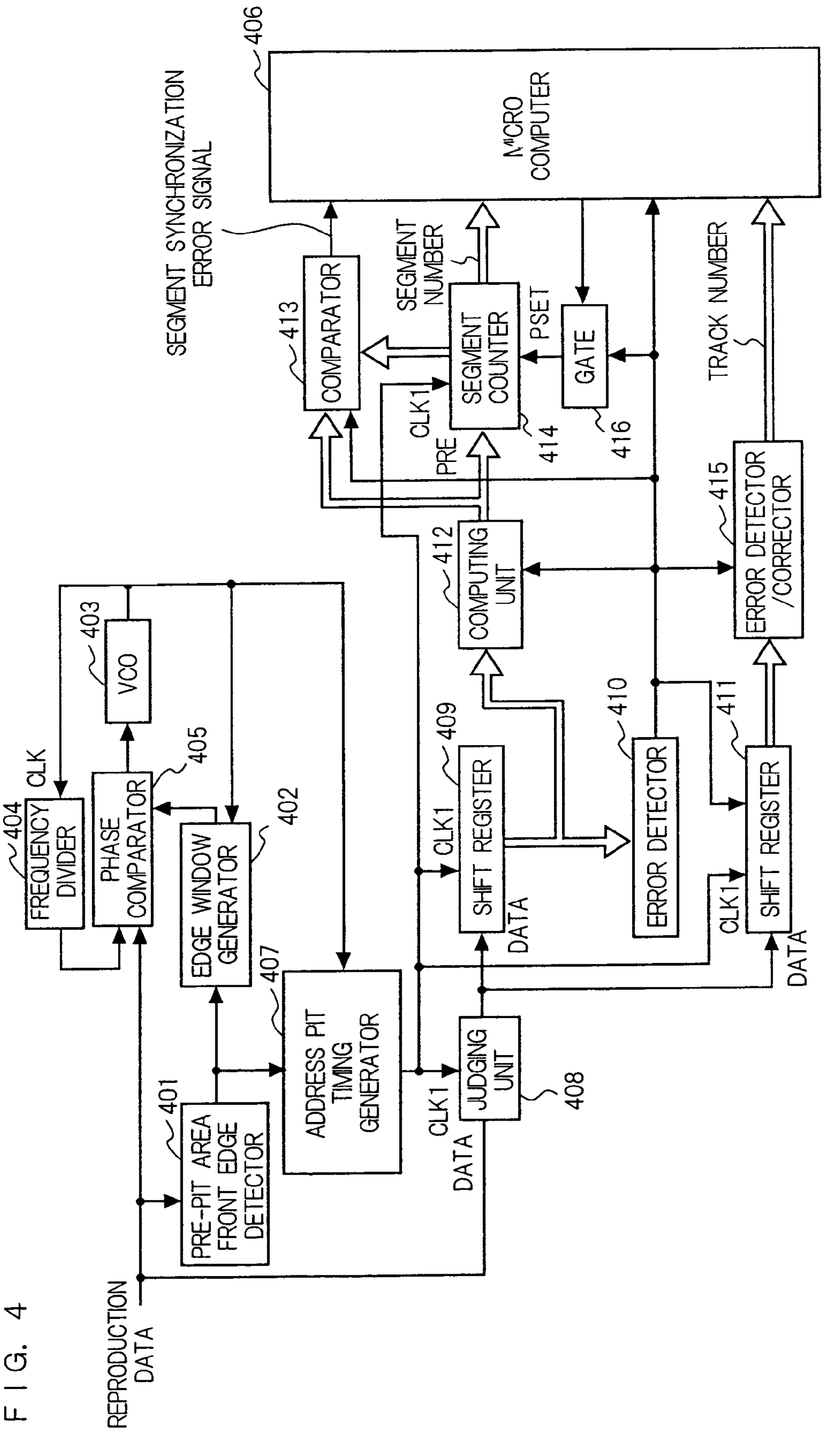

F I G. 5
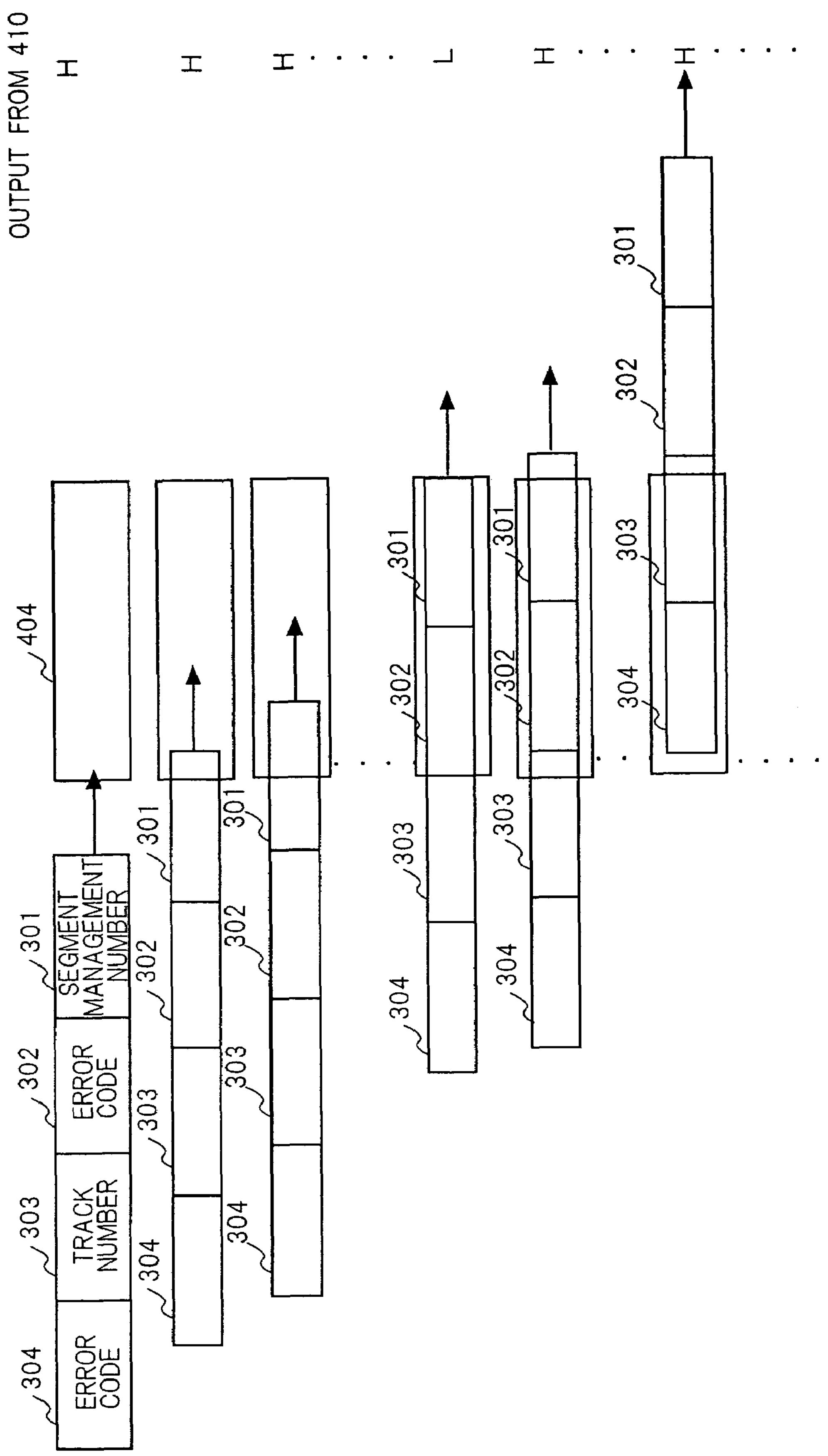

F I G. 7
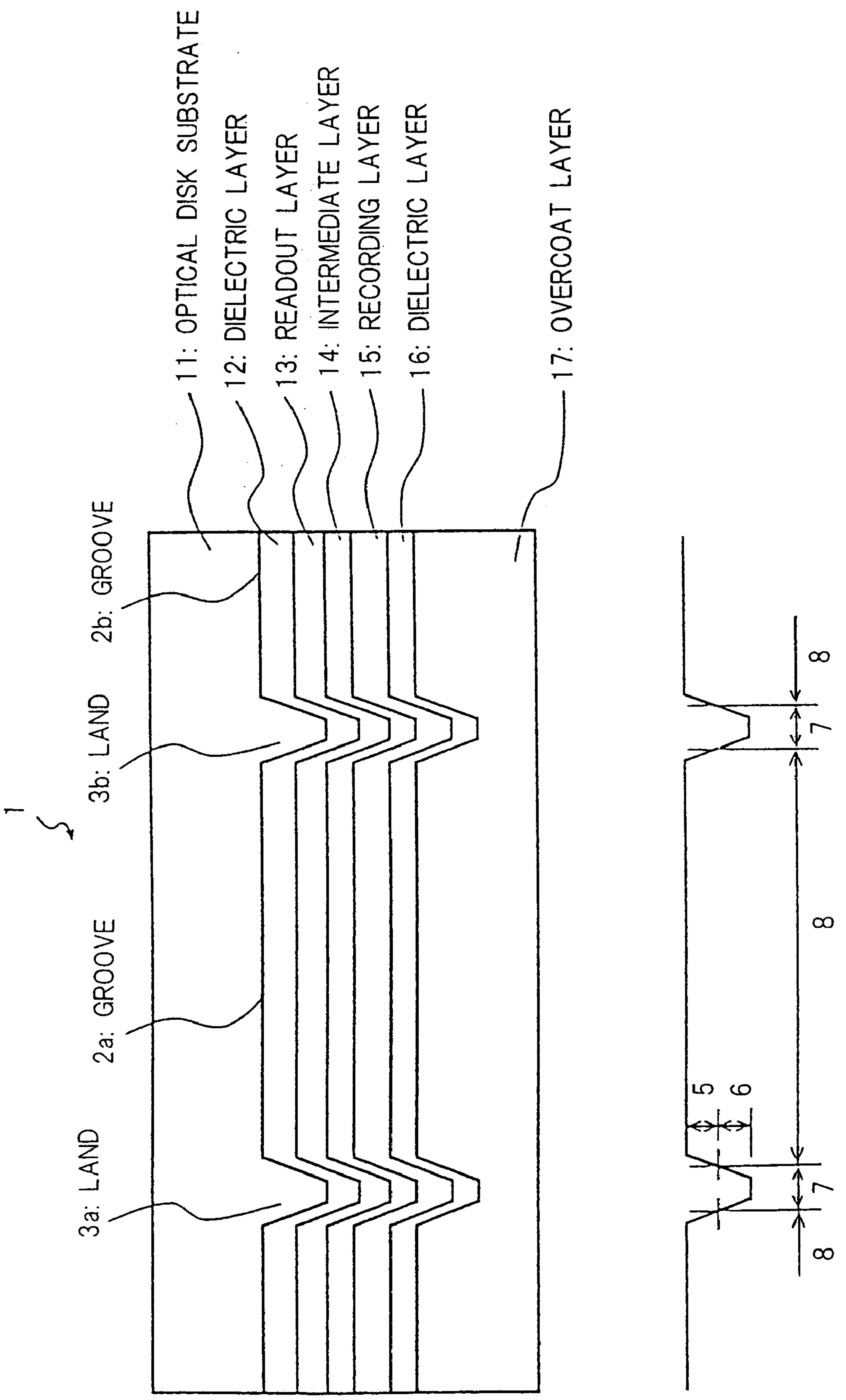

F I G. 1 0
(a)
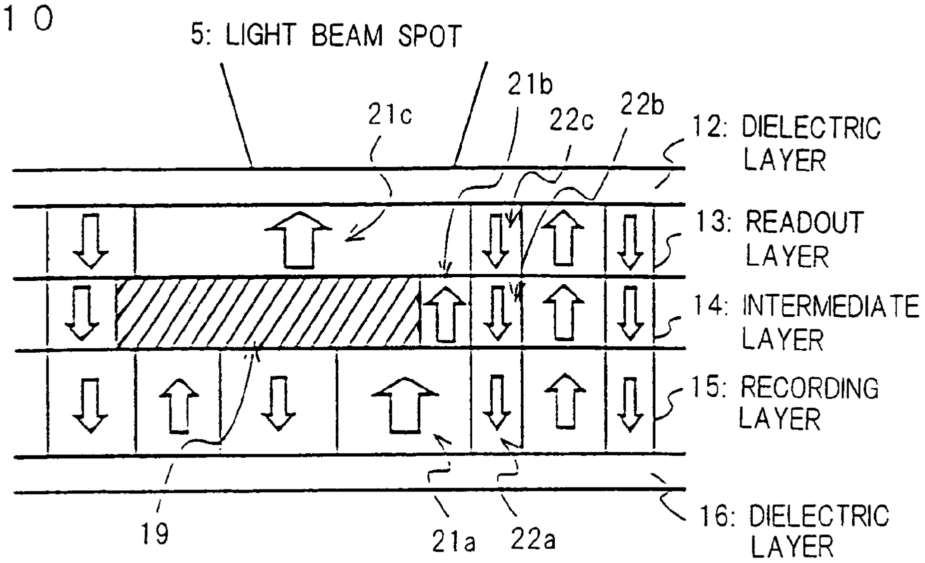
(b)
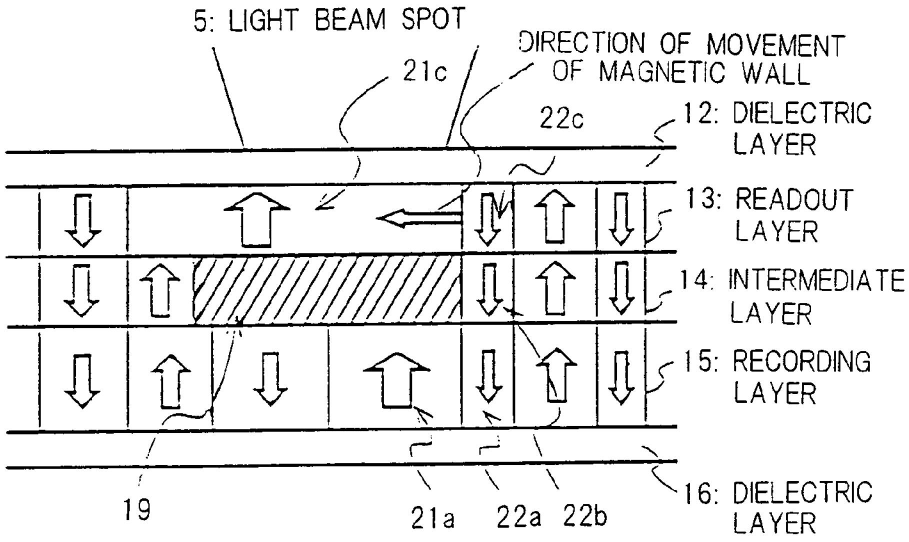
(c)
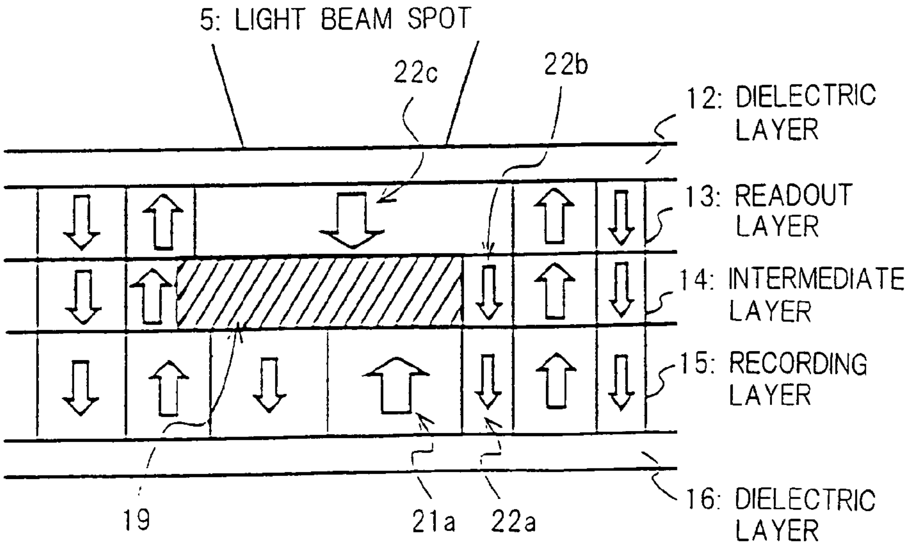

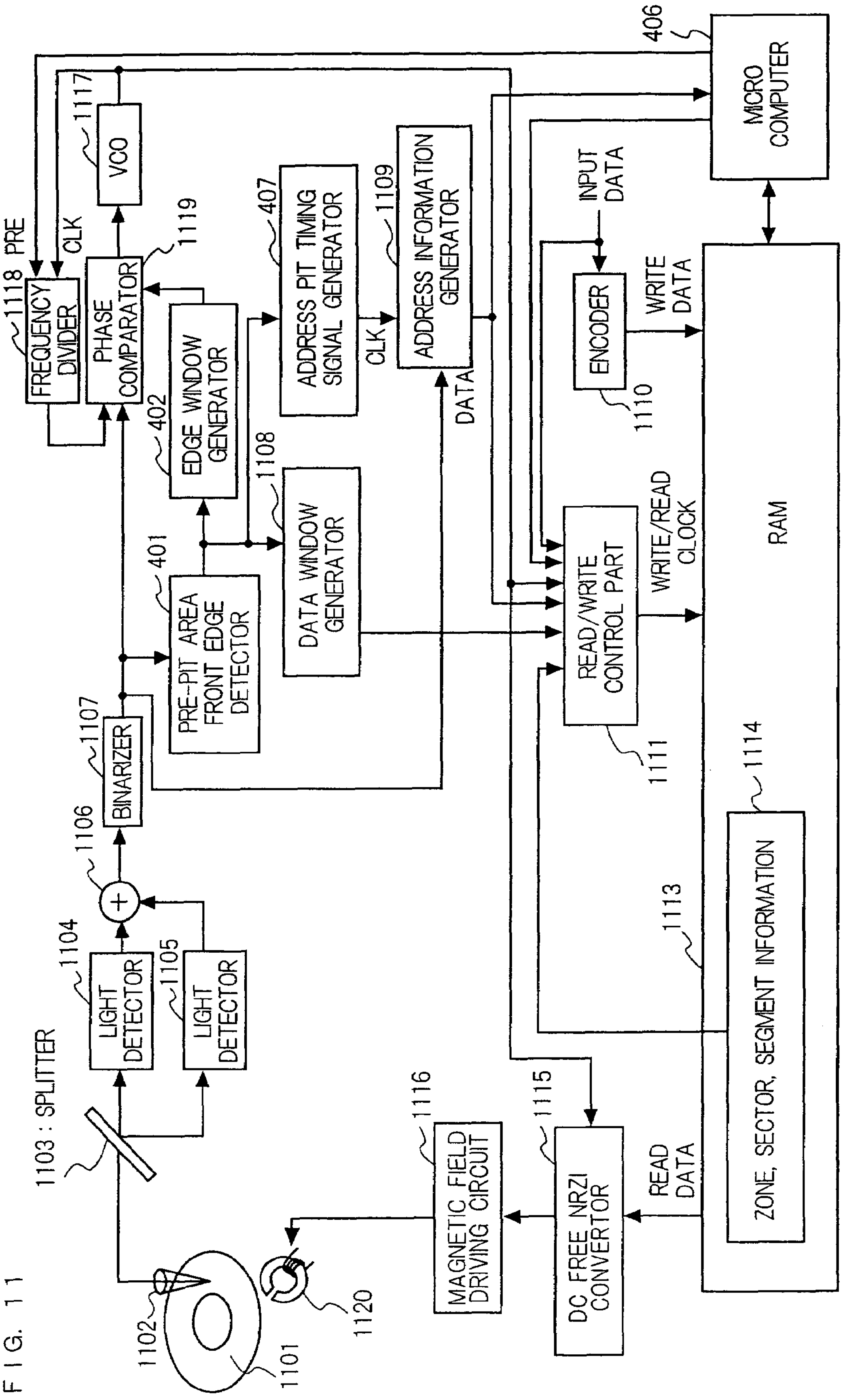
F I G. 1 1

F I G. 1 2
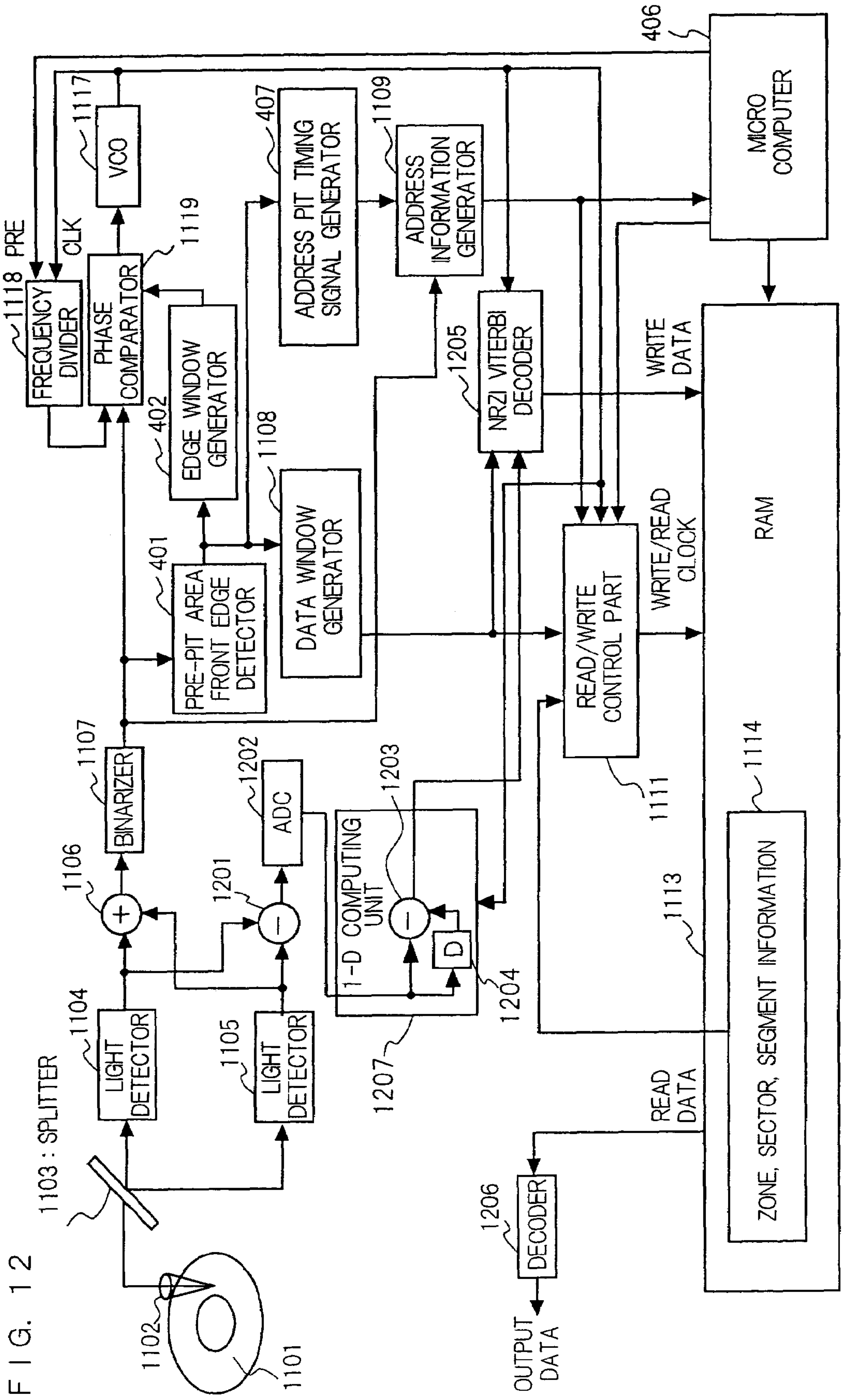

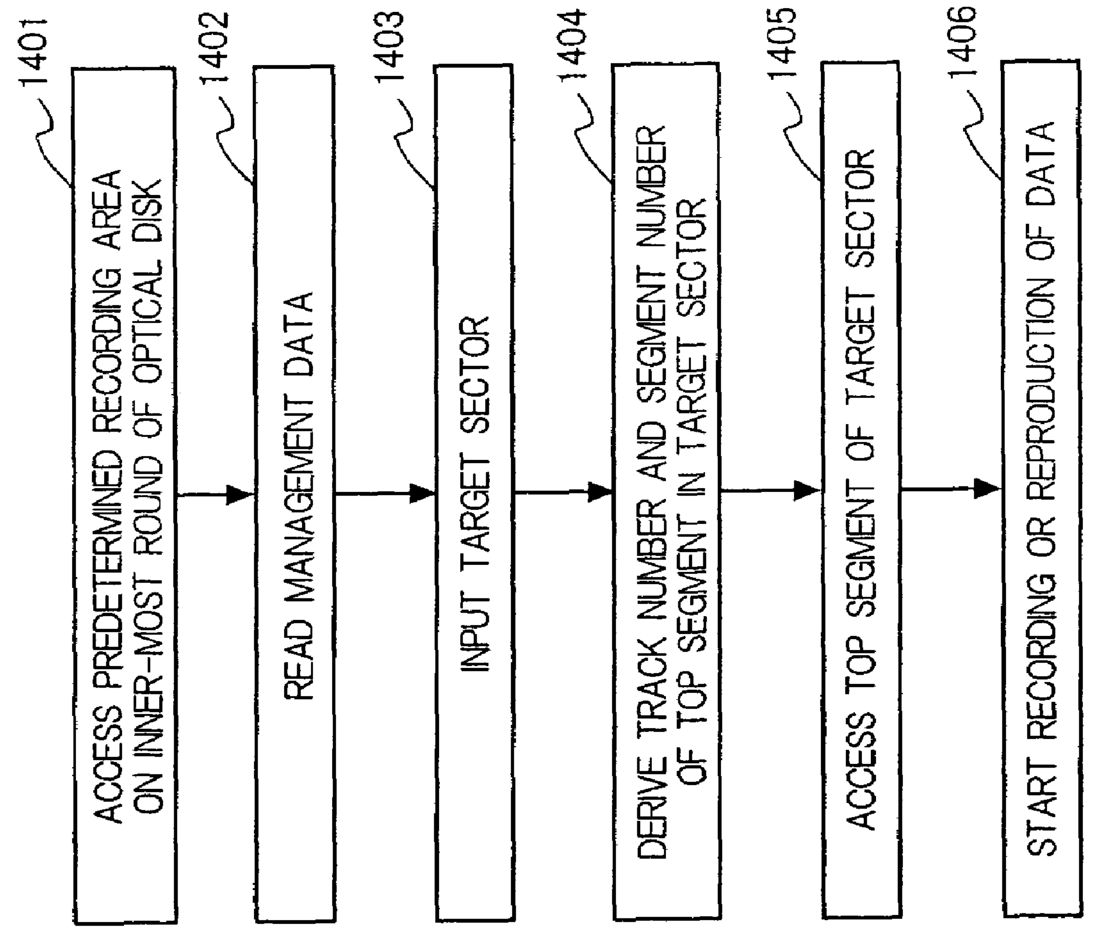
F I G. 1 4

F I G. 1 5
SECTOR
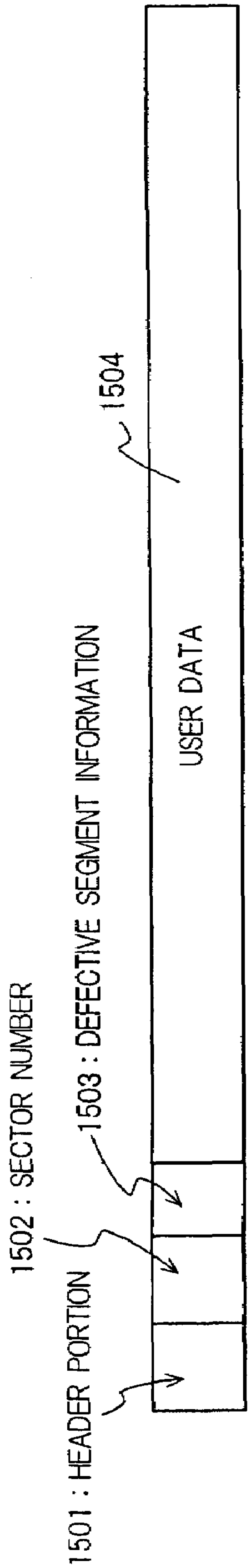

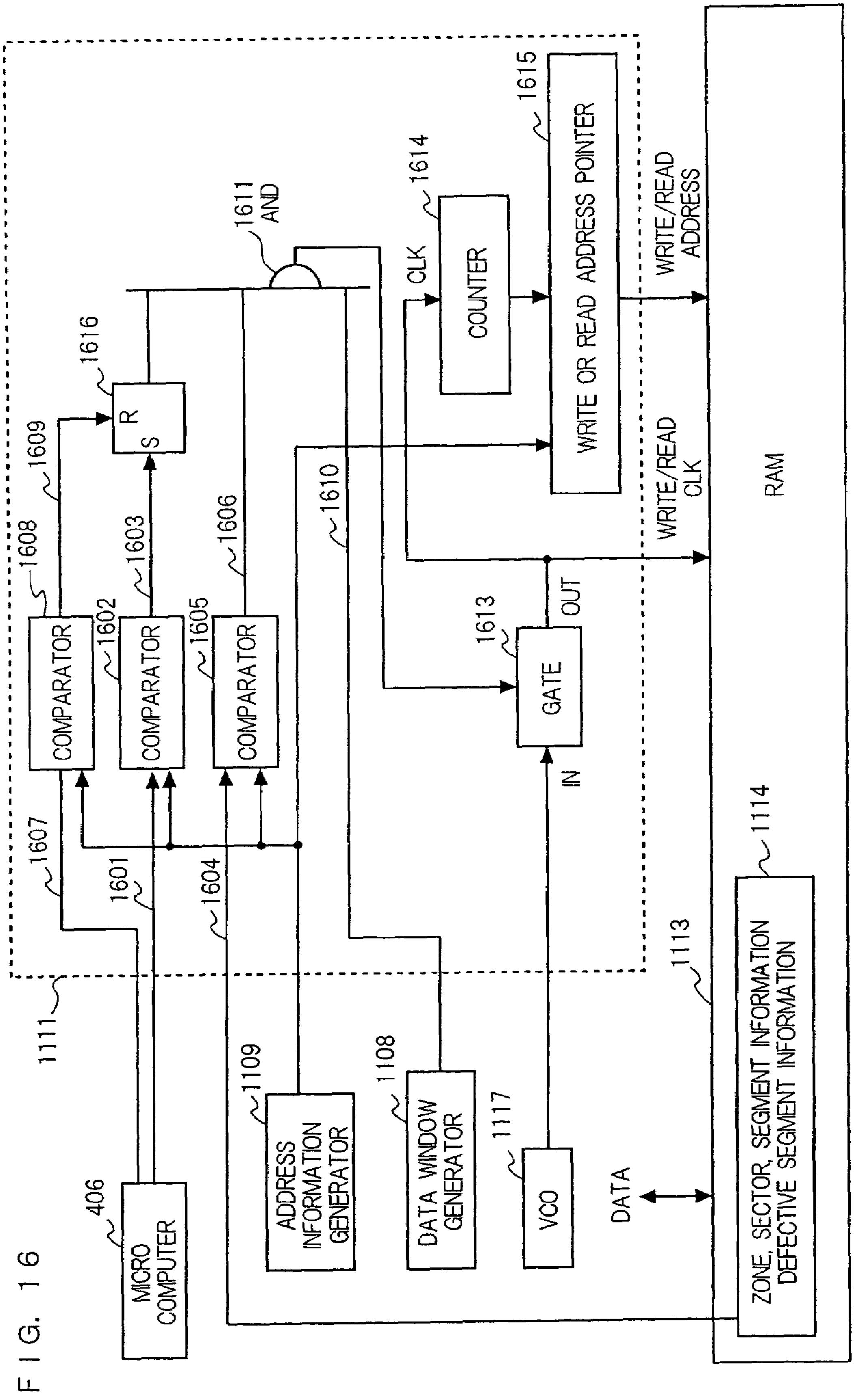
F I G. 1 6

F I G. 1 7
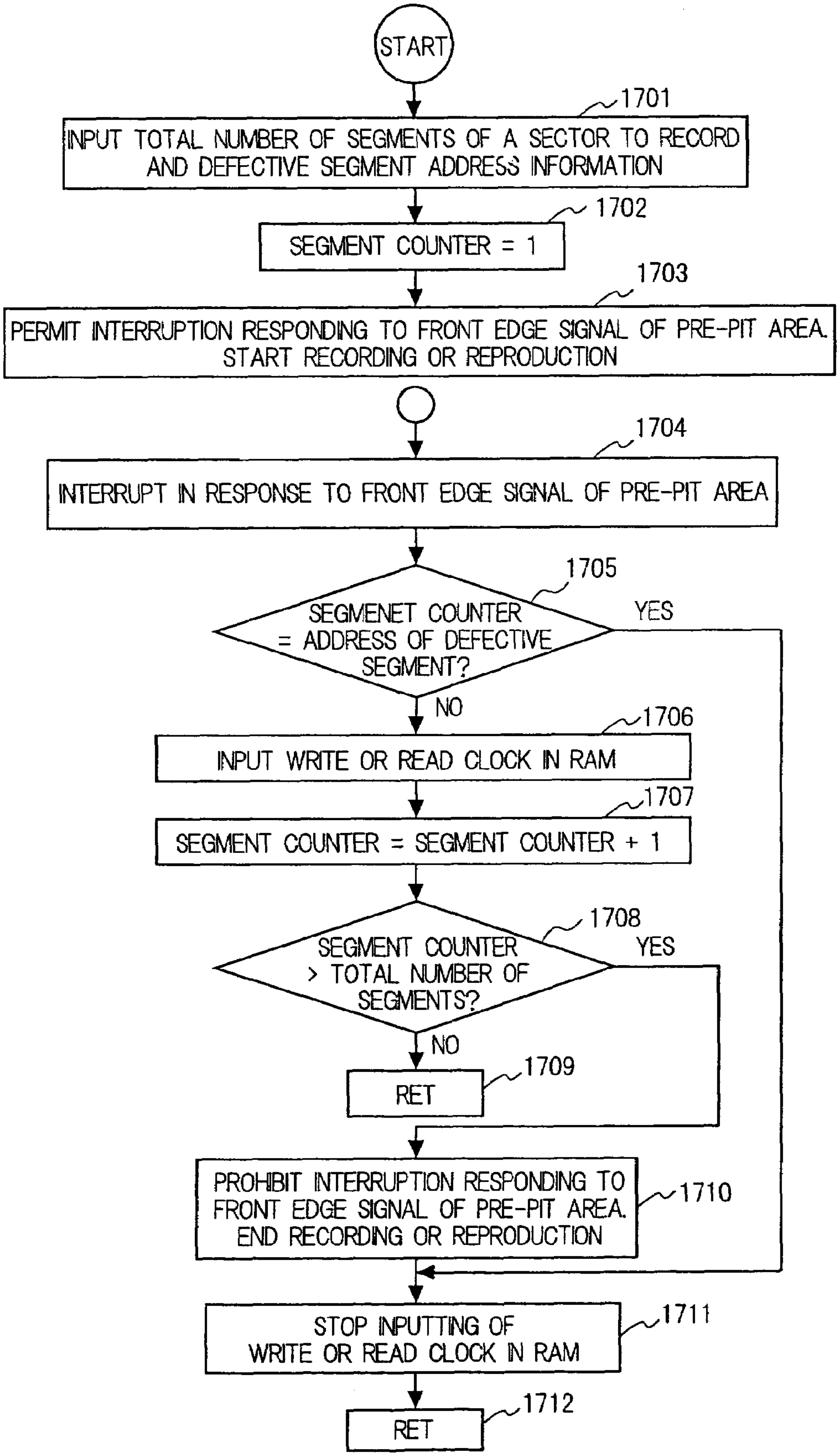

F I G. 19
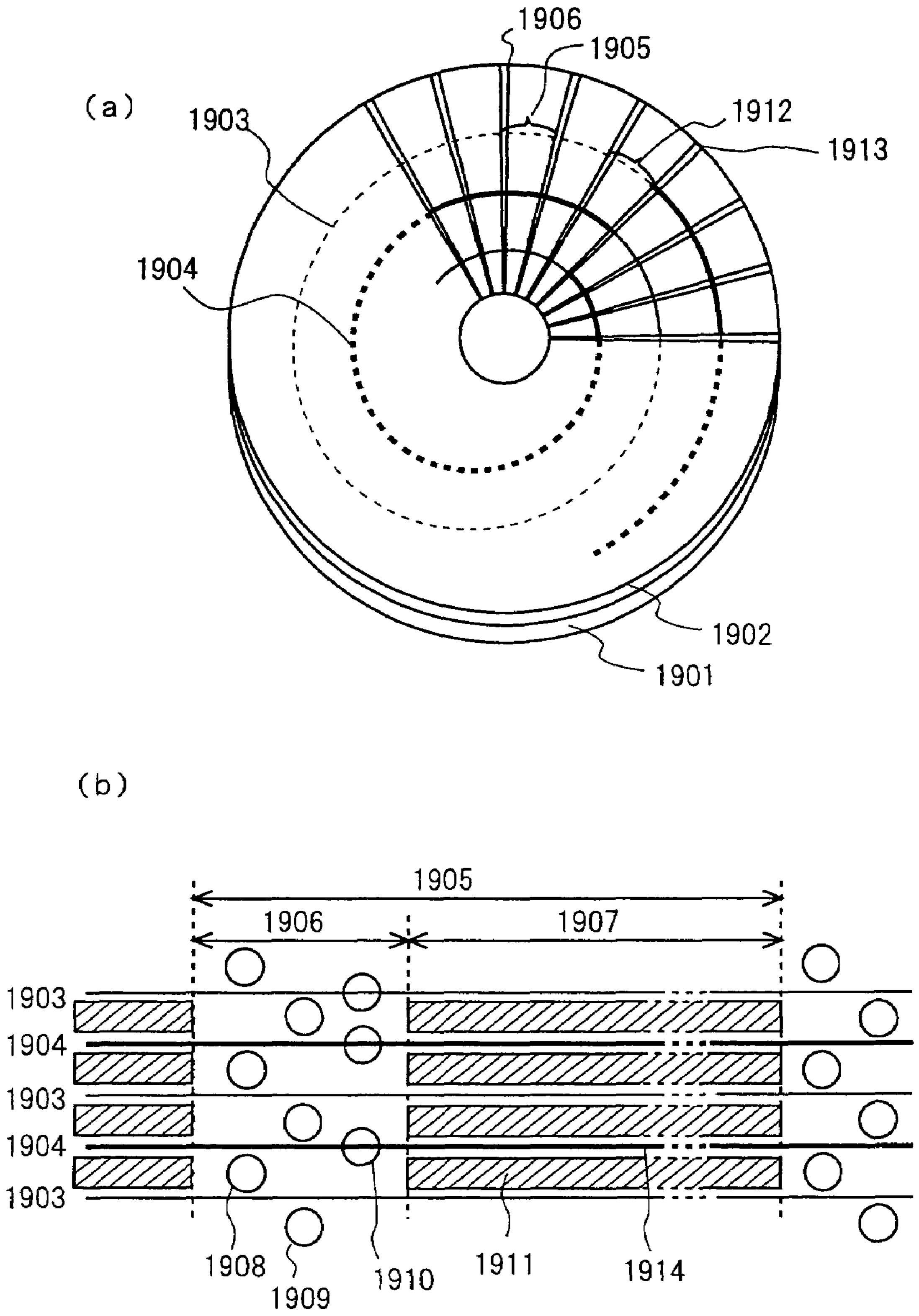

FIG. 20
(a)
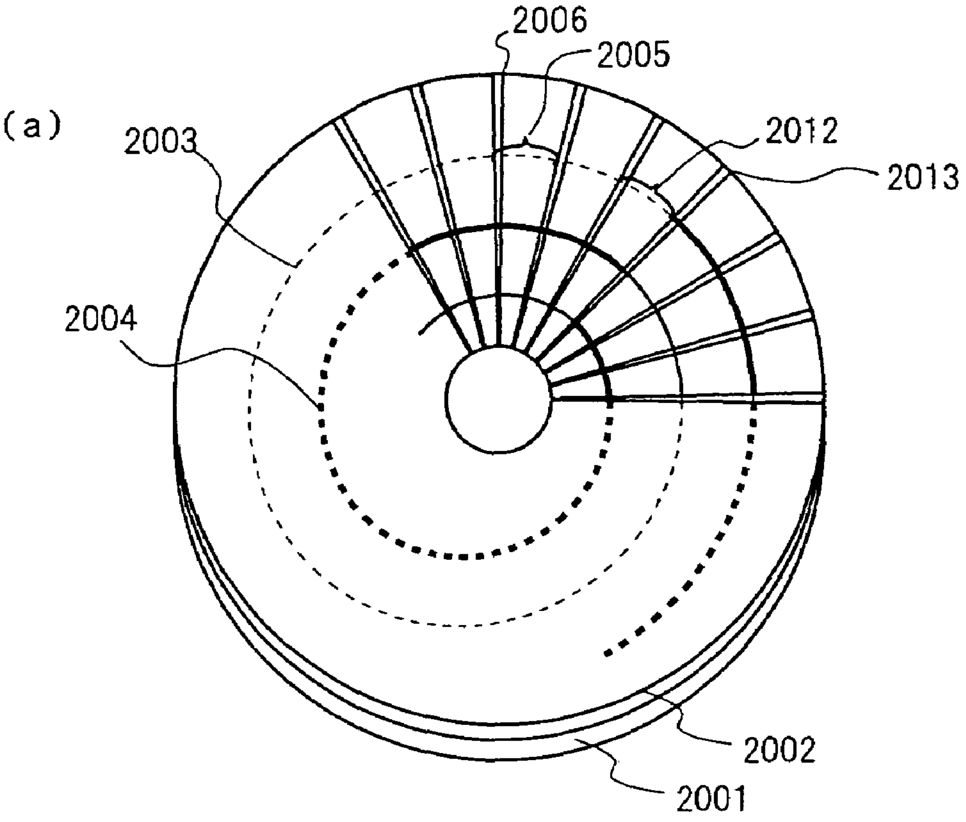
(b)
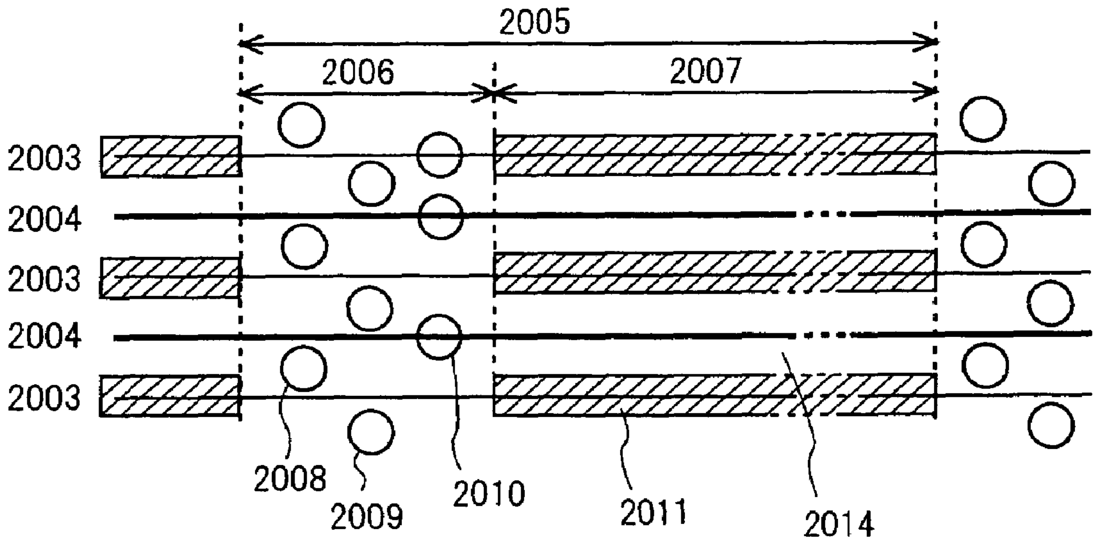

FIG. 21
(a)
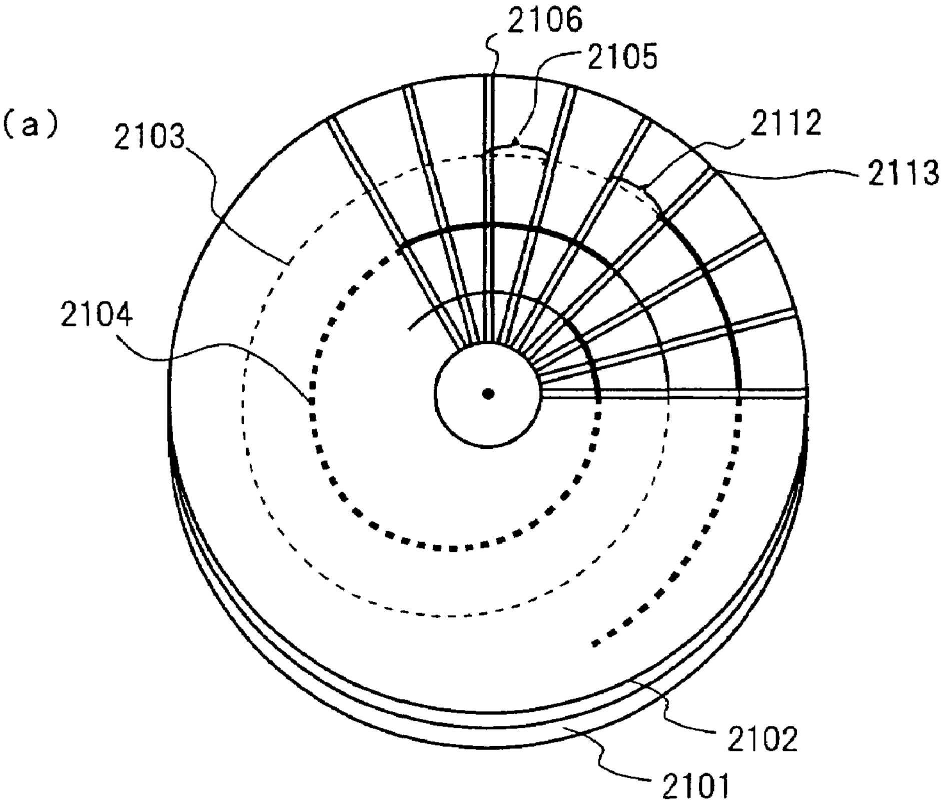
(b)
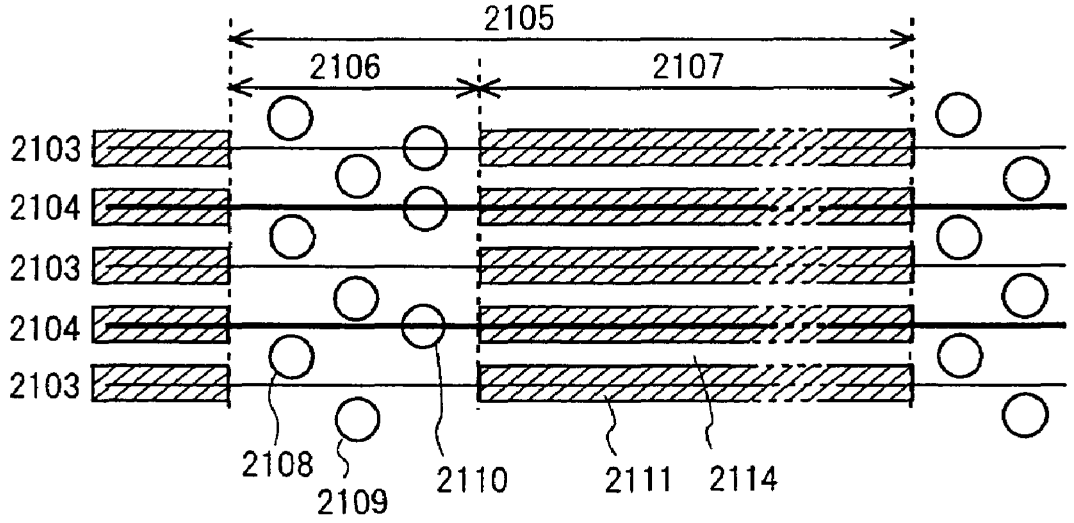

F I G. 2 2
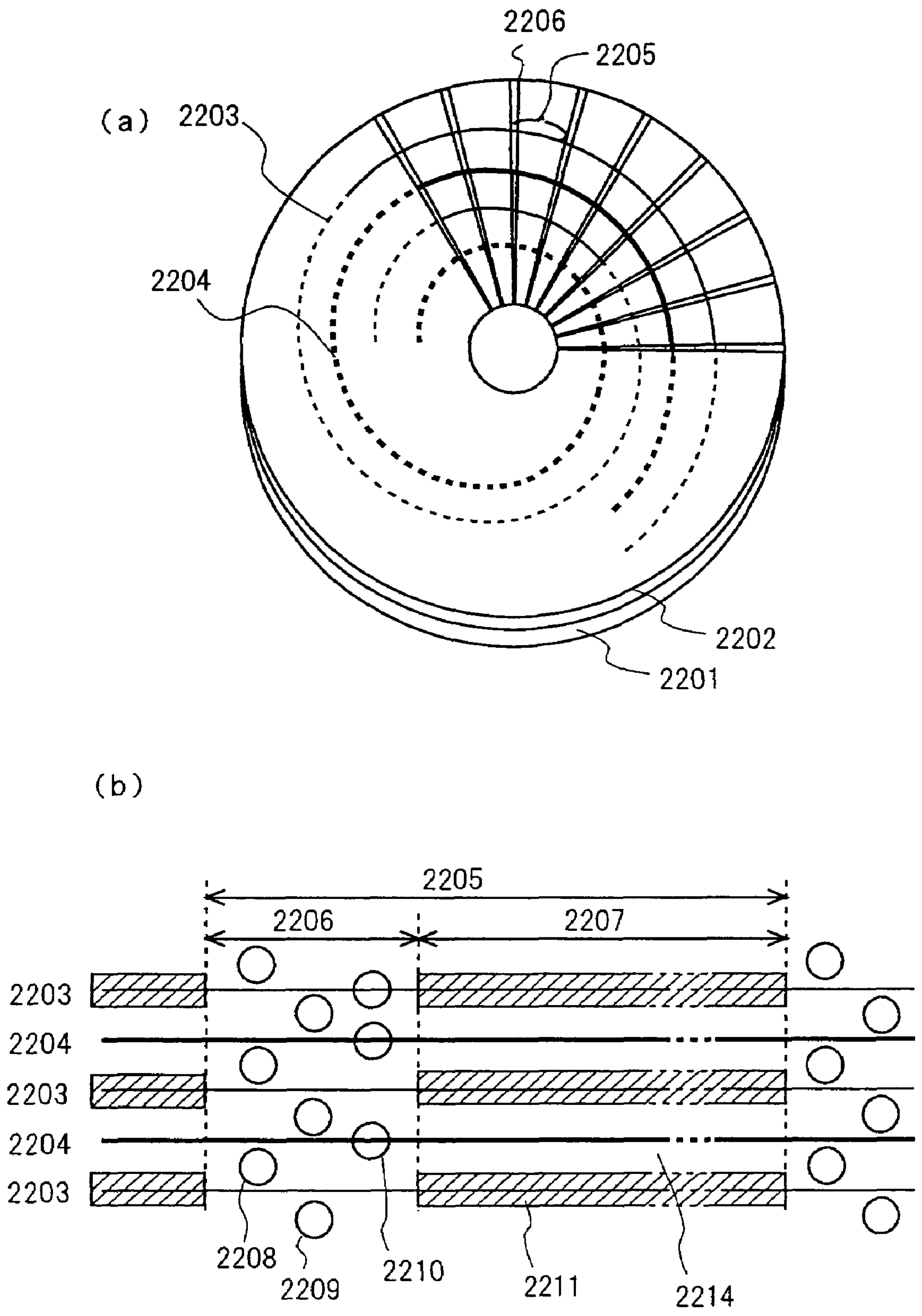

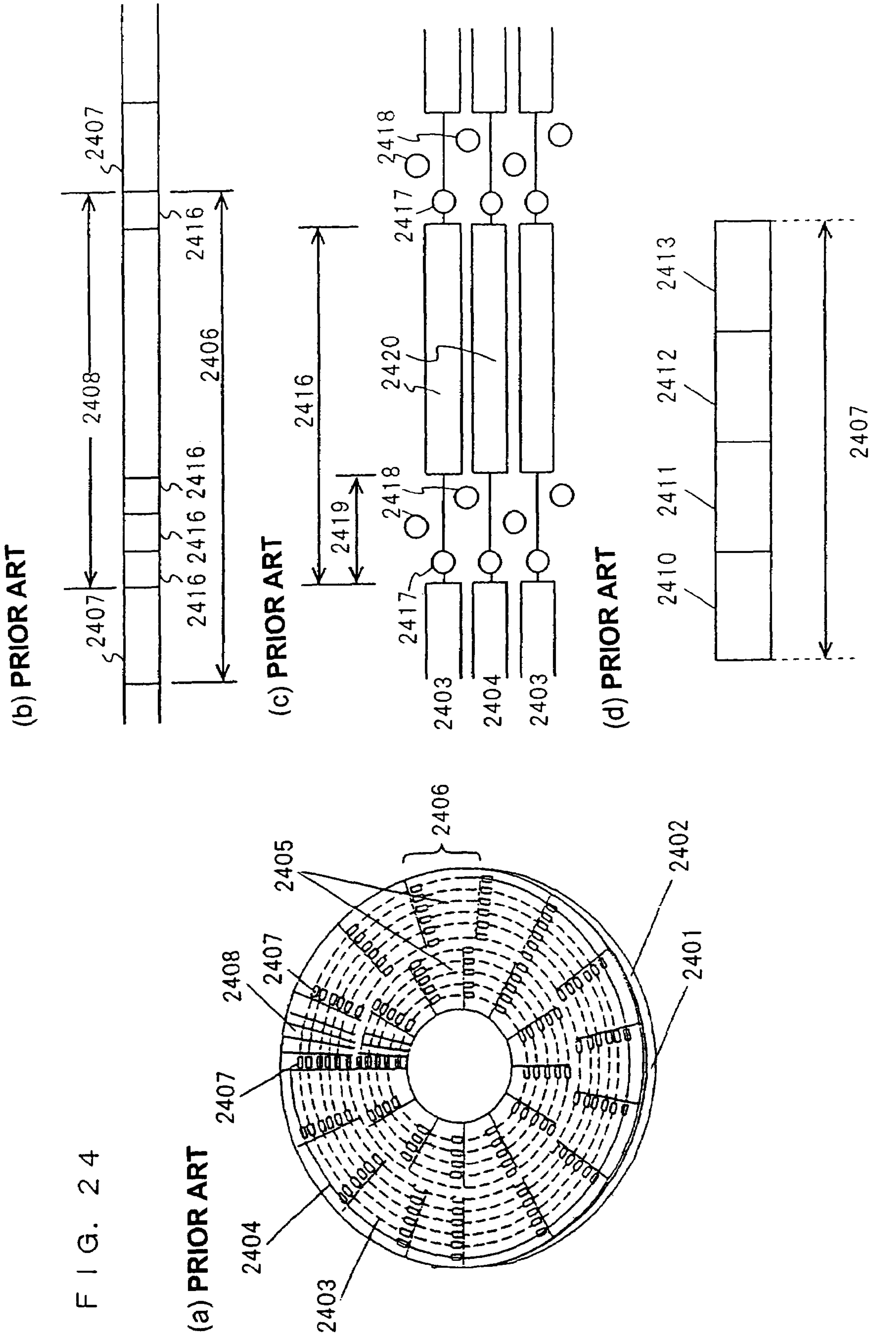
F I G. 2 4

FIG. 25 (a) PRIOR ART

RECORDING MEDIUM, ITS CONTROLLER AND CONTROLLING METHOD

CROSS-REFERENCE TO RELATED APPLICATION

This application is a Section 371 of International Application No. PCT/JP01/09652, filed Nov. 2, 2001, the disclosure of which is incorporated herein by reference.

TECHNICAL FIELD

The present invention relates to a recording medium which has pre-formatted addresses or segments, a recording apparatus and a reproducing apparatus for such a recording medium (control apparatus), and a recording method and a reproduction method for such a recording medium (control method).

BACKGROUND ART

While the recent years have seen a use of an optical disk as a storage medium for a large-volume data file, music, video and the like, there still is an ongoing endeavor to increase a capacity of an optical disk in an attempt to use optical disks for an even more diversified applications.

A method generally used for efficient accessing of a large-capacity optical disk is to divide recording data into sectors having a data size of a constant unit or to record and reproduce using such sectors as a basic rewrite unit.

As for the sectors which serve as the basic rewrite unit, an address for identifying a sector is added to each sector.

A prior art optical disk having such a sector structure will now be described with reference to FIG. 23 which schematically shows a structure of this optical disk.

Part (a) of FIG. 23 shows a general overall structure of an optical disk according to a prior art example 1.

In part (a) of FIG. 23, denoted at 2301 is an optical disk substrate of polycarbonate, denoted at 2302 is a recording film, denoted at 2303 is a first recording track, denoted at 2304 is a second recording track, denoted at 2305 are zones which are provided by dividing the disk in accordance with a distance along the radius direction, denoted at 2307 are addresses for identification of sectors, and denoted at 2308 is a data recording area for recording data.

In the description on embodiments and the claims, "data" and "information" have the same meaning.

In part (a) of FIG. 23, a recording track is one recording track formed in the shape of a spiral which runs from an inner round toward an outer round of the optical disk, and the recording track contains the first recording track 2303 and the second recording track 2304. The first recording track 2303 and the second recording track 2304 each has the length equivalent to one round and alternate each round.

For the purpose of increasing the density along the direction of the tracks, the optical disk shown in FIG. 23 uses the land/group method which requires to use both a ditch portion for guiding the tracks (groove portion) and an inter-ditch portion (land portion) as a data recording area.

The data recording area 2308 is divided into a plurality of zones 2305 in accordance with a distance along the radius direction-of the optical disk, to thereby improve the recording density of the disk. In each zone, the addresses 2307 are aligned along the radius direction of the optical disk. In part (a) of FIG. 23, there are areas which are aligned along the radius direction and have different sector numbers, and the data recording area 2308 is divided into the two zones 2305. The data recording area 2308 may be divided into any desired number of zones. Hence, a sector which has a distance from the front edge of the address 2307 until the front edge of the next address 2307 remains at the same angle (an angle on polar coordinates whose origin is the center of the optical disk) in each zone.

The angle of the sector in the inner zone is larger than the angle of the sector in the outer zone. This sets the sector's average linear density in the inner zone approximately the same as the sector's average linear density in the outer zone.

The "linear density" means the volume of information recorded over a unit length in the recording track. The method described above which requires to provide a plurality of zones on a disk and change the angles of sectors in each zone to thereby ensure that average line densities of the respective zones become approximately constant within the disk is called the ZCAV method (Zoned Constant Angular Velocity method for recording or reproducing at a constant angular velocity) or the ZCLV method (Zoned Constant Linear Velocity method for recording or reproducing at a constant number of revolutions within a zone).

Part (b) of FIG. 23 is an enlarged view of one sector 2306.

The sector 2306 is obtained by dividing the first recording track 2303 and the second recording track 2304 by the addresses 2307. The respective sectors have the same angle (an angle on polar coordinates whose origin is the center of the optical disk) in each zone, and data having the same volume of information (e.g., the number of bits) are recorded in the respective sectors.

One sector 2306 is comprised of the addresses 2307 and the-data recording area 2308 (the first recording track 2303 or the second recording track 2304) which is sandwiched by the addresses 2307.

In part (b) of FIG. 23, the first recording track 2303 is formed in the ditch portion, while the second recording track 2304 is formed in the inter-ditch portion which is sandwiched by the ditch portion.

During tracking of a light beam, tracking control is executed in such a manner that the intensity of primary diffracted light which is created by diffraction caused by the ditches and is contained in reflected light from the disk will be balanced, whereby an optical pickup is positioned at the center of the ditch portion or the center of the inter-ditch portion. There are two points at which the primary diffracted light is balanced, one that the light beam comes falling on the ditches on the first. recording track 2303 and the other that the light beam comes falling on between the ditches on the second recording track 2304. However, since the primary diffracted light shows different polarities along the traveling direction of the light beam at these two points, by means of switching of the polarity during the tracking control, it is possible to easily switch between a state that the light beam is controlled to fall on the first recording track 2303 and a state that the light beam is controlled to fall on the second recording track 2304.

However, since the tracks of the first recording track (which is located in the ditch portion, and provided on the right-hand side and the left-hand side to which are the inter-ditch portion) and the second recording track (which is located in the inter-ditch portion, and provided on the right-hand side and the left-hand side to which are the ditch portion) alternate every round on the disk but are continuous to each other, it is necessary to inverse the tracking polarity at a point of transition from the first recording track to the second recording track and a point of transition from the second recording track to the first recording track. As marks to detect these switching points, inversion marks 2309 are provided in switching portions between the first recording track and the second recording track.

An optical disk. drive (which generally refers to recording apparatuses or reproducing apparatuses for optical disks, in which context recording apparatuses include recording and reproducing apparatuses and reproducing apparatuses include recording and reproducing apparatuses) detects the inversion marks 2309 and inverses the tracking polarity.

In the optical disk shown in FIG. 23, recorded data are modulated by the 1-7 modulation method. Since 1-7 marks (data modulated by the 1-7 modulation method.) permit retrieval of a clock necessary for demodulation from the data themselves, it is possible to demodulate and reproduce continuous data recorded in the recording area.

Part (c) of FIG. 23 shows a general structure of the address 2307.

The address 2307, which is added for identification of the sector 2306 and provision of position information on the optical disk, is comprised of a sector mark 2310 which indicates that this is the address area, a VFO mark 2311 which is used to generate a clock for reproduction of the address 2307, an address mark 2312 which expresses the beginning of address data, a sector number 2313, a track number 2314 and an error detecting code 2315.

The address is consisting of a pit (which is a concave or a convex formed on the optical disk).

Since the sector mark 2310 and the address mark 2312 are data patterns for identifying the beginning of the address data, these need be special patterns which would not appear in the sector number 2313, the track number 2314 and the error detecting code 2315.

To this end, the address data in 2313, 2314 and 2315 are recorded after bi-phase modulation, run length limit modulation (RLL modulation) or the like is executed.

Data patterns not emerging from modulation rules are obtained as a result of such modulation, and therefore, distinctive data patterns not in compliance with the modulation rules are used as the sector mark 2310 and the address mark 2312.

In addition, used as the sector mark denoted at 2310 is a mark which is sufficiently long so as to permit easy identification of the beginning of the address area even when a PLL (Phase Lock Loop) clock for synchronization is not locked.

In the prior art example shown in FIG. 23, the address data are modulated by the bi-phase modulation method. Bi-phase modulation realizes modulation of 0 into 00 or 11 and 1 into 10 or 01.

Through this modulation, ordinary data are converted into such data in which there is no string of three or more continuous ones or zeroes. Hence, a pattern in which three or more ones or zeroes appear in a row becomes a distinctive pattern which does not comply with the modulation rules.

In the prior art example shown in FIG. 23, the address mark 2312 is 10001110 while the sector mark 2310 is 1111111100000000. These pieces of data are distinctive patterns not complying with the modulation rules, and as such, can be distinguished from ordinary data.

A method of reproducing the address 2307 in the prior art example will now be briefly described.

First, the sector mark 2310 is detected. The sector mark is a distinctive pattern in which there is a string of eight continuous ones and zeroes, and therefore, using a self-driven clock of a PLL and detecting a mark whose length is equal to or longer than a certain length, it is possible to easily detect the sector mark 2310.

Upon detection of the sector mark 2310, a PLL clock for address demodulation is locked in the subsequent VFO 2311.

After locking of the PLL clock, ones and zeroes of reproduction data are judged referring to the PLL clock, thereby yielding judgment data.

As the pattern 10001110 which is the address mark 2312 is detected from the judgment data, the subsequent data are the sector number 2313, the track number 2314 and the error detecting code 2315. The detection of the address mark 2312 in this manner tells that the subsequent data are the sector number 2313, the track number 2314 and the error detecting code 2315 which are to be demodulated, and data demodulation is then executed.

As described above, when the address 2307 is read out, a position on the disk is specified from thus read address information using the track number 2314 which is position information at a radius and the sector number 2313 which is position information in the rotation direction, the particular sector 2306 is identified and recording or reproduction is performed. In this manner, data are reproduced and recorded based on address information which is added to a sector in the prior art optical disk.

In the optical disk shown in FIG. 23, pits on the optical disk substrate 2301 constitute the addresses 2307 and data of one sector which is a record unit are recorded for every recording area specified by one address 2307 as described above.

While the VFO pattern 2312 for clock synchronization is provided in the address portion 2308 in the prior art example above, there is a method which uses different means to obtain a clock for demodulation of address data.

A prior art optical disk of this type will now be described with reference to FIG. 24.

Part (a) of FIG. 24 shows a general overall structure of an optical disk according to a prior art example 2.

In part (a) of FIG. 24, denoted at 2401 is an optical disk substrate of polycarbonate, denoted at 2402 is a recording film, denoted at 2403 and 2404 are recording tracks, denoted at 2405 are zones which are provided by dividing the disk in accordance with a distance along the radius direction, denoted at 2406 are sectors which are provided by dividing the tracks into a plurality of portions in the circumferential direction, denoted at 2407 are addresses for identification of the sectors, and denoted at 2408 is a data recording area for recording of data.

In the optical disk shown in FIG. 24, a ditch portion (groove portion) alone is used as the data recording area, and the recording film is disposed which makes it possible to reproduce data by the DWDD scheme.

The DWDD scheme which realizes super resolution reproduction utilizing the mobility force of a magnetic wall necessitates magnetic blocking by means of a ditch. Hence, the tracking method shown in FIG. 24 is necessary for the purpose of realizing a narrow track pitch while using only the ditch portion (groove portion) as the data recording area. The first recording track 2403 and the second recording track 2404 which show different tracking polarities every round and the zones 2405 including different number of sectors in one round of the tracks are similar to those according to the prior art example shown in FIG. 23. Further, the data recording area 2408 is divided into the plurality of zones 2405 whose average recording density is constant along a distance in the radius direction, which is similar to the prior art example shown in FIG. 23.

Hence, a sector which has a distance from the front edge of the address 2407 until the front edge of the next address 2407 remains at the same angle (an angle on polar coordinates whose origin is the center of the optical disk) in each zone, which is also similar to the above-mentioned prior art example shown in FIG. 23. When tracking is to be performed using primary diffracted light from the ditch as in the above-mentioned prior art example described earlier, there is a limitation on intervals between tracks (track pitch) where only the ditch is used as the data recording area. The limitation upon the intervals between tracks is usually about λ/(n·NA).

The prior art example shown in FIG. 24 uses the sample servo method as a tracking method so as to set the track pitch to λ/(n·NA). The sample servo method is used for other purposes in addition to realization of a narrow track pitch because of a number of advantages, such as the resistance against tilting of a disk, over a method using primary diffracted light from a ditch. The sample servo method will now be briefly described.

Part (b) of FIG. 24 is an enlarged view of one sector 2406. The sector 2406 is obtained by dividing the recording track 2403 by the addresses 2407. The respective sectors have the same angle (an angle on polar coordinates whose origin is the center of the optical disk) in each zone. One sector 2406 is comprised of the addresses 2407 and a plurality of divided segments 2416 located between the addresses 2407. Regardless of whether belonging to the same zone or different zones, all sectors contain the same number of segments 2416.

Part (c) of FIG. 24 is a schematic enlarged view of one segment 2416.

One segment 2416 comprises a pre-pit area 2419 at the top and a subsequent data recording area 2420 which is consisting of a ditch. The pre-pit area 2419 includes a clock pit 2417 and a pair of wobble pits 2418. Disposed at the top of the pre-pit area 2419 is the clock pit 2417 which is for generating a window signal for sampling servo and a clock for data demodulation. This is followed by the pair of wobble pits 2418 for obtaining a signal for tracking.

In the optical disk shown in FIG. 24, tracking with a light beam is performed while sampling the amount of reflected light from the pair of wobble pits 2417. In short, the light beam irradiates a surface of the optical disk and the amount of the resulting reflected light is checked.

When the location of an optical pickup is off to the right-hand side or the left-hand side relative to the recording track, the amount of reflected light from the closer wobble pit 2418 decreases and the amount of reflected light from the farther wobble pit 2418 increases.

Hence, with tracking control performed such that the amounts of reflected light from the pair of wobble pits 2418 will be balanced out, it is possible to position the optical pickup at the center of the recording track 2403 or the recording track 2404. In this manner, since a track control signal (the wobble pit 2418) is buried as it is dispersed in a part of the disk according to the sample servo method, it is not necessary to obtain the track control signal (primary diffracted light) from the ditch unlike in the prior art example described above, and therefore, there is an advantage that it is possible to freely set the shape and the depth of the ditch of the data recording area 2420 which is comprised of the ditch.

Part (d) of FIG. 24 shows general structure of the address 2407.

The address is comprised of a pit (which is a concave or a convex formed on the optical disk).

The address 2407, which is added for identification of the sector 2406 and provision of position information on the optical disk, is comprised of an address mark 2410 which indicates the beginning of the address area, a sector number 2411, a track number 2412 and an error detecting code 2413.

As in the prior art example 1 described above, the address mark 2410 is a special pattern which would not appear in the sector number 2411, the track number 2412 and the error detecting code 2413.

The prior art example shown in FIG. 24, too, requires to modulate address data by the bi-phase modulation method and uses 10001110 as the address mark 2410, as in the prior art example described earlier. Since the data 10001110 are a distinctive data pattern which is not in compliance with the modulation rules of bi-phase modulation, it is possible to detect the address mark 2410.

A method of reproducing an address portion in this prior art example will now be briefly described.

First, the clock pit 2417 is detected. N-fold multiplication performed by a PLL using this clock pit generates a PLL clock for address demodulation.

As in the prior art example described above, ones and zeroes of reproduction data are judged at the fall of the PLL clock, thereby yielding judgment data.

As the pattern 10001110 which is the address mark 2410 is detected from the judgment data, the subsequent data are the sector number 2411, the track number 2412 and the error detecting code 2413.

The detection of the address mark 2410 in this manner tells that the subsequent data are the sector number 2411, the track number 2412 and the error detecting code 2413 which are to be demodulated, and data are then recorded or demodulated.

As in the prior art example described above, in this sample servo method as well, when the address is read out, a position on the disk is specified from thus read address information using the track number which is position information at a radius and the sector number which is position information in the rotation direction, a particular sector is identified and recording or reproduction is performed. In this manner, data are reproduced and recorded based on the address information which is added to the sectors.

As described above, in the optical disk shown in FIG. 24, pre-pits are formed on the addresses 2407 and the pre-pit areas 2419 on the optical disk substrate 2401 and data of one sector which is a record unit are recorded for every recording area specified by one address 2407.

As described above, in a prior art disk medium, the length or the angle of a recording track in one sector is determined in advance by a pre-pit or the like (i.e., by pre-formatting) on the disk. In other words, addresses comprised of pre-pits determine the lengths or the angles of recording tracks for every sector. In a similar fashion, addresses comprised of pre-pits and pre-pit areas determine the number of segments in each sector and the lengths of the recording tracks in each segment.

The capacity of an optical disk is determined by the total number of sectors in each zone and the optical disk has physical zone and sector structures which are pre-formatted, and therefore, it is extremely difficult to change the size of the sectors, the number of the sectors and the like on the optical disk.

Hence, even though it becomes possible to record and reproduce at an even higher density owing to an improved characteristic of a recording film of an optical disk realized by technological advance, it is not possible to increase the data capacities of optical disks which comply with an existing standard.

In order to increase the data capacities of optical disks, it is necessary to newly establish a new standard regarding optical disks and manufacture optical disks (wherein a new sector size or a new sector count is pre-formatted) which comply with the new standard.

This poses a problem that in the event that high-density optical disks are commercialized in accordance with the new standard, it would not be possible to record data in a new optical disk or reproduce data from a new optical disk using disk drives which are already available in the market since the disk drives already available in the market would not be compatible with the new format. In the case of a prior art optical disk, since a limit on a recording density is dependent upon λ/(2·NA) (where NA is the numerical aperture and A is the wavelength of reproduction light) which expresses the size of a light beam (i.e., the diameter of an area in which the intensity of the light beam is a half a peak intensity or more), for the purpose of realizing an improvement in recording density, it is essential not only to shorten the wavelength or increase the NA of a laser light source but also to enhance a capability of a recording medium. When an optical constant such as NA and λ is changed, the standard regarding optical disks needs be revised from the beginning, which obviously necessitates a change to the wavelength of a light source, a constant of a lens and the like of recording and reproducing apparatuses. Hence, the problem that it is not possible to enhance a density with the disk drives already available in the market has heretofore been considered as a problem which is strongly relevant to other problems (problems regarding optical constants such as NA and λ) and which can not be solved.

However, in the field of magneto-optical recording, the recent years have seen a number of proposals on a super resolution reproduction method which achieves a high density by means of an improvement made on a recording film without depending upon the value λ/(2·NA).

Reproduction methods according to which a recording density which permits reproduction is not dependent upon the value λ(2·NA) will be herein referred to as "super resolution reproduction methods." Of these, the DWDD scheme (Domain Wall Displacement Detection) for reproducing recorded data which have expanded in accordance with movement of a magnetic wall is a quite excellent method according to which it is possible to reproduce a recording mark which is 0.1 μm or smaller using a light beam whose half width is approximately 0.6 μm (Japanese Patent Application Laid-Open No. 6-290496). In a magneto-optical disk utilizing such a super resolution reproduction method, it is possible to improve a recording density merely by means of an improvement in capability of the recording medium, without changing μ/(2·NA). It is possible that even the disk drives already available in the market will easily record at a high density in or reproduce at a high density from a super resolution reproduction recording medium of the DWDD type or the like as long as the recording medium has an enhanced capability.

However, as described earlier, since there are pre-formatted zones and addresses in a prior art optical disk described above, it is not possible to change the sizes of sectors which are each associated with each one of the addresses or the number of the sectors. Because of this, despite an improvement in capability of a recording film of a recording medium, the improvement in capability of the recording medium fails to be reflected when the format of the disk medium remains the same and it is therefore extremely difficult to easily increase a recording density, thus making it necessary to change the disk standard (or replacement of optical disk drives to users).

Further, information such as pre-formatted addresses is engraved on an optical disk in the form of convexes and concaves. A recording density of these pits is under a certain restriction by a limit to reproduction dependent upon the value λ/(2·NA). Meanwhile, use of the super resolution technique such as the DWDD scheme lifts off the restriction exerted by λ/(2·NA)from a recording density in a data portion. This in turn leads to the following problem.

For instance, considering a sector in which addresses have 40 bytes and data have 2048 bytes, in the case of a prior art optical disk (a medium which does not utilize a super resolution reproduction method), a recording density in an address portion (an area where there are addresses recorded) is 0.5 μm/bit and a recording density in a data portion (an area where there are data recorded) is approximately 0.5 μm/bit.

In this case, the proportion of address data to the entire data (which is called the "address redundancy") is 0.5×40×8/(0.5×(40+2048)×8)=1.91%.

In the case of an optical disk utilizing a super resolution reproduction method such as the DWDD type (or the CAD type, the FAD (Front Aperture Detection) type or the RAD (Rear Aperture Detection) type, etc.), while a recording density in an address portion is 0.5 μm/bit, a recording density in a data portion is about 0.1 μm/bit, and hence, the address redundancy greatly increases to 0.5×40×8/((0.5×40+0.1×2048)×8)=8.9%.

The poor format efficiency is attributed to a format structure of the prior art optical disk in which one address is added to one sector.

This is also a big problem against realization of a high-density optical disk of a super resolution reproduction met hod.

Meanwhile, in the case of an optical disk having a zone structure, when accessing to a zone boundary is to be achieved, eccentricity of the disk, a seek error or the like makes it impossible to accurately move to a target zone in one seek operation. When it is impossible to move to a target zone, processing in a drive becomes very much complex and a seek time increases.

For example, in part (a) of FIG. 23, while the addresses 2307 are aligned along the radius direction within the zones, the addresses 2307 are not aligned along the radius direction between the adjacent zones.

Because of this, as the optical pickup moves back and forth between two adjacent zones, the optical pickup loses address information every time the optical pickup switches between the zones and it becomes necessary to-search for the addresses 2307 from the beginning. This tremendously slows down detection of the addresses 2307.

A prior art approach in light of this for a situation that an optical pickup needs to access a sector which is within a zone next to the current zone but which is in the vicinity of the boundary between the current zone and the next zone is a method according to which the optical pickup moves over an extra distance in advance considering even a seek error so as to be able to move to a desired zone without fail, and the optical pickup then jumps over a track from that position and moves to a desired recording track.

As described above, there is a problem that a seek time for accessing a zone boundary becomes long in an optical disk which has a zone and a sector structures which are pre-formatted in advance.

Further, there is another problem with the prior art techniques that even when one segment contained in a sector becomes defective (and hence it becomes impossible to record or reproduce), this sector as a whole becomes unusable since the sectors are in a fixed arrangement on the recording medium or since there is not spare segment in a recording area which corresponds to this sector.

DISCLOSURE OF INVENTION

A "sector" herein referred to is a recording area having a data volume of a minimum rewrite unit (minimum data recording volume) in which a recording apparatus for the recording medium records data in the recording medium. A "segment" herein referred to is a minimum continuous recording area on the recording medium in which it is possible to change a recordable data volume, and a sector is comprised of a plurality of segments.

A "recording medium" herein referred to is a medium utilizing any desired recording and reproduction method for recording or reproduction of information. This includes a disk medium, a card, etc. Further, this includes an optical disk, a magnetic disk, a magnetic card, an IC (semiconductor memory) card, etc.

A "disk medium ",herein referred to is a recording medium of a disk format utilizing any desired recording and reproduction method. For instance, an optical disk, a magnetic disk and the like are included. Further included are a disk medium which can be separated from a disk drive (such as a CD disk and a DVD disk) and a disk medium which cannot be separated from a disk drive (such as a hard disk drive). An "optical disk" herein referred to includes a magneto-optical disk and a phase-transition optical disk.

The first invention is directed to a recording medium which comprises addresses indicative of positions on the above-mentioned recording medium and which is for recording or reproduction using sectors as data rewrite units or data read units, wherein starting positions of the above-mentioned addresses and starting positions of the above-mentioned sectors are different.

The second invention is directed to the recording medium of the first invention, wherein the length of one sector is different from the length which is n times as long as the length of one address (where n is an integer equal to or larger than 1).

The third invention is directed to the recording medium of the first invention having a disk-like shape, wherein the angle of one sector is different from the angle which is n times as large as the angle of one address (where n is an integer equal to or larger than 1).

The fourth invention is directed to the recording medium of the first invention, having a disk-like shape and comprising one or more recording tracks, a plurality of segments which are. generated by radially dividing the above-mentioned recording tracks, a plurality of zones which are divided in accordance with a distance along the radius direction of the disk, addresses, and sectors, wherein the number of segments m contained in one sector is different from a figure which is calculated by multiplying the number of segments n contained in one address by k (where k is any desired integer which is equal to or larger than 1).

In a prior art recording medium, since data contained in one sector are recorded in a recording area having a constant length or a constant number of segments which is determined by pre-pits or the like on the recording medium, even if a capability of a recording film improves, it is not possible to increase a recording capacity due to a restriction imposed by the existing format. This is attributed to a structure of a recording medium that one sector is associated with one address.

Referring to FIG. 25, a difference between a prior art recording medium and the recording medium according to the present invention will be described. Part (a) of FIG. 25 shows a general structure of a recording medium according to a prior art example, and part (b) of FIG. 25 shows a general structure of the recording medium according to the present invention (embodiment). The recording mediums shown in parts (a) and (b) of FIG. 25 are disk-shaped.

The recording mediums comprise spiral tracks which run from inner rounds toward outer rounds, and the tracks are divided by addresses at equal angles. Boundaries between the areas thus divided by the addresses are lines up along the radius direction and extend radially. Each address is divided into a plurality of segments (not shown).

In the recording medium according to the prior art example shown in part (a) of FIG. 25, a starting position of a sector 2501 always coincides with a starting position (top position) of an area 2502 which is defined by an address. For example, where two pieces of sector recording data are to be recorded in a row on the recording medium, even when a recording position of the last bit of the first piece of recording data is in the middle of an area defined by an address, a starting position of the next sector is located at a starting position of the next address. In short, an end position of the first sector coincides with an end position of an area defined by the first address. The first sector becomes the area defined by the first address. In the event that a recording position of the last bit of the top piece of recording data is beyond the area defined by the first address and in the middle of an area defined by a second address, a starting position of the next sector coincides with a starting position of an area defined by a third address. That is, an end position of the first sector coincides with an end position of the area defined by the second address. The first sector becomes the areas defined by the first and the second addresses. As described above, it thus becomes impossible to use a recording area ranging from the recording position of the last bit of the recording data to the starting position of the next address.

On the contrary, in the recording medium according to the embodiment shown in part (b) of FIG. 25, a starting position of an area 2511 does not need to coincide with a starting position (top position) of a sector 2512 which is defined by an address (although these could coincide with at a certain probability). For example, where two pieces of sector recording data are to be recorded in a row on the recording medium, as long as a recording position of the last bit of the first piece of recording data is in a segment which is within an area defined by an address, this segment is an end position of the sector and a starting position of the next sector is in the next segment which follows this segment (The starting position is within the area defined by the address.). In the event that a recording position of the last bit of the top piece of recording data is beyond the area defined by the first address and in a segment which is within an area defined by a second address, this segment is an end position of the sector and a starting position of the next sector is in the next segment which follows this segment (The starting position is within the area defined by the address.). A recording area which remains unused is only an unused portion of the last segment of the sector.

If the sizes of sectors are constant, it is possible to provide the recording medium with addresses which are optimal for the sectors. However, when sectors having different sizes are provided, the efficiency of use of a recording area decreases in prior art recording mediums. The present invention realizes a high-recording density recording medium in which only an extremely small recording area is wasted (remains unused) regardless of the sizes of sectors.

Segments are provided based on the necessity of providing a servo area for tracking control or the like, and do not contain unique identification information regarding themselves (i.e., unique identification information which denote positions in the radius direction or positions in the circumferential direction on a recording medium, for instance). There is a fundamental difference in this regard from addresses which are unique information indicative of positions.

In a prior art recording medium, a starting position of a sector is fixedly provided at a starting position of an address. In a prior art recording medium, a sector is fixed in an area divided with address information. This means that a starting position of a sector is fixed. Due to this, a prior art recording medium requires a change in format of the recording medium itself for the purpose of improving a recording density even despite a future improvement in capability of a recording film. As for the recording medium according to the present invention, the first through the fourth inventions eliminate the necessity to coincide a recording area of a sector with a recording area which is defined by an address, and it is therefore possible to set freely. This structure permits to change the number of segments per sector which has heretofore been unchangeable because of fixation of a sector in an area divided with address information. Hence, there is a great effect that changing the number of segments per sector even in a recording film having a different recording density, it is possible to more freely set a recording density of an optical disk.

In the recording medium according to the present invention, even when the number of all segments on a disk is constant, with an improvement in capability of a recording film, it is possible to increase a recording capacity of the recording medium as a whole by increasing the volume of information per segment and decreasing the number of segments per sector.

This means that it is possible to realize a format which permits to increase a recording capacity while keeping a physical format comprised of pits on a disk fixed. With a plurality of recording densities corresponding to future improvements in capability of a recording film determined at the time of standardization or with a relationship between sectors and segments recorded in a predetermined area in a predetermined format at a predetermined recording density so that a recording and reproducing apparatus will be able to read this out and operate, recording at a high density and reproduction of data recorded at a high density are easily possible using a recording and reproducing apparatus which is already available. Thus, the present invention realizes an effect that with an existing format kept, a recording medium having an even higher data capacity is realized while maintaining a compatibility in the market. This leads to a great effect that it is possible to freely set a recording density of an optical disk in accordance with an improvement in capability of a recording film for instance or in accordance with the shape of a recording medium (e.g., a disk-like shape).

The fifth invention is directed to the recording medium of the first invention comprising a plurality of sectors including a first sector and a second sector, wherein the number of segments contained in the above-mentioned first sector is smaller than the number of segments contained in the above-mentioned second sector, and the volume of information recorded in the above-mentioned segments of the above-mentioned first sector is larger than the volume of information recorded in the above-mentioned segments of the above-mentioned second sector.

The sixth invention is directed to the recording medium of the first invention having a disk-like shape and comprising a plurality of sectors, wherein the number of segments contained in one sector located in an outer round portion is smaller than the number of segments contained in one sector located in an inner round portion, and the volume of information recorded in one segment located in the above-mentioned outer round portion is larger than the volume of information recorded in one segment located in the above-mentioned inner round portion.

The seventh invention is directed to the recording medium of the first invention comprising a plurality of zones including a first zone and a second zone, wherein the number of segments contained in one sector within the above-mentioned first zone is smaller than the number of segments contained in one sector within the above-mentioned second zone, and the volume of information recorded in the above-mentioned segments of the above-mentioned first zone is larger than the volume of information recorded in the above-mentioned segments of the above-mentioned second zone.

The fifth through the seventh inventions make it possible to maximize a recording capacity while ensuring that a recording density associated with a sector position owing to the shape of the recording medium or the like shows a constant change.

A prior art recording medium has such a structure that division into zones in the radius direction is needed for increasing a recording density since the number of segments per sector is the same, and the number of sectors in the zones increases toward an outer round.

The present invention realizes an optical disk in which a recording density within the disk is approximately constant, while maintaining a structure that segments are radially arranged within the disk by ensuring that the number of segments per sector is flexible and the volumes of information recorded in the segments are flexible.

In the case of disk-shaped recording mediums for instance, as a recording density of the recording mediums is improved, recording mediums having the ZCAV or ZCLV structure in accordance with the recording density are easily realized.

An example of the recording medium according to the sixth invention has a disk-like shape, the angle of one address remains constant from an inner round to an outer round of the recording medium, and the angle of one sector on the inner round is larger than the angle of one sector on the outer round on the recording medium.

In a prior art recording medium, it is necessary to move to a desired zone without fail during inter-zone seek, since the number of addresses is different between zones. A prior art approach for a situation that an optical pickup needs to access a sector which is within a zone next to the current zone but which is in the vicinity of a boundary between the current zone and the next zone is a method according to which the optical pickup moves over an extra distance in advance considering even a seek error so as to be able to move to a desired zone without fail, and the optical pickup then jumps over a track from that position and moves to a desired recording track.

Thus, there is a problem that a seek time for accessing a zone boundary becomes long in an optical disk which has a zone and a sector structures which are pre-formatted in advance.

However, the recording medium according to the present invention, utilizing such a structure described above, realizes a disk medium in which although address information is aligned radially on the disk, sectors are not lined up radially on the disk. Since this makes it possible to realize an optical disk in which there is no physical zone structure while a recording density is approximately constant from an inner round to an outer round within the disk, which leads to an effect that it is possible to prevent an increase in inter-zone seek time which has heretofore occurred, and to realize a high-recording density recording medium in which a search time is short.

For instance, when segments, address information and the like are aligned in the radius direction of a disk-shaped recording medium, it is easy to retrieve position information during seek by a head part and it is therefore possible to shorten a seek time.

Further, in a disk medium comprising a plurality of zones, when boundaries between segments are aligned in the radius direction of the disk within the zones but the boundaries between the segments are not aligned in the radius direction of the disk between the zones (which is the optical disks shown in FIGS. 23 and 24 for example), a seek time becomes long during accessing to a recording track which is in the vicinity of a boundary between two adjacent zones.

However, with the boundaries between the segments aligned in the radius direction of the disk in an attempt to speed up seek, because of arc-shaped recording tracks having the same angle disposed in the respective segments, the closer the recording track is to an outer round of the disk, the longer the lengths of the recording track of one segment become. In a prior art recording medium, since the volume of data recorded in one segment is constant from an inner round to an outer round on the same recording medium, the farther recording tracks are from the center of a disk, the lower a linear density of recording data becomes (i.e., a smaller volume of data are recorded in a recording track over a unit length). Hence, when boundaries between segments are aligned in the radius direction of the disk, a data capacity of the recording medium decreases. This is attributed to a structure of the prior art recording medium in which sectors and addresses are associated with each other in one-to-one correspondence.

In the recording medium according to the present invention, boundaries between segments for instance are aligned in the radius direction of the disk, and the closer the recording track is to the outer round of the disk, the larger volume of data are recorded in one segment.

In short, the number of segments per sector (wherein the volume of data is constant) is set smaller as a distance to the outer round becomes smaller. That is, the closer the recording track is to the outer round, the larger volume of data are recorded in one segment. Such a structure realizes an effect that it is possible to realize a disk medium which enables high-speed seek while permitting to flexibly change a recording capacity.

In order to efficiently realize the structure described above, the following function is necessary. Consider a system that the number of tracks forming a disk is T and one track is divided into k pieces of segments. Where the number of segments forming one sector is m, a track number t and a segment number s of an r-th sector are:

$$t=[r\times m/k](0\leqq t\leqq T-1)$$

$$S=r\times m \text{ MOD } k(0\leqq s\leqq k-1)$$

The symbol [ ] is the Gauss' notation ([r×m/k] provides a maximum integer which does not exceed r×m/k), while MOD provides a remainder (The symbol s is a remainder which is obtained by dividing r×m by k.).

In a prior art optical disk, the value m is fixed (The number of segments forming a sector is fixed.), and k is an integer-multiple of m (The sectors are arranged radially.). Hence, with an address which is one piece of identification information added for every m segments which form one sector, it is possible to access to any desired sector by reading out this address.

However, the optical disk according to the present invention is greatly characterized in that the number m of the segments which form one sector can have any desired value. Since m has any desired value, it is possible to provide such a degree of freedom which can be changed in the future.

Whichever value m has, for the purpose of permitting a head part to access any desired sector (r-th sector), the head part needs to have a function of accessing any desired track t and any desired segment s.

The "head part" generally refers to an interface part, including an optical pick up and the like, for recording data in a disk medium and reproducing data from a disk medium.

In a prior art optical disk, an address which identification information is added to a position to which accessing is desired, in order to allow accessing to any desired position.

The number m of segments which form one sector determines the efficiency of use of data of a sector. Since the sector size is fix, where m can have any desired value, it is possible that only one bit will be recorded in the last segment of a sector and nothing will be recorded in the remaining data recording area. The efficiency of use of the sectors is the worst in this case.

If the value of m is 100, since it is possible to control the number of segments which form one sector at a resolution of 1/m, the worst efficiency of sector use is 1−1/m=99% (in a case that only one bit is recorded in the last segment of one sector). The efficiency of sector use at this level is within a practical range.

When the value of m is about 20, the worst efficiency of sector use is 1−1/m=95%, considerably deteriorating a format efficiency (which is the efficiency of sector use determined by a format). Hence, the larger the number of segments per sector, the higher the efficiency of sector use becomes.

However, if m can have any desired value while increased, whichever segment becomes the top segment of a sector, for the purpose of ensuring that a head part can access this sector, it is necessary to add an address to every segment in a prior art format. If addresses are added to all segments, the redundancy of the addresses becomes high and the format efficiency drops.

In the event that an address is added to every segment and m pieces of segments form one sector, the redundancy d with respect to a recording data portion in an address portion is expressed by the formula below:

$$d=(a\times p)/(a\times p+q\times Z/m)$$

where p is a linear density of the addresses, a is a byte count of the addresses, q is a linear density of the data portion and Z is a byte size of the sector.

Assuming that the sector size Z is 32 kB, m=100, the linear density of the data portion is q=0.15 μm/bit, the linear density of the addresses is p=0.5 μm / bit and the byte count of the addresses is a=10 bytes for instance, the proportion of the length of the address portion to the total (the address redundancy) is:

$$d=(10\times0.5)/(10\times0.5+0.15\times32\times1024/100)=9.2\%$$

and thus, adding addresses in a prior art method leads to a major decrease in format efficiency.

Although it has been extremely difficult to increase m without inviting such a major decrease in format efficiency, this problem is solved by an address format described below and a method of accessing any desired segment according to the thirty-first invention. This will now be described in detail.

Among proposed structures is one which applies a distributed address format (Japanese Patent Application Laid-Open No. 11-021885 and Japanese Patent Application Laid-Open No. 11-329265 describing the inventions made by the inventors of the present invention), in which address data are distributed one bit to each segment, to an optical disk, accordingly ensures that structures of segments remain the same entirely within a recording medium, and makes it very easy to access any desired segment. Where this structure is used, even when m can have any desired value while increased, the redundancy of addresses does not increase.

However, there has not been a solution regarding means for accessing any desired segment.

The thirty-first invention is directed to the control apparatus of the nineteenth invention which is for a recording medium which is an optical disk and comprises one or more tracks, in which the above-mentioned tracks are radially divided into a plurality of segments, address data are distributed in the above-mentioned plurality of segments thus divided, the above-mentioned address data contain segment management numbers which express position information along the disk rotation direction and track numbers which express position information along the disk diameter direction, comprising: a counter which is in synchronization to positions of the above-mentioned segments which are generated from the above-mentioned segment management numbers; and a control part which controls, based on a value of the above-mentioned counter, a starting position and an end position of recording or reproduction of the above-mentioned sector which is a collection of the above-mentioned plurality of segments and constitute a rewrite unit.

The thirty-first invention is directed to an optical disk drive in which a starting position and an end position of recording/reproduction of data are controlled based on a value of a counter which is pre-set or initialized at a certain value based on a value read out from address information and which counts up data in minimum units (segment) for recording.

In an optical disk of a distributed address format, since segments have similar structures, gaps between two adjacent segments at the same radial positions for instance are the same. Due to this, whichever segment becomes the top segment of a sector, it is possible to control recording or reproduction by the same control method.

In a prior art optical disk wherein address data are arranged concentrated in one place (FIG. 23 or 24 for example), a gap between two segments which are on the both sides of a portion where address data are arranged is different from a gap between two segments which have not address data therebetween and are at the same radial positions. Because of this, for any desired segment to become the top segment of a sector, an optical disk drive must change the timing of recording or reproduction of the optical disk in accordance with the unique positions of the segments for each segment, which is very complex control.

Hence, an optical disk of a distributed address format is particularly suitable to the present invention. An optical disk drive which comprises a counter which is in synchronization to positions of segments which are generated from segment management numbers of an optical disk of a distributed address format (the thirty-first invention) is capable of easily accessing a segment of any desired address.

The ninth invention is directed to the recording medium of the first invention comprising a plurality of zones, wherein the number of segments contained in one sector of each zone is different between at least two zones. According to the present invention, it is possible to provide sectors having different volumes of information in different zones for instance (The number of segments is different. The volume of information per segment may be the same or different.). When two types of data having different volumes of information are to be recorded for example, recording is executed in a zone which contains an optimal sector (a sector in which all of the data can be recorded but which has the smallest amount of excessive recording area), in accordance with the volumes of information.

In the recording medium according to the present invention, it is not necessary to provide a physical boundary between zones but it is possible to set it logically. Hence, when a setting is changed, a recording capacity of a zone can be changed. With a zone for recording a large volume of information set to have a large area size and with a zone for recording a small volume of information set to have a small area size as described in relation to embodiments, a recording medium which is even easier to use is realized.

The tenth invention is directed to the recording medium of the first invention comprising information which specifies positions of the above-mentioned sectors on the above-mentioned recording medium. The eleventh invention is directed to the recording medium of the tenth invention wherein the above-mentioned information is information based on which it is possible to derive the positions of the above-mentioned sectors by a calculation formula. The twelfth invention is directed to the recording medium of the tenth invention wherein the above-mentioned information is information which specifies starting points of the above-mentioned sectors from the above-mentioned addresses and the number of the above-mentioned segments.

The thirteenth invention is directed to the recording medium of the tenth invention, comprising sector information. which contains a relationship between the above-mentioned addresses and the above-mentioned sectors, wherein the above-mentioned sector information comprises at least one piece of data among a sector number or segment number of a starting point of each zone and the number of the above-mentioned segments per sector within each zone, and a calculation formula for deriving the above-mentioned starting positions of the above-mentioned sectors using such data.

The fourteenth invention is directed to the recording medium of the tenth invention, further comprising information regarding a data bit count per segment or a frequency divide ratio of an oscillator.

The present invention is particularly effective when implemented together with the first through the ninth inventions in particular.

The recording medium according to the present invention comprises position information regarding each sector in a particular area on the recording medium (which is a particular area preferably in an inner peripheral portion of an outer peripheral portion in the event that the recording medium is a disk medium). It is preferable that this is defined in a standard or the like.

This makes it possible to specify a position of a sector on the recording medium by means of reproduction of information which is recorded in the recording medium, even if sectors and addresses are not associated with each other in one-to-n correspondence (where n is a positive integer) or even if different sectors contain different number of segments.

In addition, when a capability of a recording film of the recording medium improves, with this information rewritten or recorded in advance as pre-pit information by a manufacturer, even those optical disk drives already shipped into the market would easily realize recording at an even higher density.

Since this information is recorded in the recording medium itself, even when a data recording apparatus which recorded data in the recording medium is a separate apparatus from a data reproducing apparatus which reproduces data from the recording medium, it is possible to correctly reproduce data with the data reproducing apparatus based on data which express a relationship between sectors and segments recorded in the recording medium.

The "information which specifies positions of sectors" may be information which directly specifies positions of sectors (For instance, a starting point of the fifth sector is the fifth segments from a starting point of an address 12, and an end point of the sector is the second-segments from a starting point of an address 14.) or information which indirectly specifies positions of sectors (by means of a calculation formula, for example). Assuming that the number of segments in one round of a track is 1280 and the number of segments which form one sector is 1050 for example, it is expressed that "when $0 \leqq r \leqq 2437$, as for a starting point of the r-th sector, the top segment is a ($1050 \times r$ MOD 1280)-th segment in a $p=[1050 \times r/1280]$-th recording track (where the symbol [ ] is the Gauss' notation)."

The present invention is particularly effective for a disk medium in which units of sectors are different from units of addresses multiplied by n (where n is an integer which is equal to or larger than 1).

The fifteenth invention is directed to the recording medium of the first invention wherein one sector comprises a spare segment. The sixteenth invention is directed to the recording medium of the first invention wherein the above-mentioned segments as a whole assigned to one sector have a larger information recording capacity than the volume of information of this sector.

The seventeenth invention is directed to the recording medium of the first invention wherein the number of segments contained in the above-mentioned sector which includes a defective segment is larger than the number of segments contained in the above-mentioned sector which does not include a defective segment. The eighteenth invention is directed to the recording medium of any one of the thirteenth through the seventeenth inventions, comprising position information regarding a defective segment.

The eighteenth invention realizes an effect that a recording medium which does not get wasted in an extremely excellent manner is realized, whereas in the case of a recording medium with data already recorded, it is necessary to change the arrangement of sectors every time a defective segment is found in a sector and rewrite data in accordance with the new arrangement of the sectors.

In contrast, the fifteenth and the sixteenth invention, while requiring to provide a spare segment or a spare recording capacity from the beginning, realize an effect that even when a defective segment is found in a sector, it is not necessary to change the arrangement in the other sectors and it is possible to normally use the sectors after changing a data arrangement within the sector in which the defect has occurred.

For instance, the number of segments contained in a sector for avoiding a wasteful use is [q/r] (where the symbol [ ] is the Gauss' notation) when (q MOD r)=0 but is determined by a formula [q/r]+1 (where the symbol [ ] is the Gauss' notation) when (q MOD r)≠0. Setting the number of segments contained in a sector to a figure calculated by the formula above plus one, it is possible to use this extra recording capacity as an alternate recording capacity to deal with a defective bit. There is an effect that it is possible to recover a sector despite generation of a defective bit and use the sector, and it is possible to realize a recording medium which does not get wasted.

The "spare segment" refers to a segment which would not be used when all segments are normal.

When there is a defective bit (a bit that a recorded value fails to match with a reproduced value), information expressing that this bit is a defective bit is recorded within each sector or in a particular portion in the recording medium. During recording, data are not recorded in a segment which includes this defective bit, and data are not reproduced from the segment which includes this defective bit during reproduction.

The nineteenth invention is directed to a control apparatus for recording medium, comprising: a signal reproducing part which reads from the above-mentioned recording medium addresses which are indicative of positions on the above-mentioned recording medium and sector information which expresses a relationship between the above-mentioned addresses and sectors which are used as data rewrite units or data read units; and a control part which makes a head part move to a starting position of a sector, using the above-mentioned address and the above-mentioned sector information, wherein a starting position of at least one sector is different from a top portion of an area which is specified by the above-mentioned address.

The twentieth invention is directed to the control apparatus for recording medium of the nineteenth invention, wherein the above-mentioned recording medium has a disk-like shape and comprises tracks which are arranged in a spiral arrangement or a concentric arrangement, the above-mentioned tracks comprise segments which are divided into a plurality of areas, one address is recorded over a plurality of segments, and the above-mentioned control part counts the number of segments or the number of output signals from a counter which is in synchronization to the above-mentioned segments along the circumferential direction from the above-mentioned address on the above-mentioned recording medium, and makes a head part move to a starting position of a sector.

The twenty-first invention is directed to the control apparatus for recording medium of the nineteenth invention, wherein the above-mentioned sector information comprises at least one piece of data among a sector number or segment number of a starting point of each zone and the number of the above-mentioned segments per sector within each zone, and a calculation formula for deriving the above-mentioned starting positions of the above-mentioned sectors using such data.

In a prior art control apparatus for recording medium (a recording apparatus or reproducing apparatus), data are recorded in sectors which are associated with addresses or data are reproduced from the sectors, based on the addresses which are pre-formatted in a recording medium. Hence, a starting point of a sector always coincides with a top portion of an area which is specified by an address.

However, the recording medium described above according to the present invention, since there is not a one-to-n relationship (where n is a positive integer) between sectors and addresses, it is not possible to record data in or reproduce data from the recording medium according to the present invention with a recording apparatus or reproducing apparatus intended for prior art recording medium.

A recording apparatus or reproducing apparatus for the recording medium according to the present invention specifies a position of each sector based on the data mentioned above which are recorded on the recording medium.

The present invention provides an effect that it is possible to realize a recording apparatus or reproducing apparatus for recording medium which is capable of specifying a position of a sector on the recording medium according to the present invention and recording data in or reproducing data from the specified sector.

The "control apparatus for recording medium" includes a recording apparatus for recording medium, a reproducing apparatus for recording medium and a recording and reproducing apparatus for recording medium.

The "head part" generally refers to an interface part, including a recording head, a reproduction head and recording and reproducing head for magnetic disk and the like, a recording lens for optical disk (including a magneto-optical disk and a phase-transition optical disk) and the like, and an optical pickup, for recording data in a recording medium and reproducing data from a recording medium.

It is only necessary to record at least one piece of data among a sector number or segment number of a starting point of each zone and the number of segments per sector within each zone.

A recording medium in which a sector number at a starting point of each zone is recorded in a recording medium utilizing zoning, in general. However, a recording medium in which a data bit count. per segment is recorded may be a recording medium utilizing zoning or a recording medium which does not utilize zoning.

A disk drive which is a recording and reproducing apparatus for a disk medium utilizing zoning for instance controls the location of a head part on the disk medium based on the number of segments per sector in each zone or the like.

A disk drive which is a recording and reproducing apparatus for a disk medium which does not utilize zoning for instance controls the location of a head part on the disk medium based on a data bit count per segment which is defined for every track number.

The twenty-second invention is directed to the control apparatus for recording medium of the nineteenth invention, comprising: an oscillator; a phase lock part which has a frequency divider, which frequency-divides an output signal from the above-mentioned oscillator at a frequency divide ratio which is derived based on information, regarding a data bit count per segment or a frequency divide ratio of the above-mentioned oscillator read out from the above-mentioned recording medium, and which synchronizes the above-mentioned output signal from the above-mentioned oscillator to the above-mentioned segments; and a signal processing part which records data in the above-mentioned recording medium or reproduces data from the above-mentioned recording medium by using a clock signal which is based on the above-mentioned output signal from the above-mentioned oscillator.

In the control apparatus for recording medium according to the present invention, the volume of data (clock signal) to be recorded or reproduced is changed between segments.

The oscillator which provides a reference is incorporated within the control apparatus for the recording medium according to the present invention, and as the output signal from the oscillator is frequency-divided based on the volume of data per segment read out from the recording medium, synchronization is attained and it is therefore possible to easily obtain a clock signal which is proper to each segment.

The present invention has an effect that it is possible to provide a control apparatus which is suitable to the recording medium according to the present invention but yet has a simple structure.

The twenty-third invention is directed to a recording apparatus for recording medium of the control apparatus for recording medium of the nineteenth invention, comprising: a defect position specifying part which specifies a defective segment based on information reproduced from the above-mentioned recording medium; and a sector assigning part which, when the above-mentioned defect position specifying part determines that one sector contains a defective segment, additionally assigns the same number of segments as defective segments or a larger number of segments than defective segments to the above-mentioned sector which contains the above-mentioned defective segment.

Upon detection of a defective segment or defective bit, a prior art control apparatus determines that the defective segment as a whole or a sector as a whole which contains the defective segment is defective and abandons use of the sector as a whole.

However, it is too wasteful to abandon the sector as a whole (having a size of 32 kB for instance) only because of just one defective segment (having a size of 100 bytes for instance) or just one defective bit.

A disk drive according to the present invention finds a defective segment contained in a sector, by recording data in one sector, reproducing the same and comparing the two, etc. Upon detection of a defective segment, a recording area to complement this is added and assigned to this sector.

This permits to functionally recover the sector which contains the defective segment, and to record data in or read out data from this sector normally.

The present invention has an effect that it is possible to realize a disk drive which is capable of recovering a function of a sector even when a defective segment is created, without causing any waste.

The twenty-fourth invention is directed to a recording apparatus for recording medium of the control apparatus for recording medium of the nineteenth invention, comprising: a detector part which detects a defective segment; and a re-arranging part which re-arranges the above-mentioned sectors on the above-mentioned recording medium when the above-mentioned detector part detects a defective segment.

A recording apparatus according to the present invention finds a defective segment contained in a sector, by recording data in one sector, reproducing the same and comparing the two, etc. Upon detection of a defective segment, a new segment to complement this is added and assigned to this sector (The length of this sector becomes long (or the angle becomes large).).

This permits to functionally recover the sector which contains the defective segment, and to record data in or read out data from this sector normally.

When the length of this sector becomes long, it becomes necessary to shift positions of the subsequent sectors backward.

Noting this, upon detection of a defective segment, the recording apparatus according to the present invention newly assigns a replacement segment to a sector which contains the defective segment and shifts positions of the subsequent sectors backward (i.e., re-arranges).

"Re-arrangement of sectors" means to re-determine already determined positions of sectors once again.

The present invention has an effect that it is possible to realize a disk drive which is capable of recovering a function of a sector even when there is no defective segment (There is no spare segment provided.) and even when a defective segment is created, without causing any waste.

As described above, in a prior art recording medium, in general, one address is pre-formatted on the recording medium for a recording area in which data of one sector are recorded. The data of one sector are recorded in a recording area which is defined by this address.

The present invention has an effect that it is possible to realize a high-recording density recording medium with a short search time, owing to a flexible relationship between sectors and addresses. A major effect is achieved particularly in such a recording medium in which addresses are pre-formatted on the recording medium (which means that a user can not change positions of the addresses on the recording medium).

In a prior art recording medium, each sector comprises one pre-formatted address and a relationship between sectors and addresses is fixed by hardware. For instance, one address is formed as a pre-pit on the recording medium for each sector. The present invention is based on a new concept to replace a fixed relationship between sectors and addresses required by the prior art technique with a variable relationship.

In a prior art recording medium, a recording area in which information of one sector is recorded can be specified using the addresses as units. In the recording medium according to the present invention, it is possible to freely determine a recording area in which information of one sector is recorded using segments as units, and therefore, there is no one-to-one relationship (or one-to-n (where n is a positive integer)) between sectors and addresses. A segment is a minimum recording area on a recording medium as described above, and in the recording medium according to the present invention, one address contains a plurality of segments. If one address contains only one segment, such a recording medium is not within the technical scope of the present invention. For example, in a prior art recording medium wherein one address contains k segments, one sector which holds a one-to-n relationship with addresses also contains k segments.

As described above, in a prior art recording medium, units for recording are sectors and addresses.

Since it is necessary to distribute about 1000 pairs of the wobble pits per one round (an angle of 360 degrees) in an optical disk for the purpose of performing sampling servo of the optical disk, it is not sufficient only to arrange the wobble pits in merely about a few dozens of address pit areas per one round of the optical disk, and therefore, a large number of wobble pits are distributed between two adjacent addresses (that is, within a recording track which is specified by one address).

Each piece of the recording track divided by the wobble pit areas is called a segment. Alternatively, a start pit or the like is provided in each segment, a wobble pit detection window signal is generated, and a clock for reading recorded data is generated. As described above, prior art segments are not grasped by a concept of a starting point or an end point of recording of data, but instead grasped merely as areas for sampling servo or generation of a clock for reading data.

In contrast, in the recording medium according to the present invention, any segment can be a starting point or an end point of a sector. Hence, sectors do not need to have no one-to-one relationship (or one-to-n (where n is a positive integer)) with addresses. In the recording medium according to the present invention, therefore, one- sector has a length (or angle) which is different from a length which is obtained by multiplying the length (or angle) of one address by n (where n is an integer which is equal to or larger than 1).

Stored as management data are position information regarding the top segment of a sector, position information regarding the very last segment of a sector, or position information regarding the top segment of a sector and information regarding the number of segments contained in one sector. The management data are preferably recorded in the recording medium itself. Therefore, even when a data recording apparatus which recorded data in the recording medium is a separate apparatus from a data reproducing apparatus which reproduces data from the recording medium, it is possible to correctly reproduce data with the data reproducing apparatus based on data which express a relationship between sectors and segments recorded in the disk.

The recording medium according to the present invention is a disk medium for instance. A disk medium is applicable to a disk of any one of the CAV (Constant Angular Velocity) method and the CLV (Constant Linear Velocity) method. The recording medium according to the present invention comprises sectors (sectors containing the same number of segments, for example) all of which have the same length (or angle) and each of which has a different length (or angle) from a length which is obtained by multiplying the length (or angle) of one address by n (where n is an integer which is equal to or larger than 1).

Alternatively, other recording medium according to the present invention may be disk-shaped and comprise sectors having different lengths (or angles) in accordance with the radius direction of the disk, one of which has a different length (or angle) from. a length which is obtained by multiplying the length (or angle) of one address by n (where n is an integer which is equal to or larger than 1). Among these may be a sector whose length (or angle) is the length (or angle) of one address multiplied by n (where n is an integer which is equal to or larger than 1).

Other recording medium according to the present invention may comprise a plurality of zones. For example, each sector has the same length (or angle) within each zone, sectors belonging to different zones have different lengths (or angles), and in a certain zone, one sector has a different length (or angle) from a length which is obtained by multiplying the length (or angle) of one address by n (where n is an integer which is equal to or larger than 1).

In a certain zone, each sector may have a length (or angle) which is the length (or angle) of one address multiplied by n. The present invention is applicable to a disk medium of the ZCAV method or the ZCLV method for instance.

If one sector on a disk medium has a different length (or angle) from a length which is obtained by multiplying the length (or angle) of one address by n, this is within the technical scope of the present invention. Hence, it is not necessary that all sectors have a different length (or angle) from a length which is obtained by multiplying the length (or angle) of one address by n. Even when some sectors have a length (or angle) which is the length (or angle) of one address multiplied by n, if the other sectors have a different length (or angle.) from a length which is obtained by multiplying the length (or angle) of one address by n, such is within the technical scope of the present invention.

"Address" is unique position information which is recorded on a disk medium and specifies a position of the disk medium. An example is position information such as the 2354-th address. Relative position information, such as "four segments" at "a point four segments toward an outer round from a certain point," is not included.

"The length (or angle) of an address" means a pitch between two adjacent pieces of address data (data regarding addresses), and is expressed in units of the number of segments for instance. In the event that there is one piece of address data recorded covering 80 segments for example (The length (or angle) of an address is 80 segments.), the address data may be recorded in one segment at the top for instance but the address data may not be recorded in the following 79 segments after the top segment, and the address data comprised of 80 bits may be recorded one bit each in the 80 segments.

Alternatively, a dedicated address area, which is a separate area from a segment area, may be disposed one each for 80 segments, the address data may be recorded in each address area, and the address data may be recorded by any other desired method.

The "length" means a length of a recording track which forms one sector or address measured along the longitudinal direction of the recording track. The "angle" means an angle of a recording track which forms one sector or address measured along the longitudinal direction of the recording track in polar coordinates whose origin is the center of a disk.

While the novel features of the present invention are those particularly pointed out in the attached claims, the present invention, both in terms of structure and content, will be more apparently understood and appreciated, together with other objects and features, when taken in conjunction with the following detailed description which would be understood with reference to the associated drawings.

BRIEF DESCRIPTION OF DRAWINGS

Part (a) of FIG. 1 shows a general overall structure of an optical disk according to an embodiment 1, parts (b) and (c) of FIG. 1 are schematic expanded views of a segment of the optical disk;

FIG. 3 is a drawing which shows an address format in the optical disk according to the embodiment 1;

FIG. 4 is a block diagram of an address demodulator of a recording apparatus or reproducing apparatus for the optical disk according to the embodiment 1;

FIG. 5 is a drawing which shows the timing of an address demodulator of a recording apparatus or reproducing apparatus for the optical disk according to the embodiment 1;

FIG. 7 is a cross sectional view which shows a structure of the optical disk according to the embodiment 1;

Figure 9:
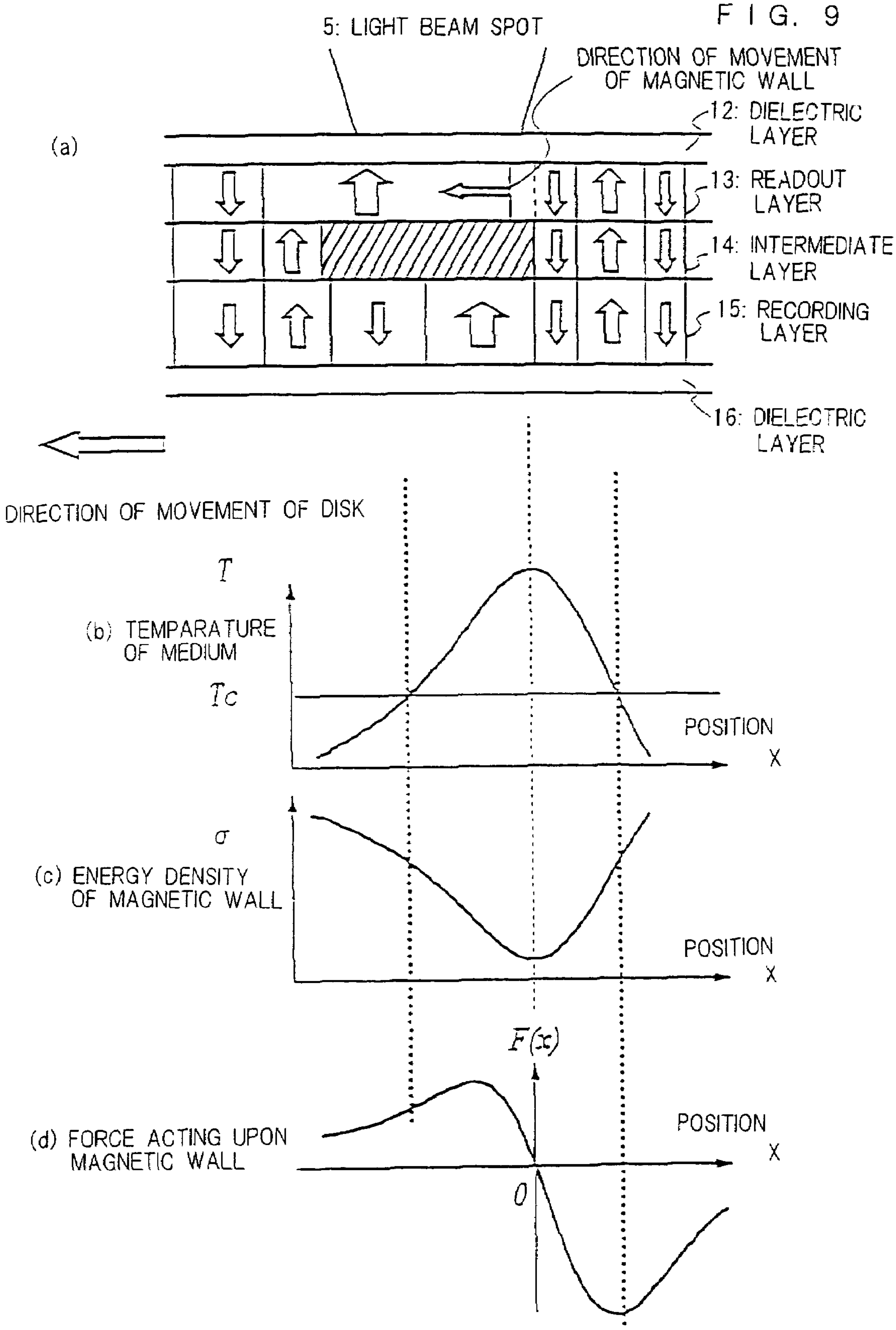
Figure 13:
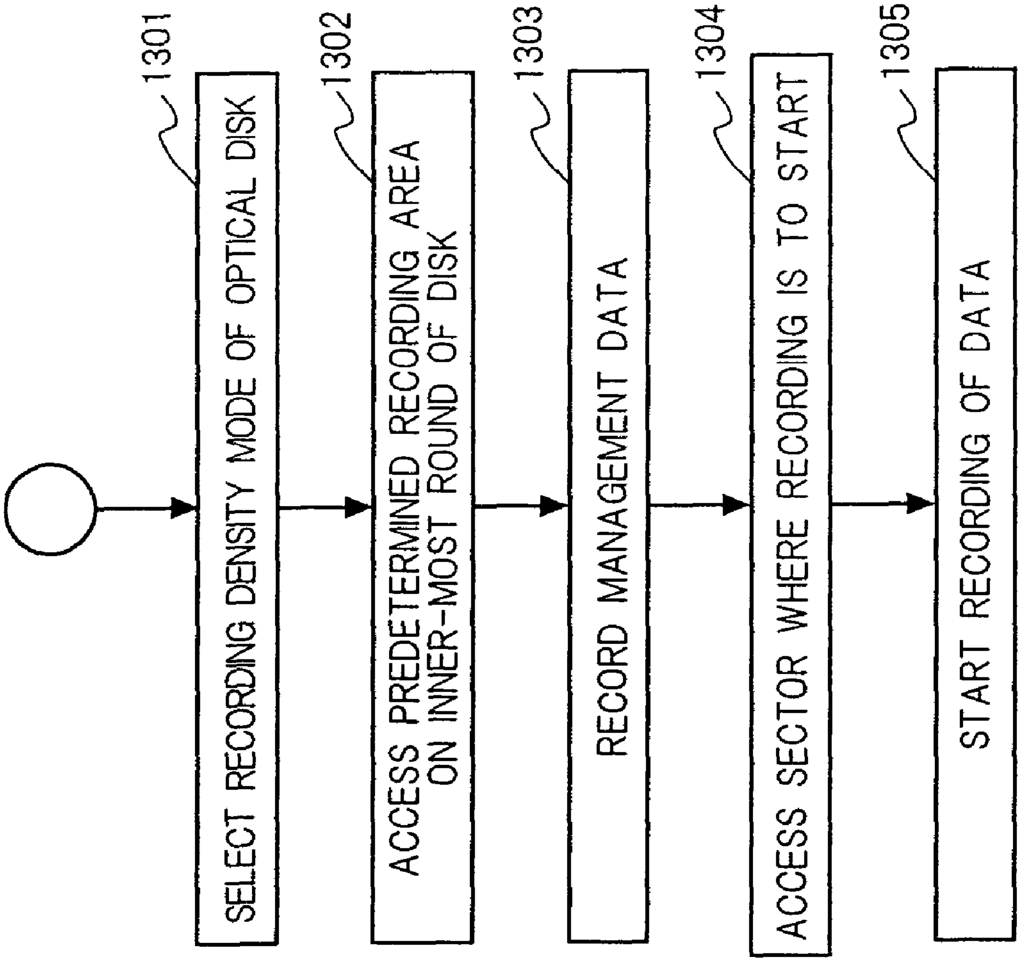
Figure 18:
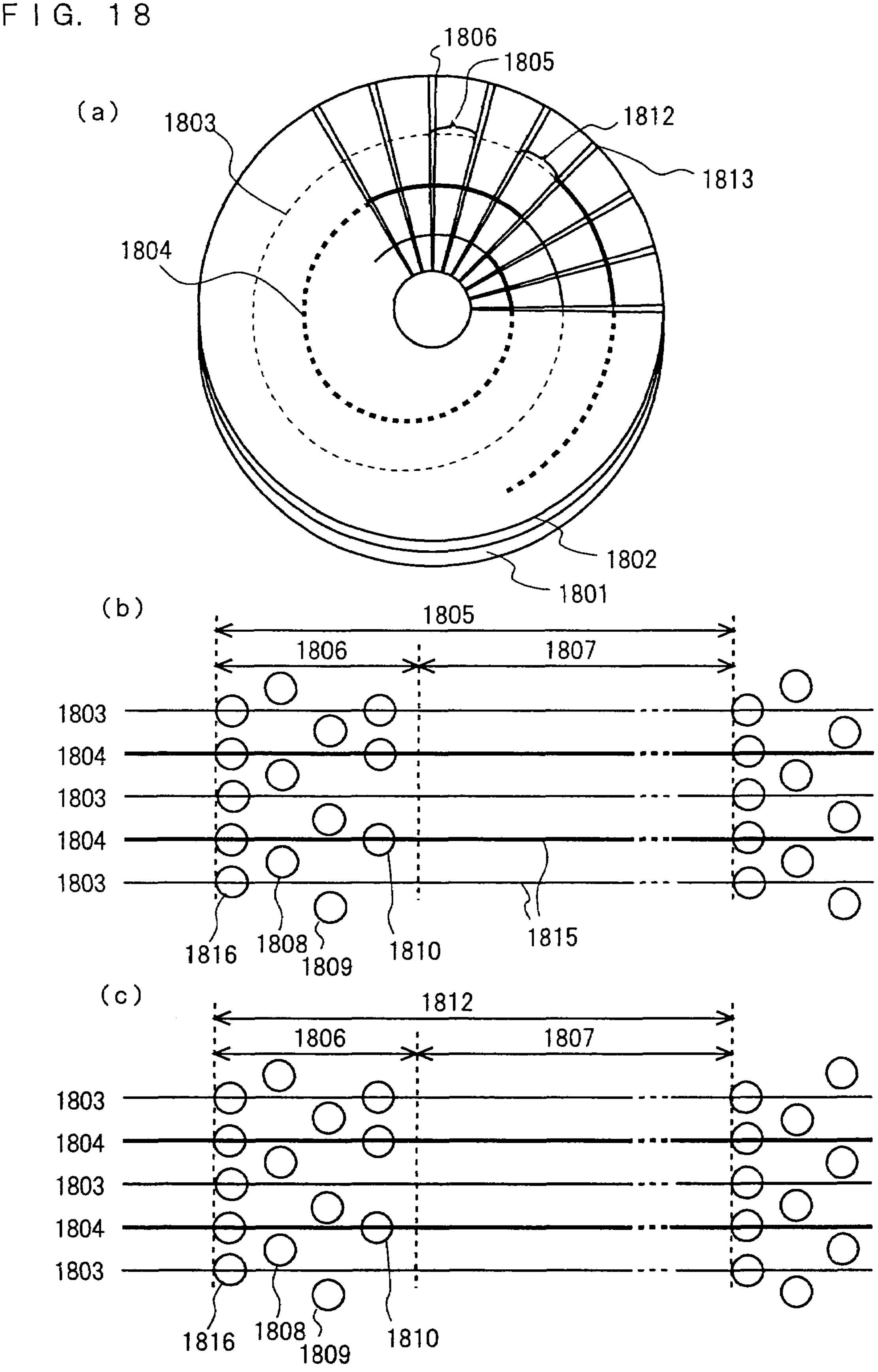
Figure 23:
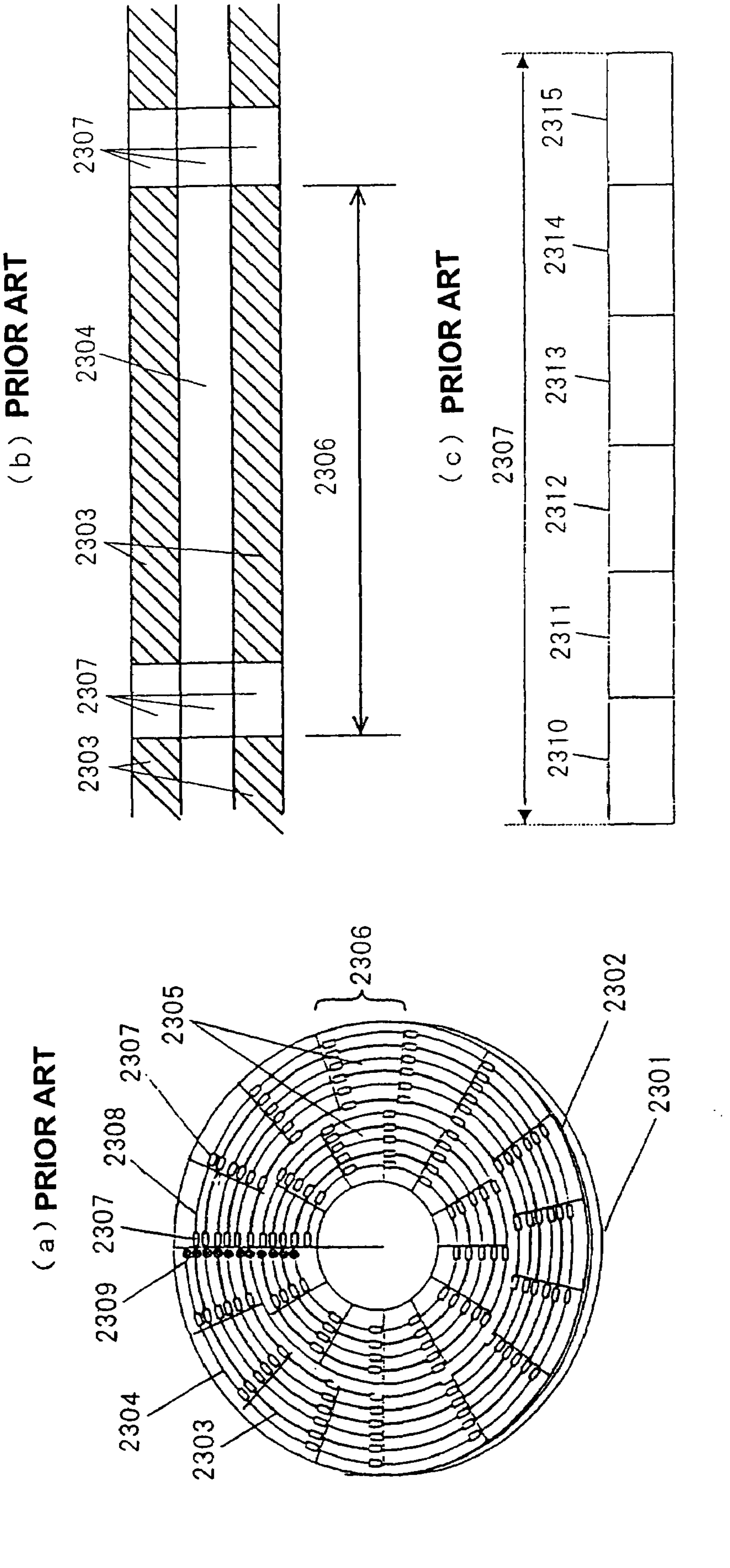

Part (a) of FIG. 9 shows the cross section of a recording film of the optical disk according to the embodiment 1, part (b) of FIG. 9 is a drawing which shows a relationship between a position x and a temperature T of the recording film corresponding to the cross sectional view in (a), part (c) of FIG. 9 is a drawing which shows a magnetic energy distribution, and part (d) of FIG. 9 is a drawing which shows force F which drives a magnetic wall at the position x;

FIG. 10 is a drawing which shows a change occurring in a magnetic domain within a recording film in accordance with relative movement of the magneto-optical disk according to the embodiment 1;

FIG. 11 is a block diagram of a recording apparatus for the optical disk according to the embodiment 1;

FIG. 12 is a block diagram of a reproducing apparatus for the optical disk according to the embodiment 1;

FIG. 13 is a flow chart which shows a method of recording in the optical disk according to the embodiment 1;

FIG. 14 is a flow chart which shows a method of recording in or a method of reproducing from the optical disk according to the embodiment 1;

FIG. 15 is a drawing which shows a data format in a sector in an optical disk according to the embodiment 2;

FIG. 16 is a block diagram of a write/read control part of a recording apparatus or reproducing apparatus for the optical disk according to the embodiment 2;

FIG. 17 is a drawing which shows a flow chart of write/read control by means of software in a recording apparatus or reproducing apparatus for the optical disk according to the embodiment 2;

Part (a) of FIG. 18 shows a general overall structure of an optical disk according to an embodiment 3, part (b) of FIG. 18 is a schematic enlarged view of a segment in the optical disk, and part (c) of FIG. 18 is a schematic enlarged view of a segment at a switching point;

Part (a) of FIG. 19 shows a general overall structure of an optical disk according to an embodiment 4, and part (b) of FIG. 19 is a schematic enlarged view of a segment in the optical disk;

Part (a) of FIG. 20 shows a general overall structure of an optical disk according to an embodiment 5, and part (b) of FIG. 20 is a schematic enlarged view of a segment in the optical disk;

Part (a) of FIG. 21 shows a general overall structure of an optical disk according to an embodiment 7, and part (b) of FIG. 21 is a schematic enlarged view of a segment in the optical disk;

Part (a) of FIG. 22 shows a general overall structure of an optical disk according to an embodiment 6, and part (b) of FIG. 22 is a schematic enlarged view of. a segment in the optical disk;

Part (a) of FIG. 23 shows a general overall structure of an optical disk according to a prior art example 1, part (b) of FIG. 23 is an enlarged view of a segment in the optical disk, part (c) of FIG. 23 is a drawing which shows a schematic structure of an address in the optical disk; and Part (a) of FIG. 24 is a drawing which shows a general overall structure of an optical disk according to a prior art example 2, part (b) of FIG. 24 is an enlarged view of a sector in the optical disk, part (c) of FIG. 24 is an enlarged view of a segment 2416 in the optical disk, and part (d) of FIG. 24 is a drawing which shows a general overall structure of an address 2407 in the optical disk.

It is to be noted that some or all drawings show an overview for the purpose of illustration and do not necessarily depict relative sizes, positions and the like of elements.

Figure 25:
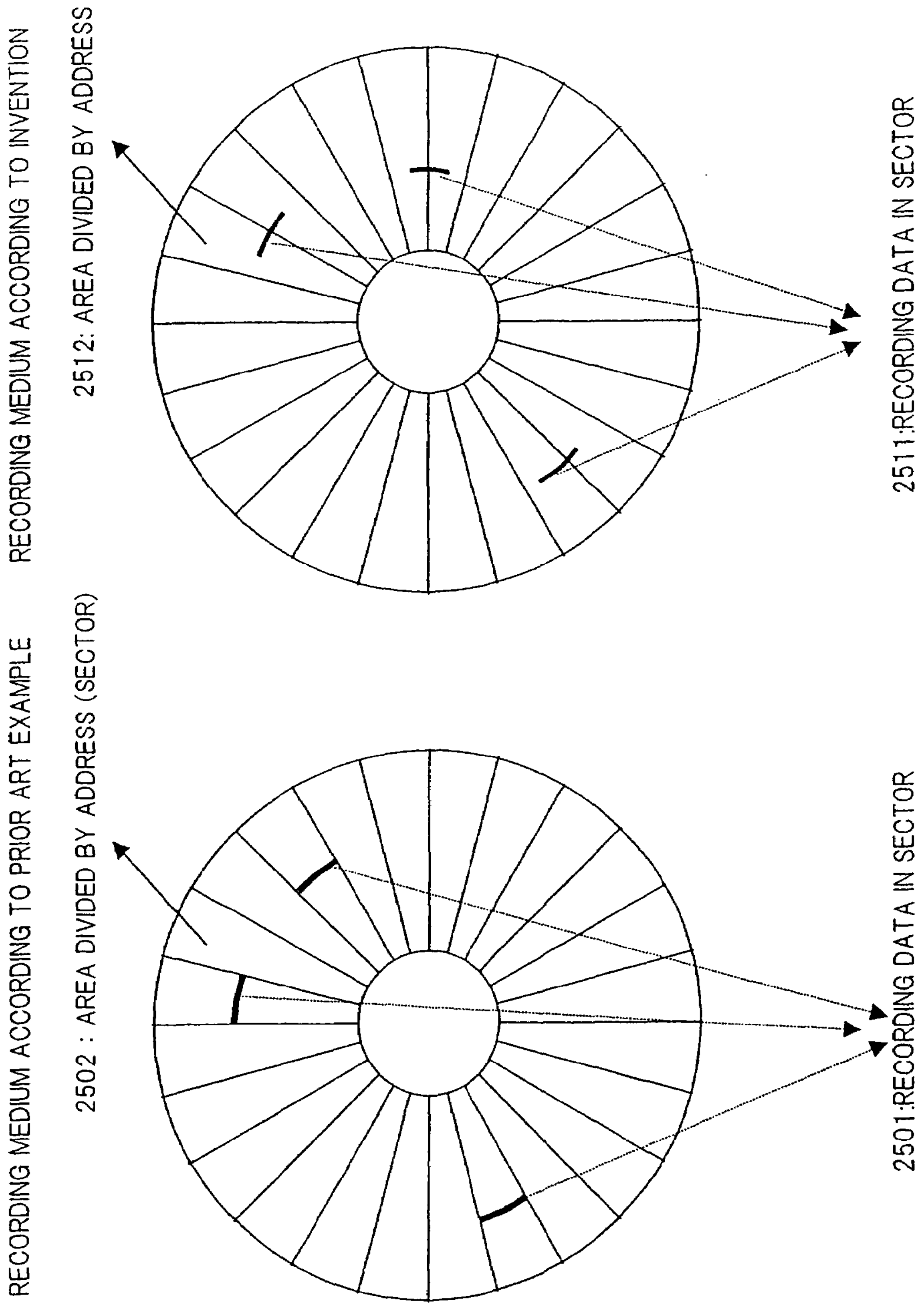

Part (a) of FIG. 25 is a drawing which shows a relationship between addresses and sectors in a recording medium according to a prior art example, and part (b) of FIG. 25 is a drawing which shows a relationship between addresses and sectors in the recording medium according to the present invention.

BEST MODE FOR CARRYING OUT THE INVENTION

The objects above are achieved by the present invention which will be described below.

While embodiments which specifically represent the best mode for implementing the present invention will now be described in the following, the present invention is not limited to the embodiments below as long as the present invention does not deviate from the intention of the invention.

<<Embodiment 1>>

FIGS. 1 through 14 show a magneto-optical disk and a recording apparatus, a reproducing apparatus, a recording method or a reproduction method according to the embodiment 1 of the present invention.

While the embodiments herein described are directed to a magneto-optical disk and a recording apparatus, a reproducing apparatus, a recording method or a reproduction method for the same, applications of the present invention are not limited to a magneto-optical disk, and applications to any desired recording medium are possible.

<Description of Overall Structure of Magneto-Optical Disk (FIG. 1)>

Part (a) of FIG. 1 shows a general overall structure of a magneto-optical disk according to an embodiment 1 of the present invention.

In part (a) of FIG. 1, denoted at 101 is an optical disk substrate, denoted at 102 is a recording film (a reproduction layer 13, an intermediate layer 14 and a recording layer 15 in FIG. 7), denoted at 103 is a first recording track, denoted at 104 is a second recording track which is next to the first recording track, denoted at 105 are segments obtained by dividing the first recording track 103 and the second recording track 104 into 1280 pieces, denoted at 106 and 113 are pre-pit areas (pre-formatted areas) which contain servo pits for tracking and address pits which express position information on a disk. As shown in the drawing, the first recording track 103 and the second recording track 104 are spiral areas which start and end at the pre-pit areas: When the spiral recording tracks are traced from an inner round toward an outer round of the magneto-optical disk, the second recording track 104 ends at the pre-pit areas 113, and the first recording track 103 starts where the second recording track 104 ends (the pre-pit areas 113).

In part (a) of FIG. 1, while the magneto-optical disk is a disk whose diameter is about 50 mm, a track pitch between the first recording track 103 and the second recording track 104 is about 0.6 μm. In part (a) of FIG. 1 which aims at describing a format structure of the magneto-optical disk, as compared to the size of the magneto-optical disk as a whole, the first recording track 103 and the second recording track 104 which are next to each other are shown as they are extremely enlarged.

Part (b) of FIG. 1 is a schematic enlarged view of one segment 105. In part (b) of FIG. 1, denoted at 105 is a segment (which is comprised of one recording track and one pre-pit area), denoted at 106 is a pre-pit area (pre-formatted area), and a ditch portion (groove portion) 111 (2*a*, 2*b* in FIG. 7) having a length 107 is a recording track (data recording area) for recording data. The pre-pit area 106 comprises wobble pits 108 and 109 for detecting a tracking signal and address pits 110 in which address information expressing position information on the magneto-optical disk is distributed one bit each at the beginning of a segment.

The magneto-optical disk according to the present invention comprises the recording tracks 103, 104 and the like which are formed in a spiral shape, the recording tracks 103, 104 and the like are divided each into 1280 pieces of segments 105 by the pre-pit areas 106 which are radially provided (along the radius direction of the magneto-optical disk). The pre-pit areas 106 in the respective segments are aligned in the radius direction of the magneto-optical disk. Hence, when expressed in angular coordinates whose origin is the center of the magneto-optical disk, the pre-pit areas are located at every 360 degrees/1280 pieces=0.28125 degree on the magneto-optical disk, regardless of distances of positions of the recording tracks from the origin. One segment 105 comprises one pre-pit area 106 and a ditch portion 111 which is one data recording area.

The magneto-optical disk according to the present invention is made on an assumption that optical constants of a light spot which is used for recording/reproduction are an optical wavelength of 660 nm and a condenser lens NA of 0.6. A half width value of a light beam in this case is $\lambda/(2 \cdot NA)$=about 0.6 μm. Considering a margin which is needed to eliminate an influence by cross light from a adjacent track during recording, deforcus, tilting of the disk, etc., the track pitch is set to 0.6 μm. Further, the depth of the ditch portion 111 is set to 52 nm (about $\lambda/(8n)$) which is such a depth that permits reproduction of a signal by the DWDD scheme because of mutual magnetic blocking between adjacent ditch portions and that ensures about 60% of reflected light from the recording tracks provided in the ditch portions (assuming that reflected light from a flat surface which does not have concaves or convexes is 100%). The wobble pits 108 and 109 and the address pits 110 are formed to have the same depth as that of the ditch portion 111.

For the purpose of realizing tracking servo in a magneto-optical disk in which a track pitch is equal to or smaller than a half width value of a light beam, in the magneto-optical disk according to the present invention, the wobble pits 108 and 109 for tracking are formed in the pre-pit areas 106 and either the wobble pits 108 or 109 are shared by adjacent recording tracks. Based on such a structure, the first recording track 103 and the second recording track 104 are provided alternately each other each round which have different tracking polarities (with the wobble pits 108 and 109 located one on the right-hand side and the other on the left-hand side to extension of the recording track in one case, and with the wobble pits 108 and 109 located one on the left-hand side and the other on the right-hand side thus in the opposite manner in other case). Segments 112 where the first recording track and the second recording track switch with each other have such a structure as that shown in part (c) of FIG. 1. As shown in the drawing, in the pre-pit areas 106 on the right-hand side and the other on the left-hand side to the recording track of the switching point segment 112, the fore-and-aft relationship between the wobble pits 108 and 109 is reversed. As a result, the second recording track 104 switches to the first recording track 103. This is repeated alternately, whereby the first recording track 103 and the second recording track 104 are disposed continuously.

While the present invention is effective to any desired recording medium, the present invention is further appropriately applied to an optical disk utilizing a super resolution reproduction method, such as a magneto-optical recording medium of the DWDD type (or the CAD type, the FAD type or the RAD type), since an improved capability of a recording medium and application of the present invention realizes an improvement in recording density of the recording medium having an existing format without changing the value $\lambda/(2 \cdot NA)$, and therefore, a DWDD recording/reproduction film is used as the recording film 102 in this embodiment. The DWDD scheme will now be briefly described.

<Description of DWDD Scheme (FIG. 7 Through FIG. 10)>

Figure 8:
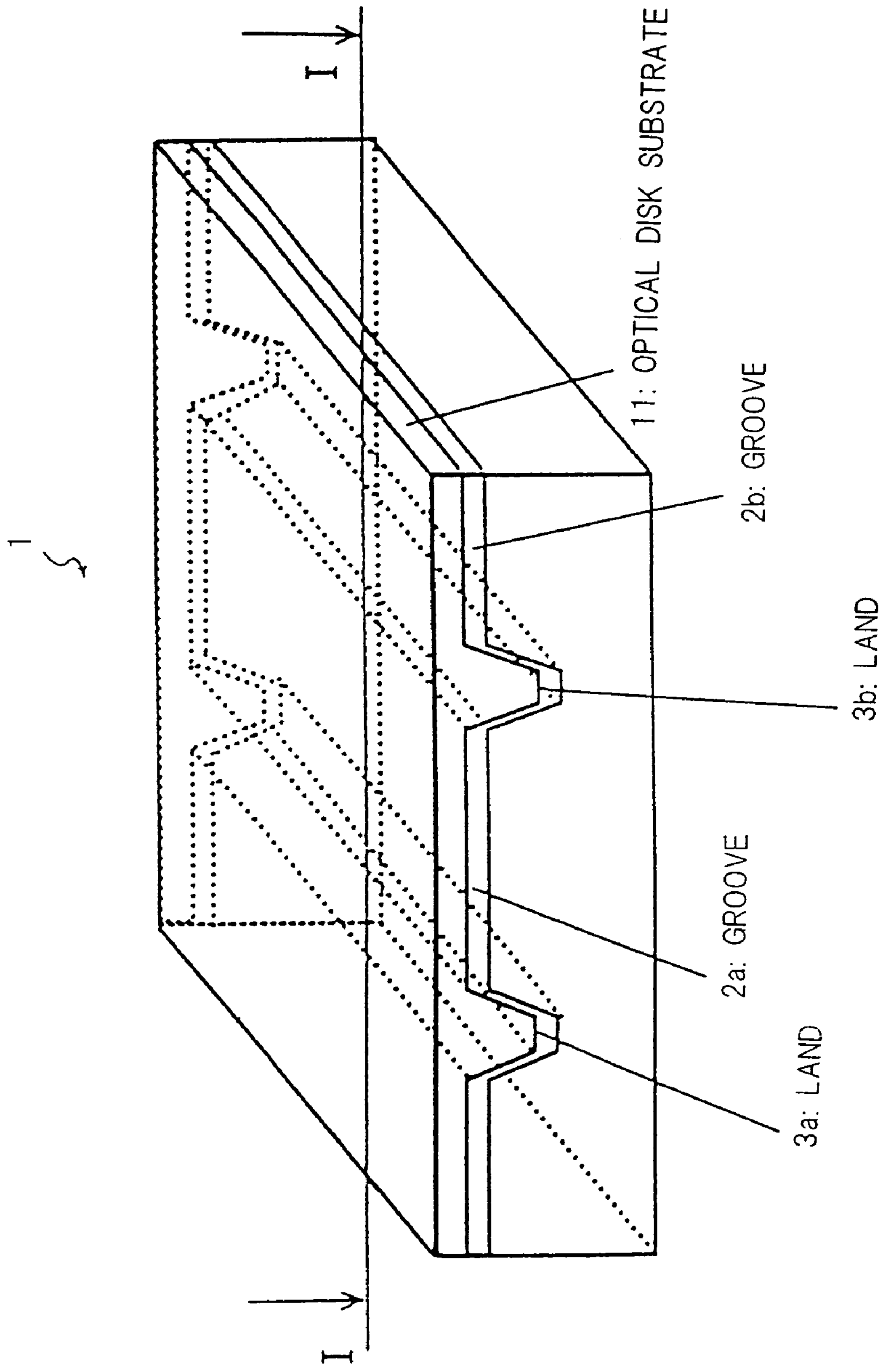
FIG. 8 is a perspective view which shows the structure of the optical disk according to the embodiment 1.

FIG. 7 is a cross sectional view which shows a structure of the magneto-optical recording medium (magneto-optical disk) according to the embodiment 1 of the present invention which is a magneto-optical disk from which it is possible to reproduce by the DWDD scheme, and FIG. 8 is a perspective view which shows the structure of the magneto-optical recording medium according to the embodiment 1 of the present invention.

FIG. 7 is a cross sectional view of the magneto-optical disk (magneto-optical recording medium) which has a disk-like shape, as it is cut along the radius direction. Recording tracks comprised of ditch portions (groove portions) 2*a* and 2*b* extend, side by side, in a direction which is perpendicular to the plane of FIG. 7, and said recording tracks extend radially from an inner round toward an outer round of the magneto-optical disk. FIG. 7 is a cross sectional view of FIG. 8 as it is taken along the I—I section.

Denoted at 2*a* and 2*b* are the ditch portions (the groove portions) and denoted at 3*a* and 3*b* are land portions. The groove portions 2*a* and 2*b* have a depth of 60 nm. The land portions 3*a* and 3*b* are magnetically independent of each other, because of the groove portions 2*a* and 2*b*. The track pitch is 0.6 μm and a width of the groove portion is 0.4 μm in the magneto-optical disk 1 according to the embodiment 1.

As shown in FIG. 7, the magneto-optical recording medium 1 according to the embodiment 1 comprises a recording film in which a number of layers including the magnetic film described above are stacked, on an optical disk substrate 11. In FIG. 7, denoted at 11 is a transparent optical disk substrate of polycarbonate, and denoted at 12 is a dielectric layer for protection of the recording film and adjustment of an optical characteristic of the medium. A reproduction layer 13, which is for detection of information utilizing movement of a magnetic wall, an intermediate layer 14, which is for control of a switched connection between the reproduction layer and a recording layer, and the recording layer 15 which holds information form the stacked recording film. Further, denoted at 16 a dielectric layer for protection of the recording film, and denoted at 17 is an overcoat layer.

The magneto-optical recording medium according to the embodiment 1 shown in FIGS. 7 and 8 has a structure which is applicable to reproduction of information of the DWDD type (Domain Wall Displacement Detection) according to which magnetic walls coming under a reproduction light beam are moved one after another and information in a magnetic domain of the reproduction layer thus enlarged by the movement of the magnetic walls is detected so that super resolution reproduction beyond a detection limit, which is determined by the wavelength of the reproduction light and the numerical aperture of an object lens, is realized. The recording film of the magneto-optical recording medium according to the embodiment 1 may be other magnetic film which permits reproduction of information by the DWDD scheme. As described in Japanese Patent Application Laid-Open No. 6-290496 for example, the recording film of the magneto-optical recording medium according to the embodiment 1 may comprise a recording layer which is a magnetic film which has large interface coercivity, a reproduction layer which is a magnetic film which has small interface coercivity with which it is possible to move a magnetic wall, and an intermediate layer for switching which is a magnetic film which has a relatively low Curie temperature.

Principles of reproduction by the DWDD scheme mentioned above will now be described with reference to FIGS. 9 and 10.

Part (a) of FIG. 9 is a drawing which shows a cross section of a recording film of a rotating disk. A recording film comprised of three layers of a reproduction layer 13, an intermediate layer 14 and a recording layer 15 is formed on a substrate (not shown) and a dielectric layer 12, and a dielectric layer 16 is further formed on this, and a protective coat layer (not shown) of an ultraviolet hardening resin is further formed on this. The reproduction layer is made of a magnetic film material having small magnetic wall coercivity, the intermediate layer is formed by a magnetic film having a low Curie temperature, and the recording layer is formed by a magnetic film which can hold a recording magnetic domain even at a small domain diameter.

As shown in the drawing, an information signal is generated as a recording magnetic domain which is thermomagnetically recorded in the recording layer. Since the reproduction layer, the intermediate layer and the recording layer are strongly connected with each other through switched connections in the recording film which is at a room temperature without irradiated with a laser light spot (light beam spot 5), the magnetic domain of the recording layer is transferred as it is onto the reproduction layer, whereby a transferred magnetic domain is formed in the reproduction layer. During reproduction of a recording signal, the magneto-optical disk (the magneto-optical recording medium) rotates and is irradiated with a reproduction beam spot by laser light along tracks.

Assuming that the magneto-optical disk is fixed, the light beam spot 5 moves relatively from the left-hand side toward the right-hand side in FIG. 9 (in a direction from negative to positive on an x-axis). At this stage, the recording film exhibits a temperature distribution as that shown in part (b) of FIG. 9 (with the x-axis located along the tracks of the magneto-optical disk) wherein there is a temperature zone in which the intermediate layer is at a Curie temperature Tc or higher temperature, and the intermediate layer blocks switched connections between the reproduction layer and the recording layer in this temperature zone.

Part (c) of FIG. 9 shows a distribution of a magnetic wall energy density σ which is dependent upon a temperature. Based on the gradient of the magnetic wall energy density σ shown in part (c) of FIG. 9, force F which drives magnetic walls acts upon magnetic walls of the respective layers at a position x as shown in part (d) of FIG. 9. The force F which acts upon the recording film is in proportion to differential of the magnetic wall energy density σ (part (c) of FIG. 9), and acts such that a magnetic wall will move from the high magnetic wall energy density σ side toward the low magnetic wall energy density σ as shown in part (d) of FIG. 9. In part (d) of FIG. 9, the force F acts in a negative-to-positive direction on the x-axis when $F(x)>0$, and acts in a positive-to-negative direction on the x-axis when $F(x)<0$.

Since the magnetic wall coercivity of the reproduction layer 13 is small and allows large mobility of a magnetic wall, in the reproduction layer 13 as it is alone comprising a magnetic wall which is not closed (in an area where the intermediate layer 14 exceeds the Curie temperature Tc), the force F easily moves a magnetic wall. Hence, an area in the reproduction layer 13 which is next to the area where the intermediate layer 14 exceeds the Curie temperature Tc is an approximately single and large magnetic domain. To said approximately single and large magnetic domain, information belonging to a magnetic domain which is immediately behind the area where the intermediate layer 14 exceeds the Curie temperature Tc is transferred.

Even when a recording magnetic domain in the recording layer 15 is extremely small, since a large magnetic domain which has the same size as that of area where the intermediate layer 14 exceeds the Curie temperature Tc is generated in the reproduction layer 13, a reproduction signal having a certain amplitude or larger amplitude is obtained.

FIG. 10 is a drawing which shows a change occurring in a magnetic domain associated with relative movement of the magneto-optical recording medium according to the embodiment 1 of the present invention.

In part (a) of FIG. 10, a recording magnetic domain 21*a* of the recording layer 15 is coupled with a transfer magnetic domain 21*c* of the reproduction layer 13 through a magnetic domain 21*b* of the intermediate layer 14. The magnetic domain 21*b* of the intermediate layer 14 is next to and in front of an area 19 exceeding the Curie temperature. In the reproduction layer 13 on the area exceeding the Curie temperature, as a magnetic wall of the transfer magnetic domain 21*c* moves, the transfer magnetic domain 21*c* expands onto the area exceeding-the Curie point. The light beam spot 5 reproduces the information of the transfer magnetic domain 21*c*.

Next, in part (b) of FIG. 10, the magneto-optical recording medium moves relative to the light beam spot, the recording magnetic domain 21*a* moves under the area exceeding the Curie temperature of the intermediate layer 14, and the magnetic domain of the intermediate layer 14 coupled with the recording magnetic domain 21*a* disappears. Instead, a recording magnetic domain 22*a* gets coupled with a transfer magnetic domain 22*c* of the reproduction layer 13 through a magnetic domain 22*b* of the intermediate layer 14. The magnetic domain 22*b* of the intermediate layer 14 is next to and in front of the area 19 exceeding. the Curie temperature. In the reproduction layer 13 on the area exceeding the Curie temperature, as a magnetic wall of the transfer magnetic domain 22*c* momentarily moves in a direction shown in the drawing, the transfer magnetic domain 22*c* expands. As a result, as shown in part (c) of FIG. 10, in the reproduction layer 13 on the area exceeding the Curie temperature, as a magnetic wall of the transfer magnetic domain 22*c* moves, the transfer magnetic domain 22*c* expands onto the area exceeding the Curie point.

<Method of Making Magneto-Optical Disk>

A method of fabricating the magneto-optical disk according to the embodiment 1 of the present invention will now be described.

While referring to FIGS. 1, 7 and 8, a method of manufacturing the magneto-optical recording medium according to the embodiment 1 will be described. First, the transparent optical disk substrate 11 of polycarbonate is formed which comprises pre-pits such as the groove portions, the land portions and the address pits. Transferred from a stamper at the time of injection, the wobble pits 108 and 109, the address pits 110 and the ditch portions 111 are formed in an optical disk substrate 101. On the polycarbonate substrate 101 molded by the injection method, the recording film 102 of the DWDD type is formed by a sputtering method. Inter-ditch portions (land portions) 114 (3*a* and 3*b* in FIG. 7) having a length 107 magnetically block the adjacent ditch portions from each other.

Next, a method of sputtering will be described. A B-doped Si target is set in a direct current magnetron sputtering apparatus, and after said optical disk substrate 11 is fixed to a substrate holder, a cryopump evacuates a chamber until a high degree of vacuum at 1×10−5 Pa or lower is realized inside the chamber. An Ar gas and an N2 gas are introduced into the chamber while continuing evacuation until 0.3 Pa is reached, and while rotating the substrate, an SiN layer is formed as the dielectric layer 12 into 80 nm by reactive sputtering.

While continuing evacuation in a similar manner, an Ar gas is introduced into the chamber until 0.4 Pa is reached, and while rotating the substrate, the reproduction layer 13 comprised of GdFeCoCr is formed into 30 nm using Gd, Fe, Co and Cr targets, the intermediate layer 14 of TbDyFe is formed into 10 nm using Tb, Dy and Fe targets, the recording layer 15 of TbFeCo is formed into 50 nm using Tb, Fe and Co targets on the dielectric layer 12 one after another by a DC magnetron sputtering method. Adjusting power at which each target is introduced, the film composition of each layer is adjusted to a desired film composition.

Next, a B-doped Si target is set, an Ar gas and an N2 gas are introduced into the chamber until 0.3 Pa is reached, and while rotating the substrate, the second dielectric layer 16 of SiN is formed as a film into 80 nm by a reactive sputtering method. Following this, on the dielectric layer 16, the overcoat layer 17 of a resin containing epoxy acrylate is dripped, applied by spin coating as a film having the thickness of 6 μm and irradiated by an ultraviolet ray lamp, thereby hardening said overcoat layer 17. The reproduction layer 13 of GdFeCoCr has a compensation composition temperature of 150 degrees Celsius and a Curie temperature of 270 degrees Celsius, the intermediate layer 14 of TbDyFe has a Curie temperature of 150 degrees Celsius, and the metal composition of rare earths is always dominant at the Curie temperature or lower temperature. The power at which each target is introduced is set such that the recording layer 15 of TbFeCo will have a compensation composition temperature of 80 degrees Celsius and a Curie temperature of 290 degrees Celsius, and the composition is accordingly adjusted.

As shown in FIGS. 7 and 8, in the magneto-optical disk made in the manner described above, the recording tracks 2*a* and 2*b* have shapes of grooves (ditch shapes) which are arranged side by side along the width direction, and the land portions 3*a* and 3*b* located at boundaries of the adjacent recording tracks 2*a* and 2*b* isolate the recording tracks 2*a* and 2*b* in which information is recorded from each other. The adjacent recording tracks 2*a* and 2*b* are thus magnetically isolated from each other by the land portions 3*a* and 3*b*, and therefore, since the respective groove portions in which information is recorded are independent of each other, a magnetic wall of a transfer magnetic domain of the reproduction layer can easily move inside the groove portions and it hence becomes possible to reproduce by the DWDD scheme described earlier.

In this embodiment, laser light whose wavelength λ is 660 nm and having the numerical aperture NA of 0.60 is used. Hence, when a conventional reproduction method (a reproduction method which is not of the DWDD type) is used, a detection limit is $\lambda/(2\cdot NA)=0.55$ through 0.60 μm. The magneto-optical recording medium according to the present invention permits reproduction by the DWDD scheme, and through an experiment, it was possible to reproduce a signal having a mark length of 0.1 μm.

<Description of Address Format (FIG. 3)>

Whether there is the address pit 110 expresses one bit of address data. This corresponds to the distributed address format according to the invention made by the inventors of the present invention (Japanese Patent Application Laid-Open No. 11-021885 and Japanese Patent Application Laid-Open No. 11-329265). The distributed address format will now be described with reference to FIG. 3. FIG. 3 shows only a pit portion, but does not show the ditch portions since the ditch portions are irrelevant to the following description. The tracks running one round on the magneto-optical recording medium is divided into 1280 segments, address bits each having one bit are assigned respectively to the pre-pit areas of the 1280 segments (There is an address pit or there is no address pit.).

Use of the distributed address format used in the embodiment 1 allows all segments on the disk to have the same physical structure, which in turn permits to realize easy management of recording and reproduction in units of segments, which is the gist of the present invention and has heretofore been impossible. The distributed address format will now be briefly described.

The 1280 pieces of segments 105 in one round on the disk are divided into 16, thereby generating address information (which is information based on whether there is an address pit or there is no address pit) which uses an address having 1280/16=80 bits as a unit. The 80-bit address information contains 7-bit segment management numbers (position information in the rotation direction) 301, 11-bit error detecting codes 302 for the segment management numbers, 16-bit track number information (track numbers of the recording tracks) 303 for the odd tracks 103, 15-bit BCH-coded error correcting information 304 for the track number information regarding the odd tracks, 16-bit track number information 305 regarding the even tracks 104, and 15-bit BCH-coded error correcting information 306 for the track number information regarding the even tracks.

From the segment information, angle information regarding the magneto-optical recording medium is obtained. The segment management numbers 301 and the error detecting codes 302 for the segment management numbers are aligned in the radius direction. The 16 segment management numbers 301 arranged in one round express 16 segment management numbers. With the number of segments counted from the 16 segments, it is possible to specify the segment number of any desired segment.

The segments aligned side by side in the radius direction from the inner-most track to the outer-most track have the same segment management numbers 301 and the same error detecting codes 302 for the segment management numbers, and hence, even when tracking control is not activated (i.e., even when seek is ongoing for instance), it is possible to detect the segment management numbers. Hence, even in a condition that tracking control is not activated, it is possible to detect the pre-pit area 113 which is at a switching point.

With tracking control executed and the track numbers 303 and 305 read out, position information along the radius direction is obtained. The track numbers 303 and 305 are used as search information for seek or the like on the disk. When there are the track number information 303 regarding the odd tracks 103 and the error correcting information 304 for the track number information regarding the odd tracks in a certain pre-pit area, in an adjacent pre-pit area, there are not the track number information 305 regarding the even tracks 104 or the error correcting information 306 for the track number information regarding the even tracks. In a similar manner, when there are the track number information 305 regarding the even tracks 104 and the error correcting information 306 for the track number information regarding the even tracks in a certain pre-pit area, in an adjacent pre-pit area, there are not the track number information 303 regarding the odd tracks 103 and the error correcting information 304 for the track number information regarding the odd tracks.

Among the 16 pieces of address information arranged in one round, address information containing the track number information 303 described above regarding the odd tracks 103 and the like and address information containing the track number information 305 regarding the even tracks 104 and the like alternate eight pieces each with each other in one round. This makes it possible to prevent unintended reading of the track numbers due to cross talk between the adjacent tracks. In addition, it is possible to accurately read the track numbers even when an on-track state is not possible. Although the magneto-optical disk according to the present invention requires control in which the location of the optical pickup is detected on the magneto-optical disk and the polarity of tracking is appropriately inversed since the polarity of tracking changes every round, timing control to this end is performed by means of detection of the segment management numbers 301.

Further, the seek action is performed based on the track numbers. A description will be now given on a method of reading the segment management numbers and the like and a position synchronization method along the rotation direction of the disk.

<Description of Demodulator for Address Pits (FIG. 4 and FIG. 5)>

FIG. 4 is a block diagram of an address demodulator which demodulates the address pits 110 using the optical disk according to the present invention. FIG. 5 is a timing chart of the address demodulator. A method of reproducing the address pits 110 on the optical disk according to the present invention will now be described with reference to FIGS. 4 and 5.

In FIG. 4, denoted at 401 is a pre-pit area front edge detector, denoted at 402 is an edge window generator, denoted at 403 is a voltage controlled oscillator (VCO), denoted at 404 is a frequency divider, denoted at 405 is a phase comparator, denoted at 406 is a micro computer, denoted at 407 is an address pit timing signal generator which outputs a timing pulse for judging whether there is an address pit, denoted at 408 is a judging unit which judges whether the address pit 110 is 1 or 0 (which latches reproduction data based on a clock which is matched with the position of the address pit), denoted at 409 is an 18-bit shift register, and denoted at 410 is a CRC error detector which detects an error in the content (the segment management number 301 and the error detecting code 302 for the segment management number) of the shift register 409.

Denoted at 411 is a 31-bit shift register which holds the track number information 303 and 305 and the error correcting information 304 and 306 for the track number information, denoted at 415 is a BCH error detector/corrector which performs error detection/correction on the track number information, denoted at 412 is a computing unit which converts from the segment management number 301 into the segment number, denoted at 414 is a segment counter, which counts the segments, denoted at 413 is a comparator which detects a segment synchronization error, and denoted at 416 is a gate.

A pre-pit signal is detected for the purpose of allowing the optical pickup (including a recording lens, too) to access a position of a sector in which recording is to be realized in the optical disk according to the embodiment 1. Reproduction data generated by converting the amount of reflected light from the optical disk into an electric signal and binarizing (digitizing) the same are a digital signal which corresponds to whether there is a pre-pit or not (i.e., an output signal from a binarizer 1107 shown in FIG. 11 which will be described later). This reproduction data are transmitted to the pre-pit area front edge detector 401, the phase comparator 405 and the judging unit 408. In parts (b) and (c) of FIG. 1, at the boundaries between the recording tracks which are the ditch portions and the flat pre-pit areas (excluding the pre-pits), the amount of reflected light changes.

A period of time during which the optical pickup moves passing the recording tracks (the ditch portions 111 in part (b) of FIG. 1) (i.e., a period of time from a rear edge to a front edge of the pre-pit area) is the longest period during which the amount of reflected light remains at a low level because of diffraction from the ditches. Based on this longest period (a unique period of time which can be distinguished from other signals), the pre-pit area front edge detector 401 detects the front edge of the pre-pit area and transmits a front edge signal to the edge window generator 402 and the address pit timing signal generator 407. The edge window generator 402 receives the front edge signal, generates a window signal having a constant width spanning with the front edge serving as the center, and outputs the same.

The voltage controlled oscillator (VCO) 403 outputs an oscillator output signal which will be fed to a clock input terminal of the frequency divider 404 and the address pit timing signal generator 407. The frequency divider 404 frequency-divides the oscillator output signal thus fed to the clock input terminal at a constant frequency divide ratio (which is 1/325 in the embodiment 1), and outputs a frequency-divided signal.

The phase comparator 405 receives said reproduction data, the frequency-divided signal outputted from said frequency divider 404 and the window signal outputted from the edge window generator 402, compares the phases of the output signal of said reproduction data with the frequency-divided signal outputted from said frequency divider 404 over a window width of the window signal, and outputs a phase error signal. The phase error signal is fed back to the VCO 403. The circuit structure described above synchronizes an output signal from the VCO 403 to the front edge of the pre-pit area, and has an oscillation frequency which is 325 times as high as a pre-pit frequency (a frequency at the front edge of the pre-pit area).

As described above, based on the front edge signal detected by the pre-pit area front edge detector 401, a PLL comprised of the VCO 403, the phase comparator 405 and the like generates a clock which is multiplied 325 times, this clock is frequency-divided into 1/325, and the signal resulting from the frequency-division into 1/325 and said front edge signal are phase-locked. As a result, a detection clock (the output signal from the VCO 403), such as the wobble pits 108 and 109 and the address pits 110, is obtained.

The address pit timing signal generator 407 receives said front edge signal outputted from the pre-pit area front edge detector 401, generates a timing signal for the address pits 110 (part (b) of FIG. 1), and transmits to the judging unit 408, the shift registers 409 and 411 and the segment counter 414. The judging unit 408 receives the reproduction data at a data input terminal and said timing signal (the address pit-timing signal generator 407) at a clock input terminal. The reproduction data are latched at said timing signal. This realizes a judgment regarding whether the address pit is 1 or 0 (an address pit signal). As schematically shown in FIG. 5, the address pit signal is loaded one after another into the 24-bit shift register 409. In a similar fashion, the address pit signal is loaded one after another into the 31-bit shift register 411.

The content of the 18-bit shift register 409 is transmitted to the error detector 410 and the computing unit 412. The error detector 410 performs a CRC (Cyclic Redundancy Check) judgment on the 18-bit data (the 7-bit segment management number 301 and the 11-bit CRC error detecting code 302 for the segment management number) transmitted from the shift register 409, and judges whether the CRC error detecting code 302 matches with a calculation result.

The shift register 409 is an 18-bit shift register which is capable of storing the 7-bit segment management numbers 301 and the 11-bit error detecting codes 302 for the segment management numbers. FIG. 5 shows operations of the shift register 409 and the error detector 410. The shift register 409 sequentially receives the address pit signal, without knowing which bit of the 80-bit address information thus received address bit signal is.

When the 7-bit segment management number 301 and the 11-bit error detecting code 302 for the segment management number are loaded into the 18-bit shift register 409 as they are deviated from each other (i.e., when the data received by the shift register contain the track number information 303 and 305 or the BCH-coded error correcting information 304 and 306 for the track number information), the error detector 410 outputs 1 (which represents an error) as a result of the CRC check. A CRC error regarding the segment management numbers will not be created only when the 7-bit segment management number 301 and the 11-bit error detecting code 302 for the segment management number are loaded into the 18-bit shift register 409 as they exactly match with each other, in which case the error detector 410 outputs 0 (not an error) as a result of the CRC check.

Using the segment management number 301 which is demodulated in a situation that the error detector 410 does not output an error, the segment counter 414, which synchronizes the address reproduction timing and yields position information along the rotation direction on the disk, can be initialized. A major characteristic of the optical disk according to the present invention lies in fine control of a starting position of recording and reproduction in units of segments, which has heretofore been impossible, using the segment counter 414. Operations of the segment counter 414 will now be described.

<Description of Segment Counter>

The operations of the segment counter 414 are generally divided into the following three operation modes:

(1) A mode for detecting an initial value of the segment counter;

(2) A mode for checking whether the initialized value is correct; and (3) A mode for checking whether the segment counter is counting correctly.

These operation modes will now be each described. In this embodiment, the segment counter 414 is a cyclic counter which starts counting 1280, which is the same number as the segment count per round on the disk, at 0 and returns to 0 at 1279.

<(1) Description of Mode for Detecting Initial Value of Segment Counter>

In the embodiment 1, the segment management numbers (the position information along the rotation direction) 301 and the error detecting codes 302 for the segment management numbers are recorded 16 times in one round on the disk, and occur maximum of 16 times in one round on the disk in a situation that the error detector 410 does not output an error.

When all segment management numbers on the disk are demodulated without an error, the error detector 410 enters an error-free condition 16 times in one round on the disk. Upon rare occurrence of a read error, this frequency (16 times) decreases.

Since the segment management numbers read out in this error-free condition are arranged with regularity along the disk rotation direction, assuming that the segment management number read out without an error is S ($1 \leqq S \leqq 16$), the segment number N with which the error detector 410 does not generates an error ($0 \leqq N \leqq 1279$) is $N = 80 \times (S-1) + 18$. In other words, it is possible to calculate, in accordance with the formula above, the segment number N (a position in the rotation direction on the disk) with which reading is ongoing with the light beam, from thus read segment management number.

The computing unit 412 executes the calculation above. A result of the calculation is pre-set to the segment counter 414 as the initial value of the segment number N.

<(2) Description of Mode for Checking Whether Initialized Value is Correct>

With the initial value pre-set, the segment counter 414 counts up for every segment based on CLK1 which is outputted in synchronization to the segments.

When a counter 404 is pre-set normally, after 80 segments since the pre-set of the value to the segment counter 414, the error detector 410 does not output an error since the next segment management number 301 and the detecting codes 302 are loaded into the shift register 409 as they are in an exact match.

Further, the segment number N calculated by the computing unit 412 from the segment management number S which is read at this time must match with the value of the segment counter 414.

Only when this condition is satisfied, the mode (3) activates.

When the 11-bit error detecting codes 302 for the management numbers are used, there is a possibility that synchronization will not be established correctly (at a probability of about the address bit error rate$\times 2^{11}$) because of a read error. With the 11-bit error detecting codes 302 for-the management numbers checked twice, the reliability is improved.

<(3) Description of Mode for Checking Whether Segment Counter is Counting Correctly>

In the mode (3), too, the segment counter 414 counts up for every segment while referring to CLK1 which is in synchronization to the segments, which is similar to the mode (2).

When the counter 404 counts up normally and the segment management number 301 is read out normally, the error detector 410 does not output an error for every 80 segments, and the segment number N calculated by the computing unit 412 from thus read segment management number S matches with the value of the segment counter 414.

With this match checked, whether the segment counter 414 is counting up correctly and the value of the segment counter 414 matches with the segment number N in the disk or not is checked 16 times in one round on the disk.

Without a match, the mode (1) activates immediately, determining that there is an out-of-synch. When the segment management number S is at a normal position (a position which is determined by the segment counter 414 and at which the segment management number 301 and the detecting codes 302 are loaded into the shift register 409 as they are in an exact match) and also when it is not possible to read out the segment management number S for a predetermined number of times without an error, determining that there is an out-of-synch, the mode (1) activates in a similar manner.

Thus, a reproducing apparatus for the optical disk according to the present invention has a structure that the segment counter 414, which is synchronized by means of segments and counts up, can control a starting point and an end point of recording and reproduction in an optical disk in units of segments and that the acceptability of this value is checked regularly.

Specific operations of the segment counter 414 will now be each described in detail. The output signal from the error detector 410 (a check result) is transmitted to the shift register 411, the error detector/corrector 415, the gate 416, the micro computer 406, the comparator 413 and the computing unit 412.

As described above, when an distributed address method according to which the corresponding detecting codes 302 are added to data common between the adjacent recording tracks (the segment management numbers 301) is used, it is possible to obtain the timing of demodulation of an address by checking the segment management number 301 and the error detecting code 302 for the segment management number. When the output from the error detector 410 becomes 0, the segment management number 301 is loaded exactly in the shift register 409. In this segment management number 301, a value from 1 through 16 expressing which address. in one round on the disk corresponds is recorded.

Hence, assuming that the segment management number 301 is at the time that the error detector 410 does not output an error is S, the computing unit 412 receives the segment management number 301 from the shift register 409 and calculates the current segment number N in accordance with the calculation formula $N = 80 \times (S-1) + 18$.

The current segment number N calculated by the computing unit 412 is transmitted from the computing unit 412 to the segment counter 414 and the comparator 413. The gate 416 receives the output signal from the error detector 410 (check result) and a control signal from the micro computer 406.

In a mode that the micro computer 406 is searching for the segment management number (when the seek operation was executed and the segment management number was temporarily lost, for example), the gate 416 transmits the received output signal of the error detector 410 (check result) to a pre-load control terminal PSET of the segment counter in accordance with the control signal from the micro computer 406. In a mode that the micro computer 406 is not searching for the segment management number (when the reproducing operation is ongoing with the correct segment management number detected, for example), the gate 416 does not transmit the received output signal of the error detector 410 (check result) to the pre-load control terminal PSET of the segment counter 414 in accordance with the control signal from the micro computer 406.

The segment counter 414 pre-loads the segment number N transmitted from the computing unit 412, at the timing at which the error detector 410 outputs the output signal which denotes that the gate 416 has 0 (not an error). As the gate 416 receives the output signal 0 from the error detector 410 (not an error), the micro computer 406 pre-loads the output signal of the computing unit 412 to the segment counter 414 and the gate 416 thereafter prohibits outputting of a result of the error detection. After outputting from the gate 416 is prohibited, the segment counter 414 does not pre-loads the output signal of the computing unit 412.

The segment counter 414 receives, at a clock input terminal 1 (CLK1), an address pit timing signal which is outputted for each segment from the address pit timing signal generator 407, sequentially counts up the pre-loaded segment number N, and outputs the segment number which is a value representing the result of counting up. The segment number (the current segment number) is fed to the micro computer 406. After reaching 1270 which is the maximum value, the segment counter 414 returns to 0 upon receipt of the next address pit timing signal. Counting up initiates when the address pit timing signal is received again following this. Due to this, the counter value of the segment counter 414 operates in synchronization of the 1280 divided segments on the disk.

The shift register 409 and the error detector 410 read out a segment control code 16 times one round on the disk. The computing unit 412 receives the segment control code, calculates and outputs the current segment number. The current segment number N outputted from the computing unit 412 is fed to the comparator 413. The comparator 413 compares the current segment number outputted from the computing unit 412 with the value of the segment counter 414 at the timing at which the error detector 410 outputs 0 (not an error), and checks whether there is an out-of-synch or not. The output signal from the comparator 413 (the result of the check regarding there is an out-of-synch or not) is fed to the micro computer 406.

When the two match with each other, the micro computer 406 uses the current segment number outputted from the segment counter for the purpose of control. When the two do not match with each other, the micro computer 406 conducts the gate 416 once again.

The 31-bit shift register 411 receives an output signal (the address pit signal) in accordance with the address pit timing signal (the output signal from the address pit timing signal generator 407) immediately after the output signal from the error detector 410 (check result) becomes 0 (not an error). When the shift register 411 finishes receiving 31-bit data, the 31-bit data are transmitted to the error detector/corrector 415. Depending on whether the recording track at which the optical pickup is located is the even track or the odd track, the timing of the 31-bit data (the 16-bit track number information (the track number of the recording track) 303 or 305, the BCH-coded error correcting information 304 and 306 for 15-bit track number information) is different, and hence, loading of the 31-bit data is repeated twice.

The error detector/corrector 415 receives the 31-bit data outputted from the shift register 411 at the thirty-first segment and the sixty-second segment from the timing at the error detector 410 outputs 0 (not an error), checks and corrects a BCH error, and outputs a signal expressing whether there is an error and the track number (or a corrected track number).

The micro computer receives the segment number (the output signal from the segment counter 414), the track number (the output signal from the error detector/corrector 415) and the output signal from the error detector 410, and accordingly learns about the current location of the optical pickup. With the output signal from the error detector 410 and the output signal from the comparator 413 fed, whether the number of the segment is detected or whether the current location on the optical disk was lost is judged.

Position information along the rotation direction is managed using sector numbers (or address information which corresponds to sector numbers on a one-to-n basis) engraved in the disk. For a reason regarding the efficiency of use of recording tracks, practically speaking, maximum of a few dozens of address information can be held in one round on the disk at most. Hence, in a conventional disk drive, the number of addresses in one round is a limit on a resolution along the circumferential direction which can be managed in one round on the disk. However, in the optical disk according to the present invention, using the segment counter described above as units of management, it is possible to control a recording/reproduction position along the circumferential direction in units of segments.

Further, since the addresses are distributed one bit each over the segments in the optical disk according to the present invention, a major characteristic lies in that all segments have the same physical structure. For instance, while a clock signal to start recording is generated using a start pit as a reference according to the conventional techniques, there is only one start pit at the top of a sector (where there are address pits and the like formed). On the contrary, in the optical disk according to the embodiment 1, one front edge signal (corresponding to a start pit) in the pre-pit areas is obtained for each segment.

Hence, although recording can start only immediately after address information in a conventional optical disk, using the value of the segment counter 414, recording of data can be started at a starting point of any desired segment on the disk in the case of the optical disk according to the present invention.

In short, it is possible to designate a write start position with an extremely finer resolution as compared with a conventional optical disk drive. Further, since all physical structures on the disk are the same, it is possible to record or reproduce at any desired position. In the optical disk according to the present invention, a starting position of at least one sector is a starting position of an address.

<Description of Recording System of Optical Disk Drive (FIG. 11)>

Figure 6:
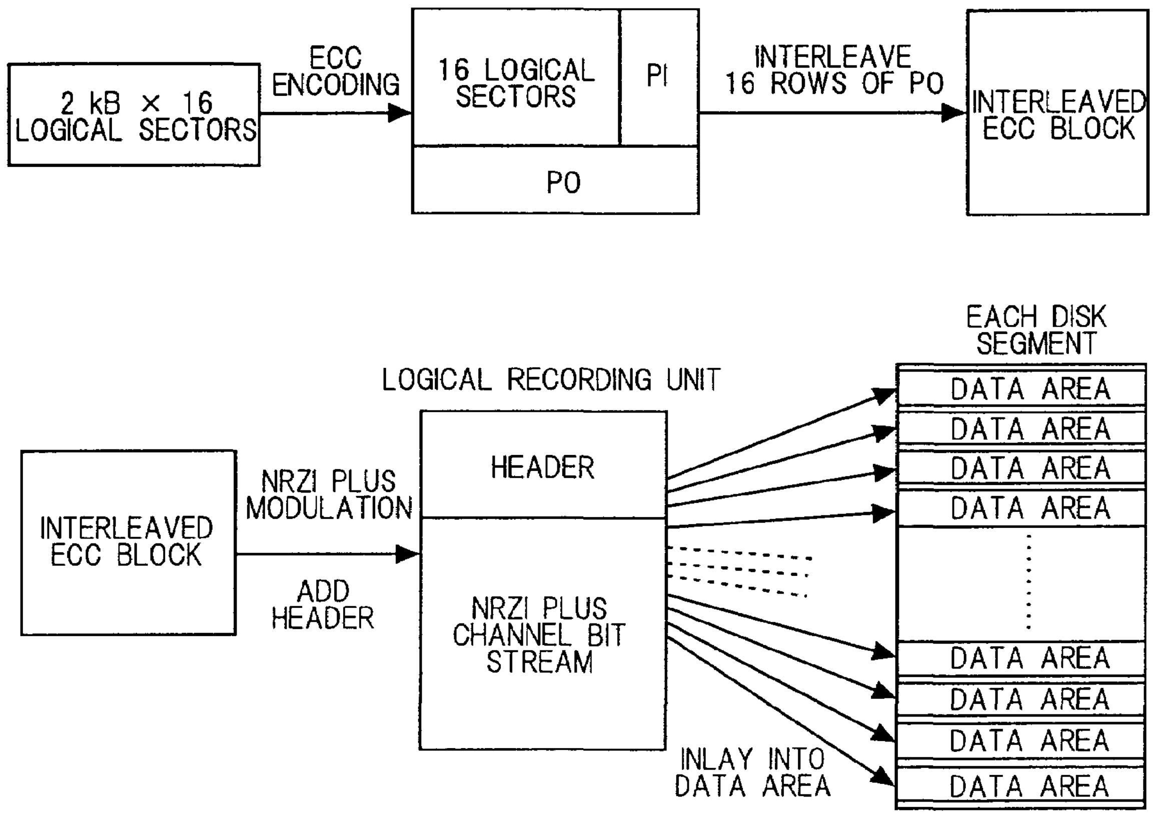
FIG. 6 is a drawing which shows a data structure of and a method of recording in a segment in the optical disk according to the embodiment 1.

Another major characteristic of the magneto-optical disk according to the present invention lies in that the plurality of segments 105 are collected to form a conventional sector. In this embodiment, a block of an ECC signal having 32 kB used for a DVD and the like is one sector, and one sector (32 kB) is recorded as it is distributed over a plurality of segments. FIG. 6 shows a data structure of a sector and a method of recording in a segment in this embodiment. PI is added to each one of 16 logical sectors having 2 kB and PO is added to these pieces of data, whereby an ECC block having 32 kB which is interleaved is generated. Next, the interleaved 32 kB ECC block is fed to a DC-free NRZI convertor, and a data string covering one sector (DC-free NRZI) is generated. This is decomposed into the number of bits which can be recorded in each segment 105, and recorded in the data area 107 of each segment 105.

A specific recording system of an optical disk drive according to the embodiment 1 will now be described with reference to FIG. 11. FIG. 11 is a block diagram of the recording system of the disk drive according to the embodiment 1 (recording apparatus for optical disk (including a recording and reproducing apparatus)). In FIG. 11, blocks denoted at the same reference symbols (on the order of 400) as those used in FIG. 4 are the same blocks as those blocks denoted at the same reference symbols in FIG. 4. A pre-pit signal is detected, so as to permit an optical pickup (including a recording lens) 1102 to access a position of a desired sector in which recording is desired on an optical disk 1101 according to the embodiment. The optical pickup 1102 receives reflected light from the optical disk 1101 and transmits the same to a splitter 1103.

The splitter 1103 separates the reflected light into light components having different change surfaces and transmits the light components to light detectors 1104 and 1105 (which are typically photodiodes). Detecting the light components, the light detectors 1104 and 1105 convert the same into electric signals.

An adder 1106 adds up output signals from the two light detectors 1104 and 1105. A result of the addition is in proportion to the amount of reflected light received by the optical pickup. An output signal from the adder is an analog signal which corresponds to whether there is a pre-pit or not. The output signal from the adder 1106 is fed to a binarizer 1107 and converted into a digital signal. An output signal from the binarizer 1107 is transmitted to the pre-pit area front edge detector 401, a phase comparator 1119 and an address information generator 1109. In parts (b) and (c) of FIG. 1, the amount of reflected light changes at boundaries between recording tracks which are ditch portions and flat pre-pit areas (excluding the pre-pits).

A period of time during which the optical pickup moves passing the recording tracks (the ditch portions 111 in part (b) of FIG. 1) (i.e., a period of time from a rear edge to a front edge of the pre-pit area) is the longest period during which the amount of reflected light remains at a low level because of diffraction from the ditches. Based on this longest period (a unique period of time which can be distinguished from other signals), the pre-pit area front edge detector 401 detects the front edge of the pre-pit area and transmits a front edge signal to the edge window generator 402, a data window generator 1108 and the address pit timing signal generator 407. The edge window generator 402 receives the front edge signal, generates a window signal having a constant width spanning with the front edge serving as the center, and outputs the same.

A voltage controlled oscillator (VCO) 1117 outputs an oscillator output signal which will be fed to a clock input terminal (CLK) of a frequency divider 1118, a write/read control part 1111 and an NRZI convertor 1115.

The micro computer 406 reads out a frequency divide ratio of a frequency divider for clock generation in each zone which is stored in a RAM (Random Access Memory) 1113, and supplies the frequency divide ratio to a pre-load terminal (PRE) of the frequency divider 1118. The frequency divider 1118 frequency-divides the oscillator output signal received at the clock terminal at the frequency divide ratio received at the pre-load terminal, and outputs a frequency-divided signal.

The phase comparator 1119 receives the output signal from said binarizer 1107, the frequency-divided signal outputted from said frequency divider 1118, and the window signal outputted from the edge window generator 402, compares the phases of the output signal of said binarizer 1107 and the frequency-divided signal outputted from said frequency divider 1118, and outputs a phase error signal. The phase error signal is fed back to the VCO 1117. The circuit structure described above synchronizes an output signal from the VCO 1117 to the front edge of the pre-pit area, and has an oscillation frequency which is obtained by multiplying a segment frequency by said frequency divide ratio. For instance, in a zone 1 in Table 1, the frequency divide ratio is 325. The output signal of said binarizer 1107 is used as a clock or the like for writing/reading of data in each zone.

The data window generator 1108 receives said front edge signal outputted from the pre-pit area front edge detector 401, outputs a window signal corresponding to a data period for each segment, and transmits the same to the write/read control part 1111. In the zone 1 in Table 1 for instance, the window signal is a signal which remains high during a period of time from the twenty-seventh clock (the output signal from the VCO 1117) to the three hundred and eighteenth clock but remains low during other periods of time (a period of time from the first clock to the twenty-sixth clock and a period of time from the three hundred and eighteenth clock to the three hundred and twenty-fifth clock).

The address pit timing signal generator 407 receives said front edge signal outputted from the pre-pit area front edge detector 401, generates a timing signal for the address pits 110 (part (b) of FIG. 1), and transmits to the address information generator 1109. The address information generator 1109 receives the timing signal for the address pits 110 and the output signal of said binarizer 1107, generates address information, and transmits to the micro computer 406 and the write/read control part 1111. The address information generator 1109 expresses the judging unit 408, the segment counter 414 and the like shown in FIG. 4 as one block.

Input data are fed to an encoder 1110, encoded (Reed Solomon encoding, for instance) and written in the RAM 1113. The write/read control part 1111 receives the input data, and generates a write clock for writing the input data in the RAM 1113. The RAM 1113 plays a role of a buffer memory for writing input data in the recording medium. The write/read control part 1111 receives the clock signal outputted from the VCO 1117, a window signal outputted from the data window generator 1108, address information such as the segment number and the like outputted from the address information generator 1109 and the control signal of the micro computer 406, outputs a clock signal during the data period for each segment, and uses the clock signal as a read clock of the RAM 1113.

Information such as zones, sectors, segments and the like read. out from a predetermined recording area of the recording medium is stored in the RAM 1113 (1114). The micro computer 406 controls so that the write/read control part 1111 will supply said clock signal to the RAM 1113 when the optical pickup 1102 reaches over a sector in which recording is desired.

In response to an instruction from the micro computer 406, the write/read control part 1111 supplies a read clock signal to the RAM 1113, and the RAM 1113 outputs the encoded data stored therein for every data block to be recorded in each segment.

The data of the RAM 1113 (input data) read out in accordance with the clock signal supplied from the write/read control part 1111 are fed to the DC-free NRZI convertor 1115. The DC-free NRZI convertor 1115 receives the encoded data read out from the RAM 1113 and the clock signal from the VCO 1117, and performs DC-free NRZI conversion on said encoded data. The data converted by DC-free NRZI conversion are transmitted from the DC-free NRZI convertor 1115 to a magnetic field driving circuit 1116 (which is typically a magnetic head), and converted into a magnetic signal. The optical pickup 1102 irradiates laser as a pulse upon the recording medium 1101 to thereby increase the temperature of the recording film, whereby a magnetic head 1120 records data.

<Description of Reproduction System of Optical Disk Drive (FIG. 12)>

FIG. 12 is a block diagram of a reproduction system of the disk drive according to the embodiment 1 (reproducing apparatus for optical disk (including a recording and reproducing apparatus)). In FIG. 12, blocks denoted at the same reference symbols (on the order of 400 or on the order of 1100) as those used in FIG. 4 or 11 are the same blocks as those blocks denoted at the same reference symbols in FIG. 4 or 11. A pre-pit signal is detected, so as to permit the optical pickup 1102 to access a position of a desired sector in which reproduction is desired on the optical disk 1101 according to the embodiment. The optical pickup 1102 receives reflected light from the optical disk 1101 and transmits the same to the splitter 1103. The splitter 1103 separates the reflected light into light components having different change surfaces and transmits the light components to the light detectors 1104 and 1105 (which are typically photodiodes). Detecting the light components, the light detectors 1104 and 1105 convert the same into electric signals.

The adder 1106 adds up the output signals from the two light detectors 1104 and 1105. A result of the addition is in proportion to the amount of reflected light received by the optical pickup. Based on the output signal from the adder, the VCO 1117 is phase-locked (the frequency of the oscillator output signal from the VCO 1117=the segment frequency×the frequency divide ratio (a frequency divide ratio for clock generation in each zone which is stored in the RAM 1113)), the data window generator 1108 outputs the window signal, and the address information generator 1109 transmits address information to the micro computer 406 and the write/read control part 1111. These processes, being the same as those described in detail with reference to-the block diagram of the recording system in FIG. 11, will not be described again with reference to FIG. 12. The micro computer 406 transmits the frequency divide ratio to the pre-load terminal (PRE) of the frequency divider 1118.

A subtractor 1201 receives the output signals from the two light detectors 1104 and 1105 and outputs a differential signal between the two output signals. The optical disk 1101 according to the embodiment 1 is a magneto-optical disk, and therefore, the differential signal changes based on a change in magnetization direction of the recording film.

The differential signal outputted from the subtractor 1201 is fed to an 8-bit ADC (A/D convertor) 1202, and converted into 8-bit digital data.

A 1-D computing unit 1207 receives the 8-bit digital data (the output signal from the ADC 1202) and generates a differential signal against adjacent digital data.

The 1-D computing unit 1207 comprises a subtractor 1203 and a delay element 1204 equivalent to one clock.

The delay element 1204 receives 8-bit digital data (which will be referred to as a signal S), delays the digital data S by one clock (for one sampling period), and outputs delayed digital data Sdelay.

The subtractor 1203 receives the digital data S and the delayed digital data Sdelay, and outputs a differential signal (S−Sdelay) (an 8-bit digital signal). An NRZI Viterbi decoder 1205 receives the differential signal (S−Sdelay) and the window signal outputted from the data window generator 1108, binarizes the differential signal in the data period for each segment (which is defined by the window signal) while considering the likelihood, and outputs a binarized digital signal. An output signal of the NRZI Viterbi decoder 1205 is NRZI-decoded data.

The NRZI-decoded data are recorded in the RAM 1113. The write/read control part 1111 receives the oscillator output signal from the VCO 1117, the window signal covering the data period for each segment, the output signal from the address information generator 1109 and the control signal of the micro computer 406, the control signal of the micro computer instructs signal reproduction (which is not a recording mode, for instance), and when in the data period for each segment, the oscillator output signal from the VCO 1117 is fed as a clock signal to the RAM. This clock signal makes the NRZI-decoded data written in the RAM 1113. The RAM 1113 is used as a buffer memory during reproduction, too.

The write/read control part 1111 transmits an output signal from an incorporated oscillator to the RAM 1113 as a read clock signal. In response to this clock, data for each segment written in the RAM 1113 are read out as a continuous signal and fed to the decoder 1206. The decoder 1206 decodes the inputted signal (Reed Solomon decoding for example). Thus decoded signal (output data) is outputted at an output terminal of the disk drive.

Although the clock used for recording and reproduction is extracted at rear edges of the ditches in the embodiment above, front edges of the ditches or central portions of the wobble pits may be detected.

<Description of Method of Recording in Optical Disk (FIG. 13)>

FIG. 13 is a flow chart which represents a situation that data are recorded in a blank optical disk or that management data, such as the number of segments contained in one sector in each zone, have not been recorded in advance in the form of pre-pits.

First, a recording density mode of the optical disk is selected (Step 1301). An operator chooses a desired recording density mode out from recording density modes listed in Table 1 through Table 5 for instance, and inputs the selected recording density mode via an operation panel of the disk drive.

Next, the recording lens is made access a predetermined recording area on the inner-most periphery of the optical disk (Step 1302).

Next, in the predetermined recording area, management data, such as the number of segments contained in one sector in each zone, are recorded (Step 1303).

Next, the recording lens is made access a position of a sector in which recording is to start (Step 1304).

Next, recording of data is started (Step 1305).

<Description Of Method of Reproducing, Etc., in Optical Disk (FIG. 14)>

When one wishes to record modified data additionally in an optical disk which already bears writable signals or write-protected pre-pits which represent management data such as the number of segments contained in one sector in each zone, or when one wishes to read out data from an optical disk in which data have already been recorded, a flow chart in FIG. 14 is to be followed. This will now be described with reference to FIG. 14.

First, the optical pickup is made access a predetermined recording area on the inner-most periphery of the optical disk (Step 1401).

At the time of insertion of the disk, management data, such as the number of segments contained in one sector in each zone, are read out from the predetermined recording area (Step 1402).

Next, a desired sector which is a sector in which recording or reproduction is to be performed is inputted (Step 1403).

Next, based on said management data, the track number and the segment number of the top segment in the desired sector are derived (Step 1404).

Next, the optical pickup is made access the top segment in the desired sector (Step 1405).

Next, from the top segment in the desired sector, recording or reproduction of data is started (Step 1406).

<Description of Zone Structure (FIG. 2)>

Figure 2:
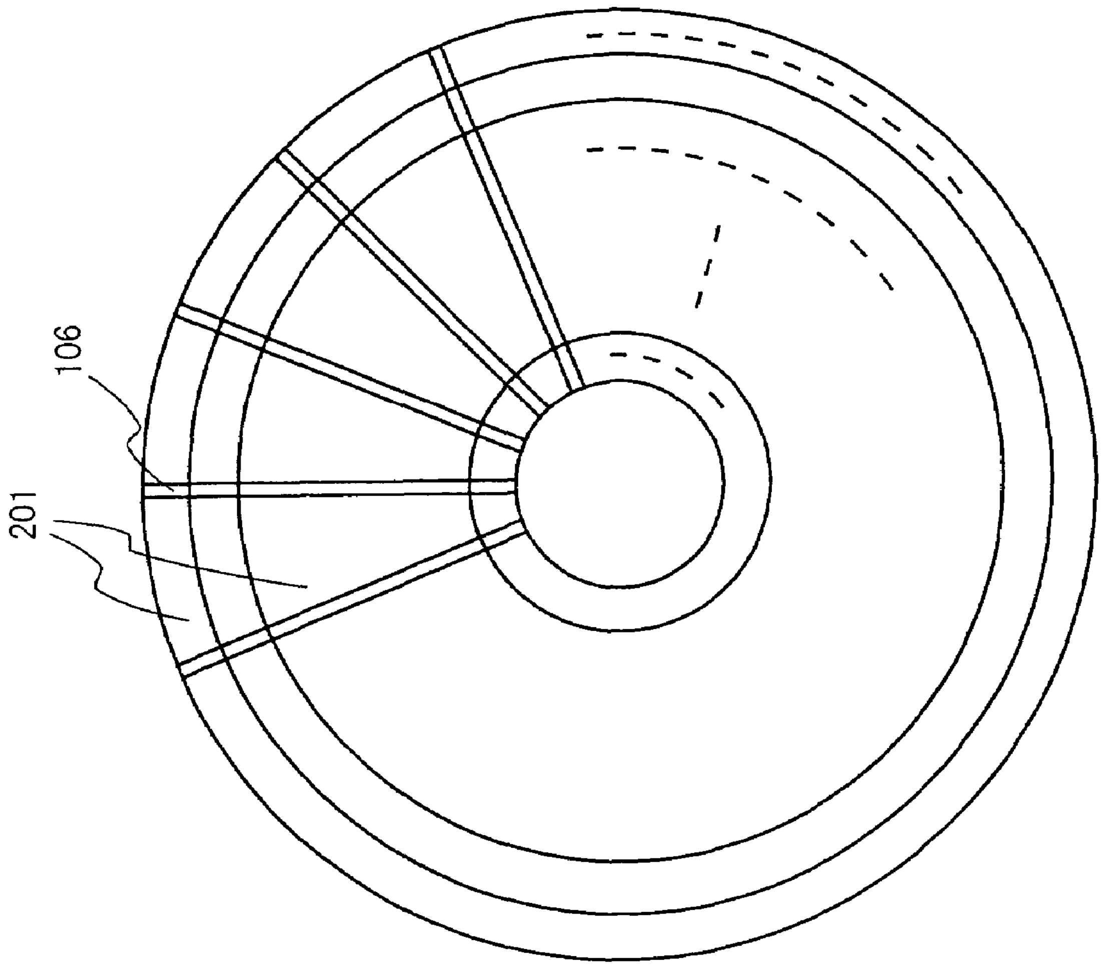
FIG. 2 schematically shows a zone arrangement in the optical disk according to the embodiment 1.

FIG. 2 schematically shows a zone arrangement in the magneto-optical disk according to the embodiment 1.

The magneto-optical disk according to the embodiment 1 is divided into nine imaginary zones 201 (which do not have boundary structures such as physical boundaries) in accordance with a distance along the radius direction. The nine zones each contain 2000 recording tracks (including the first recording track 103 and the second recording track 104). Each zone has a shape like a doughnut that a radial width (a width equivalent to the 2000 recording tracks) remains the same. The boundaries between adjacent zones (which are the boundaries between the first recording track 103 and the second recording track 104) are no different from the other boundaries between the first recording track 103 and the second recording track 104 in the same zone, and as described later, the zone boundaries can move (and can be changed).

Meanwhile, a conventional optical is divided into zones along the radius direction and ZCAV or ZCLV recording is executed which requires to change the number of sectors for different zones and accordingly maintains a recording density constant on the inner and the outer rounds of the disk, thereby realizing high-density recording.

In the optical disk according to the present invention, the segments are radially arranged (aligned along the radius direction) and there is no physical zone structure.

According to the present embodiment, the disk is divided into the nine imaginary zones (FIG. 2), so that the volume of data recorded in one segment becomes larger toward the outer round. This is because the recording track of one segment becomes longer as the segment becomes closer to the outer round. In this manner, a recording density per unit recording track length is made approximately constant from the inner round toward the outer round. This makes it possible to record data at a high density which is practically a top limit all the way from the inner round toward the outer round. Because of this, the closer the zone is to the outer round, the smaller the number of segments contained in one sector (This is a recording area which is necessary to record data representing one ECC block. In the embodiment 1, one sector=306,500 bits.) becomes. A table used in this embodiment is shown as Table 1. The closer the zone is to the outer round, the larger the volume of information recorded in one segment-becomes.

One address comprises 80 segments. In the recording medium the present invention (including other embodiments), the number of the segments contained in a sector and the volumes of information recorded in the segments are flexible. Starting positions of the sectors are different from starting positions of areas which are usually defined by the addresses (The two starting positions could match with each other at a certain probability.).

TABLE 1

| ZONE NUMBER | THE NUMBER OF TRACKS | TRACK NUMBER (DECIMAL SYSTEM) | THE NUMBER OF BITS PER SEGMENT (FREQUENCY DIVIDING RATIO) | RECORDABLE BIT NUMBER | THE NUMBER OF RECORDABLE BITS | THE NUMBER OF BITS PER SECTOR | THE NUMBER OF SECTORS | SECTOR NUMBER (DECIMAL SYSTEM) |
|---|---|---|---|---|---|---|---|---|
| 1 | 2,000 | 0–1,999 | 325 | 27–318 | 292 | 1,050 | 2,438 | 0–2,437 |
| 2 | 2,000 | 2,000–3,999 | 351 | 29–344 | 316 | 970 | 2,639 | 2,438–5,076 |
| 3 | 2,000 | 4,000–5,999 | 378 | 30–371 | 342 | 897 | 2,853 | 5,077–7,929 |
| 4 | 2,000 | 6,000–7,999 | 404 | 32–397 | 366 | 838 | 3,054 | 7,930–10,983 |
| 5 | 2,000 | 8,000–9,999 | 431 | 34–424 | 391 | 784 | 3,265 | 10,984–14,248 |
| 6 | 2,000 | 10,000–11,999 | 457 | 36–450 | 415 | 739 | 3,464 | 14,249–17,712 |
| 7 | 2,000 | 12,000–13,999 | 484 | 38–477 | 440 | 697 | 3,672 | 17,713–21,384 |
| 8 | 2,000 | 14,000–15,999 | 510 | 40–503 | 464 | 661 | 3,872 | 21,385–25,256 |
| 9 | 2,000 | 16,000–17,999 | 537 | 42–530 | 489 | 627 | 4,082 | 25,257–29,338 |

Thus, even when the optical disk does not have a physical zone structure, by means of the imaginary zone structure, a recording density of the optical disk can be enhanced in a similar manner to the conventional techniques such as ZCAV and ZCLV. Further, since there is no physical zone structure (There is no such zone structure which can not be changed, and the zones are imaginary (logical) zones.), it is possible to provide an optical disk which is easily accessed and flexible against a future improvement in density. In the case of a conventional recording medium, use of a super resolution reproduction method increases an address redundancy (The proportion of address areas to the surface area size of the recording medium increases.). Unlike in a conventional optical disk, in the recording medium according to the embodiment 1, the redundancy is reduced considerably since there is no addresses provided at the starting points of the sectors.

The sector allocation information (management data) shown in Table 1 is recorded in a predetermined recording area on the inner-most periphery of the optical disk according to the embodiment 1. While the position information at the top segments of the respective sectors (the track numbers and the segment numbers), the number of the segments in each sector and the volume of data in each segment may be all recorded, since the volume of data would be too large, it is preferable to reduce the volume of data to be recorded and calculate necessary data from the stored data. In the optical disk according to the embodiment 1, stored in the predetermined recording area on the inner-most periphery of the optical disk are the volume of data in the sectors, the number of the zones, sector numbers LSN_z(i) at the starting points of the respective zones, the track numbers and the segment numbers, the number of the segments SN_s(i) contained in one sector in each zone, the frequency divide ratio (In the embodiment 1, the frequency divide ratio=the clock frequency/the segment frequency) of the frequency divider for clock generation in each zone, and recording start clock numbers and recording end clock numbers in the respective segments.

In Table 1, the sector data volume is 306,500 bits. The number of the zones is 9. The sector numbers at the starting points of the respective zones are 0, 2438, 5077, 7930, 10984, 14249, 17713, 21385 and 25257. The track numbers at the starting points of the respective zones are 0, 2000, 4000, 6000, 8000, 10000, 12000, 14000 and 16000. The segment numbers at the starting points of the respective zones are 0 in all zones. The numbers of segments contained in one sector within the respective zones are 1050, 970, 897, 838, 784, 739, 697, 661 and 627. The frequency divide ratios of the frequency divider for clock generation in the respective zones are 325, 351, 378, 404, 431, 457, 484, 510 and 537. Recording start bit positions in the respective segments are 27, 29, 30, 32, 34, 36, 38, 40 and 42. Recording end bit positions in the respective segments are 318, 344, 371, 397, 424, 450, 477, 503 and 530.

For example, in the first zone, while the frequency divide ratio of the frequency divider is 325 and 325 pieces of clocks are generated during one segment period, since the first through the twenty-sixth clocks and the three hundred and nineteenth through the three hundred and twenty-fifth clocks are clocks on the pre-pit areas, those clocks are not used for recording in or reproduction from the data areas.

It is possible to derive the track number and the segment number of the top segment in any desired sector (a sector in which recording or reproduction is to be performed), in accordance with a simple formula described below. Assuming that LSN is the sector number of the sector in which recording or reproduction is to be performed ($0 \leqq LSN \leqq 29,338$), ZN is the zone number of the sector in which recording or reproduction is to be performed ($1 \leqq ZN \leqq 9$), SN_s(i) is the numbers of segments needed to form one sector in each zone, and LSN_z(i) is the first sector number in each zone, ZN is i which satisfies LSN_z(i+1)>LSN>LSN_z(i).

The track number of the recording track to which the top segment of the sector-to-be-recorded or reproduced and the segment number of the top segment are:

$$\text{Track number}=(ZN-1)\times 2000+[(LSN-LSN\_z(ZN))\times SN\_s(ZN)/1280]$$

$$\text{Segment number}=(LSN-LSN\_z(ZN))\times SN\_s(ZN) \text{ MOD } 1280$$

For example, the sector number 8,888 holds 7930 (fourth zone)≦8888≦10984 (fifth zone), and therefore, belongs to the fourth zone.

The track number of the top segment bearing the sector number 8888 is (4−1)×2000+[(8888−7930)×838/1280]=6627. Meanwhile, the segment number of the top segment bearing the sector number 888 is ((8888−7930)×838 MOD 1280)=244.

The sector number 8888 has a lengths corresponding to 838 segments in total from the top segment described above. In each segment, with the frequency divide ratio of the frequency divider set to 404, it is possible to generate clocks for recording or reproduction (In the embodiment 1, this is a frequency which is 404 times as high as the segment frequency.). Of these clocks for recording or reproduction, a 366-bit signal ranging from the thirty-second through the three hundred and ninety-seventh clocks is recorded or reproduced.

The management data described above is a mere example, and the type of management data stored in a predetermined area may be any desired type. For instance, when the volume of data in the sectors, the number of the zones, the number of the tracks in the respective zones or the segment numbers at the starting points of the respective zones are fixed values (when the number of the zones is 9, the number of the tracks in the respective zones is 2000 tracks, the segment numbers at the starting points of the respective zones are 1 for example), it is not necessary to store the number of the zones, the number of the tracks in the respective zones, the segment numbers at the starting points of the respective zones, etc.

Further, while calculations become easy as described above when the segment numbers at the starting points of the respective zones are stored, it is possible to derive from the number of the segments contained in one sector within each zone or the like.

For example, it is possible to calculate the track number of the top segment bearing the sector number 8888 based on a formula described below. The number of sectors contained in the first zone is [2000 tracks×1280 segments/1050]=2438 sectors, the number of sectors contained in the second zone is [2000 tracks×1280 segments/970]=2639 sectors, the number of sectors contained in the third zone is [2000 tracks×1280 segments/897]=2853 sectors, and the number of sectors contained in the fourth zone is [2000 tracks×1280 segments/838]=3054 sectors (where the symbol [ ] is the Gauss'notation). With these added together, which zone the 8888-sector belongs to is easily found. Since the 8888-sector satisfies the following conditions of 2438+2639+2853=7930 (a start sector number of the four zones)≦8888 , ≦2438+2639+2853+3054=10984 (the start sector number of the four zones) it is found that the 8888-sector is contained in the fourth zone.

In a similar manner, even when the number of the segments contained in one sector is not stored, as for the fourth zone for instance, a calculation is possible as the number of the segments=[the total number of bits in one sector/the number of bits recorded per segment]+1=[306,500 bits/366 bits]+1=838 (where the symbol [ ] is the Gauss' notation).

Hence, while the type of management data stored in a predetermined recording area for the purpose of specifying a position of each sector may be any desired type, considering the ease of calculations, it is desirable to store the sector numbers at the starting points of the respective zones.

The allocation of. the sector positions shown in Table 1 is not fixed. In the recording medium according to the present invention, since the relationship between the sector positions and the addresses is held as the management data which are stored in the predetermined recording area, as the management data are rewritten, the relationship between the sector positions and the addresses is changed. In short, it is possible to change the allocation of the sector positions.

Assuming that the capability of the recording film of the optical disk according to the embodiment 1 has improved 20% and the minimum mark length has decreased 20%, a simple change made to the data settings from those shown in Table 1 to those shown in Table 2 in software (In Table 2, the number of the segments contained in the sectors is 20% less and the volume of data recorded in the respective segments is 20% larger as compared to the settings in Table 1.) using such an optical disk (without changing the preformat such as the addresses and the segments), a 20%-higher recording density is realized.

TABLE 2

| ZONE NUMBER | THE NUMBER OF TRACKS | TRACK NUMBER (DECIMAL SYSTEM) | THE NUMBER OF BITS PER SEGMENT (FREQUENCY DIVIDING RATIO) | RECORD-ABLE BIT NUMBER | THE NUMBER OF RECORDABLE BITS | THE NUMBER OF BITS PER SECTOR | THE NUMBER OF SECTORS | SECTOR NUMBER (DECIMAL SYSTEM) |
|---|---|---|---|---|---|---|---|---|
| 1 | 2,000 | 0–1,999 | 390 | 27–383 | 357 | 859 | 2,980 | 0–2,979 |
| 2 | 2,000 | 2,000–3,999 | 421 | 29–414 | 386 | 795 | 3,220 | 2,980–6,199 |
| 3 | 2,000 | 4,000–5,999 | 454 | 30–447 | 418 | 734 | 3,487 | 6,200–9,686 |
| 4 | 2,000 | 6,000–7,999 | 485 | 32–478 | 447 | 686 | 3,731 | 9,687–13,417 |
| 5 | 2,000 | 8,000–9,999 | 517 | 34–510 | 477 | 643 | 3,981 | 13,418–17,398 |
| 6 | 2,000 | 10,000–11,999 | 548 | 36–541 | 506 | 606 | 4,224 | 17,399–21,622 |
| 7 | 2,000 | 12,000–13,999 | 581 | 38–574 | 537 | 571 | 4,483 | 21,623–26,105 |
| 8 | 2,000 | 14,000–15,999 | 612 | 40–605 | 566 | 542 | 4,723 | 26,106–30,828 |
| 9 | 2,000 | 16,000–17,999 | 644 | 42–637 | 596 | 515 | 4,970 | 30,829–35,798 |

According to Table 2, in the first zone for example, with the frequency divide ratio of the frequency divider for clock generation in the first zone changed from 325 to 390, the volume of data recorded in one segment increases from 292 bits shown in Table 1 to 357 bits and the number of segments per sector decreases to 859 from 1050 shown in Table 1. Since the total number of the segments in the recording medium is constant as the pre-pit areas dividing the segments were pre-formatted, the recording capacity of the recording medium increases from 29399 to 35799.

Although the synchronizing clocks for recording/reproduction of data and demodulation of the addresses are generated at the rear edges of the ditches in this embodiment, it is also possible to generate the reference clock from the wobble pits, and thus, the method of generating the reference clock does not restrict the present invention in any way.

As described above, the relationship between the sectors and the segments is flexible in the optical disk according to the embodiment 1, realizing a recording medium having a high recording density by changing the number of the segments contained in the sectors. In addition, since the relationship between the sectors and the addresses is flexible, the lengths or angles of the sectors or the number of the segments contained in the sectors are therefore values which are totally irrelevant to the lengths or angles of the addresses or the number of the segments contained in the addresses, thereby realizing a recording medium which has a high recording density. Further, with the volume of data recorded in one segment changed depending on the segments, an optical disk which has a high recording density is realized. The sector allocation above is carried out based on the management data which are written on the recording medium, and therefore, a recording medium which is flexible and which a user can freely change is realized. Hence, the length or angle of at least one sector is different from an address length or angle multiplied by n.

A conventional recording medium assumes recording and reproduction of data which are in a certain format, and hence, allows recording and reproduction only in units of blocks (the volume of data per sector) of data which are in the assumed format.

In the recording medium according to the present invention, since the sectors and the addresses are associated with each other by management data which are stored in the predetermined recording area, when the management data are changed, the recording medium can be used as a recording medium which comprises sectors having a different size. In other words, the same recording medium can be used for a plurality of applications which are totally different.

Table 3 is an allocation table for sectors which is appropriate to where one sector contains 64 kB data. Thus, it is possible to assign sectors having any desired size in the recording medium according to the present invention.

TABLE 3

| ZONE NUMBER | THE NUMBER OF TRACKS | TRACK NUMBER (DECIMAL SYSTEM) | THE NUMBER OF BITS PER SEGMENT (FREQUENCY DIVIDING RATIO) | RECORD-ABLE BIT NUMBER | THE NUMBER OF RECORDABLE BITS | THE NUMBER OF BITS PER SECTOR | THE NUMBER OF SECTORS | SECTOR NUMBER (DECIMAL SYSTEM) |
|---|---|---|---|---|---|---|---|---|
| 1 | 2,000 | 0–1,999 | 325 | 27–318 | 292 | 1,796 | 1,425 | 0–1,424 |
| 2 | 2,000 | 2,000–3,999 | 351 | 29–344 | 316 | 1,660 | 1,542 | 1,426–2,966 |
| 3 | 2,000 | 4,000–5,999 | 378 | 30–371 | 342 | 1,534 | 1,668 | 2,967–4,634 |
| 4 | 2,000 | 6,000–7,999 | 404 | 32–397 | 366 | 1,433 | 1,786 | 4,635–6,420 |
| 5 | 2,000 | 8,000–9,999 | 431 | 34–424 | 391 | 1,341 | 1,909 | 6,421–8,329 |
| 6 | 2,000 | 10,000–11,999 | 457 | 36–450 | 415 | 1,264 | 2,025 | 8,330–10,354 |
| 7 | 2,000 | 12,000–13,999 | 484 | 38–477 | 440 | 1,192 | 2,147 | 10,355–12,501 |
| 8 | 2,000 | 14,000–15,999 | 510 | 40–503 | 464 | 1,130 | 2,265 | 12,502–14,766 |
| 9 | 2,000 | 16,000–17,999 | 537 | 42–530 | 489 | 1,073 | 2,385 | 14,767–17,151 |

In addition, since the respective zones are imaginary zones, any desired change may be made such as an increase or decrease of the zones and a change to the number of the zones.

Table 4 shows an example that the number of the tracks in the third zone was increased to 3000 tracks from 2000 tracks, the number of the tracks in the fourth zone was decreased to 1000 tracks from 2000 tracks, the number of the tracks in the eighth zone was increased to 4000 tracks from 2000 tracks and the ninth zone was eliminated (that is, the number of the zones was reduced to 8 from 9).

Such a capability to change the zone allocation by rewriting the management data is useful when data are managed in units of zones and there is a difference in terms of the volume of data to be saved between the zones.

TABLE 4

| ZONE NUMBER | THE NUMBER OF TRACKS | TRACK NUMBER (DECIMAL SYSTEM) | THE NUMBER OF BITS PER SEGMENT (FREQUENCY DIVIDING RATIO) | RECORD-ABLE BIT NUMBER | THE NUMBER OF RECORDABLE BITS | THE NUMBER OF BITS PER SECTOR | THE NUMBER OF SECTORS | SECTOR NUMBER (DECIMAL SYSTEM) |
|---|---|---|---|---|---|---|---|---|
| 1 | 2,000 | 0–1,999 | 325 | 27–318 | 292 | 1,050 | 2,438 | 0–2,437 |
| 2 | 2,000 | 2,000–3,999 | 351 | 29–344 | 316 | 970 | 2,639 | 2,438–5,076 |
| 3 | 3,000 | 4,000–6,999 | 378 | 30–371 | 342 | 897 | 4,280 | 5,077–9,356 |
| 4 | 1,000 | 7,000–7,999 | 404 | 32–397 | 366 | 838 | 1,527 | 9,357–10,883 |
| 5 | 2,000 | 8,000–9,999 | 431 | 34–424 | 391 | 784 | 3,265 | 10,884–14,148 |
| 6 | 2,000 | 10,000–11,999 | 457 | 36–450 | 415 | 739 | 3,464 | 14,149–17,612 |
| 7 | 2,000 | 12,000–13,999 | 484 | 38–477 | 440 | 697 | 3,672 | 17,613–21,284 |
| 8 | 4,000 | 14,000–17,999 | 510 | 40–503 | 464 | 661 | 7,745 | 21,285–29,029 |

<<Embodiment 2>>

A magneto-optical disk, and a recording apparatus, a reproducing apparatus, a recording method and a reproduction method for the same according to the embodiment 2 of the present invention will now be described with reference to FIGS. 15 through 17.

The magneto-optical disk, and the recording apparatus, the reproducing apparatus, the recording method and the reproduction method for the same according to the embodiment 2 are basically the same as the magneto-optical disk and the like according to-the embodiment 1.

The magneto-optical disk according to the embodiment 2 is different from the magneto-optical disk according to the embodiment 1 in that the magneto-optical disk according to the embodiment 2 comprises information regarding a defective segment (which is a segment in which data cannot be correctly recorded or reproduced) and a spare segment which complements a defective segment.

In a similar fashion, the recording apparatus, the reproducing apparatus, the recording method and the reproduction method for magneto-optical disk according to the embodiment 2 are different from the reproducing apparatus and the like for magneto-optical disk according to the embodiment 1, in that information regarding a defective segment is written or read out and data are written or read out avoiding a defective segment.

Table 5 is a table used in the embodiment 2. Although Table 5 is similar to Table 1 described in relation to the embodiment 1, each sector contains one segments more (spare segment) than each sector according to the embodiment 1.

TABLE 5

| ZONE NUMBER | THE NUMBER OF TRACKS | TRACK NUMBER (DECIMAL SYSTEM) | THE NUMBER OF BITS PER SEGMENT (FREQUENCY DIVIDING RATIO) | RECORD-ABLE BIT NUMBER | THE NUMBER OF RECORDABLE BITS | THE NUMBER OF BITS PER SECTOR | THE NUMBER OF SECTORS | SECTOR NUMBER (DECIMAL SYSTEM) |
|---|---|---|---|---|---|---|---|---|
| 1 | 2,000 | 0–1,999 | 325 | 27–318 | 292 | 1,051 | 2,435 | 0–2,434 |
| 2 | 2,000 | 2,000–3,999 | 351 | 29–344 | 316 | 971 | 2,636 | 2,435–5,070 |
| 3 | 2,000 | 4,000–5,999 | 378 | 30–371 | 342 | 898 | 2,850 | 5,071–7,920 |
| 4 | 2,000 | 6,000–7,999 | 404 | 32–397 | 366 | 839 | 3,051 | 7,921–10,971 |

TABLE 5-continued

| ZONE NUMBER | THE NUMBER OF TRACKS | TRACK NUMBER (DECIMAL SYSTEM) | THE NUMBER OF BITS PER SEGMENT (FREQUENCY DIVIDING RATIO) | RECORD-ABLE BIT NUMBER | THE NUMBER OF RECORDABLE BITS | THE NUMBER OF BITS PER SECTOR | THE NUMBER OF SECTORS | SECTOR NUMBER (DECIMAL SYSTEM) |
|---|---|---|---|---|---|---|---|---|
| 5 | 2,000 | 8,000–9,999 | 431 | 34–424 | 391 | 785 | 3,261 | 10,972–14,232 |
| 6 | 2,000 | 10,000–11,999 | 457 | 36–450 | 415 | 740 | 3,459 | 14,233–17,691 |
| 7 | 2,000 | 12,000–13,999 | 484 | 38–477 | 440 | 698 | 3,667 | 17,692–21,358 |
| 8 | 2,000 | 14,000–15,999 | 510 | 40–503 | 464 | 662 | 3,867 | 21,359–25,225 |
| 9 | 2,000 | 16,000–17,999 | 537 | 42–530 | 489 | 628 | 4,076 | 25,226–29,301 |

<Description of Data Format According to Embodiment 2 (FIG. 15)>

In the optical disk according to the embodiment 2, all management data including defective segment information are stored in a predetermined recording area on the inner-most periphery of the recording medium, and only the data shown in FIG. 6 are recorded in the respective sectors. However, this is not limiting: In optical disks according to other embodiments, data in a format shown in FIG. 15 are recorded in the respective sectors.

Each sector in the magneto-optical disk according to the embodiment 2 comprises one spare segment (or one more spare segments) as described above. When there are not defective segments (which are segments in which data cannot be correctly recorded or reproduced) within the sectors, the spare segments would not be used, whereas when there are defective segments within the sectors, the spare segments would be used instead of the defective segments.

The format of each sector in the magneto-optical disk shown in FIG. 15 will now be described. At the top of each sector, there is a header portion having 48 bits. Data in the header portion are unique data which can be distinguished from ordinary data (Reed Solomon encoded and NRZI-converted data).

Disposed next is the sector number 1502 having 24 bits. This permits to directly find the current sector number without calculating from the management data and without using a data table in the management data. Disposed next is defective segment information 1503 (24 bits). The defective segment information 1503 is information which tells which segment in this sector the defective segment of this sector is. In the absence of a defective segment, a unique value (e.g., 2047) distinctive from the segment number (any value from 0 to 1049 in the example shown in Table 1) is written.

Alternatively the defective segment information 1503 may be the track number and the segment number of the defective segment contained in this sector. The sector number 1502 and the defective segment information 1503 are each encoded so that error correction can be performed on each. Disposed at last is user data 1504.

The data shown in FIG. 15 are recorded in each sector in the magneto-optical disk according to the embodiment 2. As described above, when there is not a defective segment in the magneto-optical disk, data would be recorded in the respective segments except for the spare segments (which are located at the very ends in the sectors), while when there is a defective segment, data would be recorded in the respective segments (including the spare segments) except for the defective segment.

In the other embodiments, the defective segment information is recorded together with other management data in a predetermined recording area on the inner-most periphery of the magneto-optical disk.

Although having similar structures to those of the recording apparatus and the reproducing apparatus for the magneto-optical disk according to the embodiment 1 shown in FIGS. 11 and 12, the recording apparatus and the reproducing apparatus for the magneto-optical disk according to the embodiment 2 are different from the recording apparatus and the like according to the embodiment 1 in that the defective segment information read out from the magneto-optical disk (or detected by inspecting the magneto-optical disk) is stored in the RAM 1113 (i.e., in that upon detection of a defect, the defective segment information 1503 is stored in the RAM 1113 when read out) and in that the write/read control part 1111 performs the write/read control in the RAM 1113 in accordance with the defective segment information.

<Description of Write/Read Control Part in Disk Deive (FIG. 16)>

FIG. 16 is block diagram of the write/read control part 1111 (FIGS. 11 and 12) of the recording apparatus or the reproducing apparatus for the optical disk according to the embodiment 2 (a block diagram which shows read control of data from the RAM 1113 at the time of recording (write control of data in the magneto-optical disk) and write control of data in the RAM 1113 at the time of reproduction (read control of data from the magneto-optical disk).

FIG. 16 as it is with a comparator 1605 which is a defective segment detecting block deleted is the write/read control part 1111 of the recording apparatus or the reproducing apparatus according to the embodiment 1 (FIGS. 11 and 12).

FIG. 16 will now be described. The block denoted at the dotted line represents the write/read control part 1111. The write/read control part 1111 contains comparators 1602, 1605 and 1608, an AND gate 1611, a counter 1614, a gate 1613, a write or read address pointer 1615 and a set/reset type flip-flop 1616.

The micro computer 406 transmits address information (the track number and the segment number) 1601 of the top segment in a sector in which recording or reproduction is to be started to the comparator 1602, and transmits address information 1607 of a segment in which recording or reproduction is to end. This is the track number and the segment number of a segment which is next to the segment in which recording or reproduction is to be performed. When there is not a defective segment within the last sector, the address of the segment in which recording or reproduction ends is an address of a spare segment of the last sector (which is located at the very end of the sector), whereas when there is a defective segment within the last sector, the address of the segment in which recording or reproduction ends is an address of the top segment of a sector which is next to the last sector.

Defective segment address information (the track number and the segment number) 1604 stored in the RAM 1113 is transmitted to the comparator 1605.

The address information generator 1109 transmits the track number and the segment number at which the optical pickup is currently located to the comparators 1602, 1605 and 1608 and the write or read address pointer 1615. The data window generator 1108 transmits a window signal 1610 which represents a data period of each segment to the AND gate 1611. The VCO 1117 transmits the clock signal to an input terminal of the gate 1613.

The comparator 1602 receives the top address (the track number and the segment number) 1601 of the sector in which recording or reproduction is to be started and the track number and the segment number at which the optical pickup is currently located, and outputs a match signal 1603. The match signal 1603 is high when the two match with each other but low when there is not a match. The set/reset type flip-flop 1616 receives the match signal 1603 at a set input terminal.

In a similar manner, the comparator 1608 receives the address information (the track number and the segment number) 1607 of the segment in which recording or reproduction is to end and the track number and the segment number at which the optical pickup is currently located, and outputs a match signal 1609. The match signal 1609 is high when the two match with each other but low when there is not a match. The set/reset type flip-flop 1616 receives the match signal 1609 at a reset input terminal.

The set/reset type flip-flop 1616 is set when the track number and the segment number at which the optical pickup is currently located match with the top address 1601 of the sector in which recording or reproduction is to be started (high output signal), and is reset when the track number and the segment number at which the optical pickup is currently located match with the address 1607 of the segment in which recording or reproduction is to end (low output signal).

The comparator 1605 receives the defective segment address information (the track number and the segment number) 1604 and the track number and the segment number at which the optical pickup is currently located, and outputs a match signal 1606. The match signal 1606 is low when the two match with each other (The current location of the optical pickup is a defective segment.), but low when there is not a match.

The AND gate 1611 receives an output signal (which is a high output when there is an instruction for recording or reproduction (write or read)) from the set/reset type flip-flop 1616, the match signal 1606 (which is a low output when the current location of the optical pickup is a defective segment) and an output signal (which is a high output during the data period of each segment) from the data window generator 1108, and outputs an execution control signal for recording or reproduction (The AND gate 1611 outputs high (execution of recording or reproduction) when the input signals are all high.).

The gate 1613 receives the clock signal outputted from the VCO 1117, and when said execution control signal for recording or reproduction (the output signal from the AND gate 1611) is high, outputs this clock signal. The clock signal outputted from the gate 1613 is fed as a write or read clock signal to the RAM 1113, and also fed to a clock terminal of the counter 1614. The counter 1614 receives the clock signal outputted from the gate 1613 and counts up the same.

The write or read address pointer 1615 receives an output signal from the address information generator 1109 (the current address information of the optical pickup) and a counter value of the counter 1614, calculates an address of the RAM corresponding to the current address of the optical pickup (the address of the RAM in which data to be recorded at the current address of the magneto-optical disk are stored (at the time of recording) or the address of the RAM in which data are to be reproduced from the current address of the magneto-optical disk (at the time of reproduction)) and outputs the same. The RAM 1113, using the clock signal outputted from the gate 1613 as a clock, reads out data which are at the address designated by the write or read address pointer 1615 (at the time of recording) or writes data at this address (at the time of reproduction).

In the structure above, when there is not a defective segment at the time of recording, data are recorded in a sequential order in the respective segments (excluding the spare segments) within the sectors of the magneto-optical disk, whereas when there is a defective segment at the time of recording, data are recorded in the segments excluding the defective segment but including the spare segments (The read address of the RAM 1113 is not incremented in the defective segments, and readout of data from the RAM 1113 does not occur.).

In a similar manner, when there is not a defective segment at the time of reproduction, data are read in a sequential order from the respective segments (excluding the spare segments) within the sectors of the magneto-optical disk and stored in the RAM 1113, whereas when there is a defective segment at the time of reproduction, data read out from the segments excluding the defective segment but including the spare segments are stored in the RAM 1113 (The write address of the RAM 1113 is not incremented in the defective segments.).

<Flow Chart of Write/Read Control Realized by Software (FIG. 17)>

FIG. 17 is a flow chart of write/read control realized by software using a micro computer which is other embodiment of the recording apparatus or the reproducing apparatus according to the embodiment 2 (which shows recording or reproduction processing of data representing one sector). In FIG. 17, since a processing speed during software processing by means of a micro computer is remarkably slower than that during processing realized by hardware, processing in units of bits is performed by hardware and processing in units of segments alone is executed by software. At the time of this application, it is impossible to execute processing in units of segments unless a micro computer whose speed is considerably high is used (because of a failure to catch up with the processing speed), however, it seems from the ongoing improvement in capability of micro computers year after year that it will be definitely possible to execute this processing using an inexpensive micro computer in the near future.

First, the total number of the segments contained in a sector in which recording or reproduction is desired and address information regarding a defective segment are loaded (Step 1701). As shown in Table 1 and the like, the number of the segments is different in different zones. In a recording medium wherein the management data were already written in a predetermined area of the recording medium, the step 1701 is carried out by reading the management data which are recorded in the predetermined area of the recording medium. In a blank recording medium, the step 1701 is carried out as an operator sets the recording density mode and management data corresponding to the recording density mode are written in the predetermined area of the recording medium. In a blank recording medium, defective segment information is obtained by actually recording data in the magneto-optical disk and verifying that data were correctly recorded.

Next, the segment counter=1 is set (Step 1702). Next, the optical pickup is moved to a position of a sector in which recording or reproduction is to be started, a permission to interrupt is given in response to the front edge signal representing the pre-pit area, and starting of recording or reproduction is instructed (Step 1703). The above is processed through a main routine of a software program, and the following processing is executed in an interruption processing routine which is included in the software program and which is in accordance with the front edge signal representing the pre-pit area.

An interruption owing to the front edge signal representing the pre-pit area occurs (Step 1704). Next, whether the segment counter matches with the address of the defective segment is checked (Step 1705). When the segment counter matches with the address of the defective segment, the sequence jumps to a step 1711. When the segment counter does not match with the address of the defective segment, the sequence proceeds to a step 1706.

At the step 1706, inputting of the write or read clock to the RAM 1113 is instructed. Next, the segment counter counts up by only one (the segment counter=the segment counter+1 Step 1707). Next, whether the value of the segment counter is larger than the total number of the segments contained in this sector (This is the number of the segments in this sector wherein recording or reproduction is to be performed. For instance, this is 1050 when there is not a defective segment within the sector belonging to the first zone but is 1051 when there is a defective segment.) is checked (Step 1708). When the value of the segment counter is larger than the total number of the segments contained in this sector, the sequence proceeds to a step 1710. When the value of the segment counter is not larger than (i.e., equal to or smaller than) the total number of the segments contained in this sector, return processing is executed and the interruption processing in accordance with the front edge signal representing the pre-pit area ends (Step 1709).

At the step 1710, an interruption in response to the front edge signal representing the pre-pit area is prohibited, and termination of recording or reproduction is instructed. FIG. 17 is a flow chart representing execution of recording in or reproduction from one sector, wherein the processing at the step 1710 is carried out upon completion of recording in or reproduction from one sector. When recording in or reproduction from a plurality of sectors is desired, counters are set as many as the number of the sectors, these counters count up by one every time the segment counter exceeds the total number of the segments, and the segment counter=0 is set every time this occurs, thereby repeating the interruption processing at and after the step 1704. When the values of the counters reach a target number of sectors, the processing at the step 1710 is executed.

The step 1711 is executed following the step 1710. At the step 1711, inputting of the write or read clock to the RAM 1113 is stopped. Next, the return processing is executed (Step 1712).

The optical disk according to the embodiment 2 realizes such a recording medium which achieves a similar effect to that of the optical disk according to the embodiment 1 and which minimizes a recording area which will be lost upon occurrence of a defective segment.

<<Embodiment 3>>

While the magneto-optical disk according to the embodiment 1 comprises the groove portions in which the recording tracks are formed, a magneto-optical disk according to the embodiment 3 shown in FIG. 18 has a flat cross sectional shape exhibiting a high reflectance value and spiral recording tracks are formed on the flat optical disk.

Part (a) of FIG. 18 shows a general overall structure of the magneto-optical disk according to the embodiment 3.

In part (a) of FIG. 18, denoted at 1801 is an optical disk substrate, denoted at 1802 is a recording film (the reproduction layer 13, the intermediate layer 14 and the recording layer 15 in FIG. 7), denoted at 1803 is a first recording track, denoted at 1804 is a second recording track which is next to the first recording track, denoted at 1805 are segments obtained by dividing the first recording track 1803 and the second recording track 1804 into 1280 pieces, denoted at 1806 and 1813 are pre-pit areas (pre-formatted areas) which contain start pits, servo pits for tracking and address pits which express position information on the disk.

As shown in the drawing, the first recording track 1803 and the second recording track 1804 are spiral areas which start and end at the pre-pit areas 1813: When the spiral recording tracks are traced from an inner round toward an outer round of the magneto-optical disk, the second recording track 1804 ends at the pre-pit areas 1813, and the first recording track 1803 starts where the second recording track 1804 ends (the pre-pit areas 1813).

In part (a) of FIG. 18, while the magneto-optical disk is a disk whose diameter is about 50 mm, a track pitch between the first recording track 1803 and the second recording track 1804 is about 0.6 μm. In part (a) of FIG. 18 which aims at describing a format structure of the magneto-optical disk, as compared to the size of the magneto-optical disk as a whole, the first recording track 1803 and the second recording track 1804 which are next to each other are shown as they are extremely enlarged.

Part (b) of FIG. 18 is a schematic enlarged view of one segment 1805.

In part (b) of FIG. 18, denoted at 1805 is a segment (which is comprised of one recording track and one pre-pit area), denoted at 1806 is a pre-pit area (pre-formatted area), and an area 1815 having a length 1807 is a recording track (data recording area) for recording of data.

The pre-pit area 1806 comprises start pits 1816, wobble pits 1808 and 1809 for detecting a tracking signal and address pits 1810 in which address information expressing position information on the magneto-optical disk is distributed one bit each at the beginning of a segment.

The recording track 1815 has a flat shape, so as to obtain a high S/N signal.

The magneto-optical disk according to the embodiment 3 comprises a recording film which is suitable to the CAD type (Center Aperture Detection, or center aperture super resolution reproduction method).

Japanese Patent Application Laid-Open No. 5-12732, Japanese Patent Application Laid-Open No. 10-74343 and Japanese Patent Application Laid-Open No. 10-241218 disclose a magneto-optical disk of the CAD type.

A magneto-optical disk of the CAD type is one type of magneto-optical disks using a super resolution reproduction method, and like a magneto-optical disk of the DWDD type, suitable as an application of the present invention since an improved capability of a recording medium and application of the present invention realizes an improvement in recording density of the recording medium of an existing format without changing the value $\lambda/(2\cdot NA)$.

The magneto-optical recording medium according to the present invention is a magneto-optical recording medium which is for recording and reproduction of a signal of the CAD type at a track pitch of 1 μm or smaller (0.6 μm in the embodiment 3), and in which the wobble pits 1808 and 1809 for tracking servo of the sample servo method are shared by the adjacent tracks.

A method of fabricating the magneto-optical disk and operation principles according to the embodiment 3 will now be described.

Transferred from a stamper at the time of injection, the clock pits 1816, the wobble pits 1808 and 1809 and the address pits 1810 of the pre-pit areas 1806 are formed on the optical disk substrate 1801 of polycarbonate. By a sputtering method, the recording/reproduction film 1802 of the CAD type is formed on the optical disk substrate 1801 molded by the injection method.

Although the CAD recording/reproduction 1802 is shown in part (a) of FIG. 18 as a single layer for simplicity of illustration, on a dielectric layer, a recording film, which has a three-layer structure comprised of a reproduction layer, an intermediate layer and a recording layer, and a protective coat layer of an ultraviolet hardening resin are formed. In the reproduction layer, magnetization at a temperature near a room temperature is in-plane magnetization which is parallel to a film surface, so that a mask area in which a signal is not reproduced is formed. As the reproduction layer is irradiated with laser light during reproduction and accordingly reaches a high temperature, the magnetization in the reproduction layer decreases and becomes vertical magnetization, thereby realizing an aperture area in which magnetization in the recording film is transferred by means of the force of switched connections. Since a signal is reproduced only from a high temperature portion (aperture area) inside an irradiation spot of the laser light during reproduction, a reproduction spot effectively reduces and the minimum mark length on the magneto-optical disk becomes small. For instance, the recording film uses a magnetic film material which causes transition from within a plane to a vertical film in accordance with an increase in temperature, the intermediate layer uses a non-magnetic film, and the recording layer uses a magnetic film which is capable of holding a recording magnetic domain even despite a small domain diameter.

The magneto-optical disk according to the present invention fabricated in this manner comprises the recording tracks 1803 and 1804 formed in a spiral shape and the like, and the recording tracks 1803 and 1804 and the like are divided each into 1280 pieces of the segments 1805 by the pre-pit areas 1806 which are disposed radially (along the radius direction of the magneto-optical disk). The pre-pit areas 1806 in the respective segments are aligned along the radius direction of the magneto-optical disk. Hence, when expressed in angular coordinates whose origin is the center of the magneto-optical disk, the pre-pit areas are located at every 360 degrees/1280 pieces=0.28125 degree on the magneto-optical disk, regardless of distances of positions of the recording tracks from the origin. One segment 1805 comprises one pre-pit area 1806 and one recording track 1815.

The magneto-optical disk according to the present invention assumes-that optical constants of a light spot which is used for recording/reproduction are an optical wavelength of 660 nm and a condenser lens NA of 0.6. A half width value of a light beam in this case is $\lambda/(2\cdot NA)$=about 0.6 μm.

Considering a margin which is needed to eliminate an influence by tilting of the disk, cross light from a adjacent track during recording, deforcus, etc., the track pitch is set to 0.6 μm.

For the purpose of realizing tracking servo in a magneto-optical disk in which a track pitch is equal to or smaller than a half width value of a light beam, in the magneto-optical disk according to the present invention, the wobble pits 1808 and 1809 for tracking are formed in the pre-pit areas 1806 and either the wobble pits 1808 or 1809 are shared by adjacent recording tracks. Based on such a structure, the first recording track 1803 and the second recording track 1804 are provided alternately each other each round which have different tracking polarities (with the wobble pits 1808 and 1809 located one on the right-hand side and the other on the left-hand side to extension of the recording track in one case, and with the wobble pits 1808 and 1809 located one on the left-hand side and the other on the right-hand side thus in the opposite manner in other case).

Segments where the first recording track and the second recording track switch with each other have such a structure as that shown in part (c) of FIG. 18. As shown in part (c) of FIG. 18, in the pre-pit areas 1806 on the right-hand side and the other on the left-hand side to the recording track of the switching point segment 1812, the fore-and-aft relationship between the wobble pits 1808 and 1809 is reversed. As a result, the second recording track 1804 switches to the first recording track 1803. This is repeated alternately, whereby the first recording track 1803 and the second recording track 1804 are disposed continuously.

The only difference of the magneto-optical disk according to the embodiment 3 from the magneto-optical disk according to the embodiment 1 is that the magneto-optical disk comprises the recording film of the CAD type, the recording tracks 1815 are formed in the flat surface and there are the clock pits 1816 formed. Owing to a high light reflectance value, the magneto-optical disk according to the embodiment 3 allows to obtain a reproduction signal having a high S/N. In the magneto-optical disk according to the embodiment 3, since there is not a ditch portion, it is not possible to use a method which requires a disk drive to detect boundaries between ditch portions and pre-pit areas (e.g., the pre-pit area front edge detector 401). Since the magneto-optical disk according to the embodiment 3 comprises the clock pits 1816, the clock pits 1816 are detected instead of detecting the front edges of the pre-pit areas.

A period of time during which the optical pickup moves passing the recording tracks 1815 (i.e., a period of time from a rear edge to a front edge of the pre-pit area) is the longest period during which the amount of reflected light remains at a low level because of diffraction from the ditches. Based on this longest period (a unique period of time which can be distinguished from other signals), the clock pits 1816 can be detected. With the wobble pits 1808 and 1809, the address pits 1810 and the like detected referring to the clock pits 1816, it is possible to generate a clock signal for data which are to be recorded in or reproduced from the recording tracks. This permits to execute tracking control, generation of address information, recording or reproduction of data, etc., in a similar manner to that regarding the disk medium and the disk drive according to the embodiment 1.

In the optical disk according to the present invention, the segments are arranged radially and there is no physical zone structure. In this embodiment, the disk is divided into nine imaginary zones and the closer to the outer round, the larger the frequency divide ratio of the frequency divider becomes (The closer to the outer round, the larger volume of data are recorded in one segment becomes. This is because the closer to the outer round, the recording track of one segment becomes longer.), so that a recording density per unit recording track length is made approximately constant from the inner round toward the outer round. This makes it possible to record data at a high density which is practically a top limit all the way from the inner round toward the outer round. Because of this, the closer the zone is to the outer round, the smaller the number of segments contained in one sector (This is a recording area which is necessary to record data representing one ECC block. In the embodiment 3, one sector=306,500 bits.) becomes. The magneto-optical disk according to the embodiment 3 executes recording or reproduction of data and the like, by means of any desired one of the sector allocations shown in Table 1 through Table 5 for instance.

Thus, even when the optical disk does not have a physical zone structure, by means of the imaginary zone structure, a recording density of the optical disk can be enhanced in a similar manner to the conventional techniques such as ZCAV and ZCLV. Further, since there is no physical zone structure (There is no such zone structure which can not be changed.), it is possible to provide an optical disk which is easily accessed and flexible against a future improvement in density. In addition, as compared with a conventional optical disk in which the address redundancy increases when a super resolution reproduction method is used (The proportion of address areas to the surface area size of the recording medium increases.), the redundancy of the address portions is reduced lower since the number of the addresses is not the same as the number of the sectors like in the embodiment 1.

The sector allocation information (management data) shown in Table 1 or the like is recorded in a predetermined recording area on the inner-most periphery of the optical disk according to the embodiment 3. While the type of management data stored in the predetermined recording area for the purpose of specifying a position of each sector may be any desired type, considering the ease of calculations, it is desirable to store the sector numbers at the starting points of the respective zones. As the management data are rewritten, the allocation of the sectors in the magneto-optical disk is changed.

The magneto-optical disk according to the embodiment 3 which uses a super resolution reproduction method such as the CAD type is suitable as an application of the present invention since an improved capability of a recording medium and application of the present invention realize an improvement in recording density of a recording medium of an existing format without changing the value λ/(2·NA).

However, even an application of the present invention to a conventional recording medium (such as an optical disk whose recording limit is a mark length (a length of one piece of data on a recording medium) of λ/(2·NA)for example) achieves an effect such as a reduction in seek time and a high recording density. Hence, applications of the present invention are not limited to an optical disk which uses a super resolution reproduction method.

The recording film using the CAD type of the magneto-optical disk according to the embodiment 3 may be replaced with a recording film of the DWDD type. In a recording film of the DWDD type, since a reproduction layer must exhibit high mobility of a magnetic domain, annealing is performed with laser irradiated upon areas between the adjacent recording tracks 1815 for example (portions which correspond to the inter-ditch portions in the magneto-optical disk according to the embodiment 1) and the adjacent recording tracks 1815 are accordingly magnetically blocked from each other.

<<Embodiment 4>>

While the recording tracks are formed in the groove portions in the magneto-optical disk according to the embodiment 1, in a magneto-optical disk according to the embodiment 4 shown in FIG. 19, the recording tracks are formed in the land portions.

Part (a) of FIG. 19 shows a general overall structure of the magneto-optical disk according to the embodiment 4.

In part (a) of FIG. 19, denoted at 1901 is an optical disk substrate, denoted at 1902 is a recording film (the reproduction layer 13, the intermediate layer 14 and the recording layer 15 in FIG. 7), denoted at 1903 is a first recording track, denoted at 1904 is a second recording track which is next to the first recording track, denoted at 1905 are segments obtained by dividing the first recording track 1903 and the second recording track 1904 into 1280 pieces, denoted at 1906 and 1913 are pre-pit areas (pre-formatted areas) which contain servo pits for tracking and address pits which express position information on the disk. As shown in the drawing, the first recording track 1903 and the second recording track 1904 are spiral areas which start and end at the pre-pit areas 1913: When the spiral recording tracks are traced from an inner round toward an outer round of the magneto-optical disk, the second recording track 1904 ends at the pre-pit areas 1913, and the first recording track 1903 starts where the second recording track 1904 ends (the pre-pit areas 1913).

In part (a) of FIG. 19, while the magneto-optical disk is a disk whose diameter is about 50 mm, a track pitch of the first recording track 1903 and the second recording track 1904 is about 0.6 μcm. In part (a) of FIG. 19 which aims at describing a format structure of the magneto-optical disk, as compared to the size of the magneto-optical disk as a whole, the first recording track 1903 and the second recording track 1904 which are next to each other are shown as they are extremely enlarged.

Part (b) of FIG. 19 is a schematic enlarged view of one segment 1905. In part (b) of FIG. 19, denoted at 1905 is a segment (which is comprised of one recording track and one pre-pit area), and denoted at 1906 is a pre-pit area (pre-formatted area). In an inter-ditch portion 1914 having a length of 1907, the recording tracks (data recording areas) for recording of data are formed. The pre-pit area 1906 comprises wobble pits 1908 and 1909 for detecting a tracking signal and address pits 1910 in which address information expressing position information on the magneto-optical disk is distributed one bit each at the beginning of a segment.

In the magneto-optical disk according to the embodiment 4, as described above, the recording tracks are formed in the land portions and the two adjacent inter-ditch portions 1914 are magnetically blocked from each other. Because of this, the magneto-optical disk according to the embodiment 4 is suitable to reproduction by the DWDD scheme.

The magneto-optical recording medium according to the present invention is a magneto-optical recording medium which is for recording and reproduction of a signal by the DWDD scheme at a track pitch of lam or smaller (0.6 μm in the embodiment 4), and in which the wobble pits 1908 and 1909 for tracking servo of the sample servo method are shared by the adjacent tracks.

A method of fabricating the magneto-optical disk and operation principles according to the embodiment 4 will now be described. Transferred from a stamper at the time of injection, the wobble pits 1908 and 1909 and the address pits 1910 of the pre-pit areas 1906 are formed on the optical disk substrate 1901 of polycarbonate. By a sputtering method, the recording/reproduction film 1902 of the DWDD type, which is a super resolution reproduction method utilizing movement of a magnetic wall, is formed on the optical disk substrate 1901 molded by the injection method.

Although the DWDD recording/reproduction 1902 is shown in part (a) of FIG. 19 as a single layer for simplicity of illustration, on a dielectric layer, a recording film, which has a three-layer structure comprised of a reproduction layer, an intermediate layer and a recording layer, and a protective coat layer of an ultraviolet hardening resin are formed (which is the same structure as that of the recording film of the magneto-optical disk according to the embodiment 1).

The magneto-optical disk according to the present invention fabricated in this manner comprises the first recording track 1903 and the second recording track 1904 formed in a spiral shape and the like, and the recording tracks 1903 and 1904 and the like are divided each into 1280 pieces of the segments 1905 by the pre-pit areas 1906 which are disposed radially (along the radius direction of the magneto-optical disk). The pre-pit areas 1906 of the respective segments are aligned in the radius direction of the magneto-optical disk. Hence, when expressed in angular coordinates whose origin is the center of the magneto-optical disk, the pre-pit areas are located at every 360 degrees/1280 pieces=0.28125 degree on the magneto-optical disk, regardless of distances of positions of the recording tracks from the origin. One segment 1905 comprises one pre-pit area 1906 and one data recording area (inter-ditch portion 1914).

The magneto-optical disk according to the present invention is made assuming that optical constants of a light spot which is used for recording/reproduction are an optical wavelength of 660 nm and a con-denser lens NA of 0.6. A half width value of a light beam in this case is $\lambda/(2\cdot NA)$ =about 0.6 μm. Considering a margin which is needed to eliminate an influence by cross light from a adjacent track during recording, deforcus, tilting of the disk, etc., the track pitch is set to 0.6 μm.

For the purpose of realizing tracking servo in a magneto-optical disk in which a track pitch is equal to or smaller than a half width value of a light beam, in the magneto-optical disk according to the present invention, the wobble pits 1908 and 1909 for tracking are formed in the pre-pit areas 1906 and either the wobble pits 1908 or 1909 are shared by adjacent recording tracks. Based on such a structure, the first recording track 1903 and the second recording track 1904 are provided alternately each other each round which have different tracking polarities (with the wobble pits 1908 and 1909 located one on the right-hand side and the other on the left-hand side to extension of the recording track in one case, and with the wobble pits 1908 and 1909 located one on the left-hand side and the other on the right-hand side thus in the opposite manner in other case).

In the pre-pit areas 1906 on the right-hand side and the other on the left-hand side to the recording track of switching point segment 1912, the fore-and-aft relationship between the wobble pits 1908 and 1909 is reversed. As a result, the second recording track 1904 switches to the first recording track 1903. This is repeated alternately, whereby the first recording track 1903 and the second recording track 1904 are disposed continuously.

The only difference of the magneto-optical disk according to the embodiment 4 from the magneto-optical disk according to the embodiment 1 is that the recording tracks are formed in the land portions. The magneto-optical disk according to the embodiment 4 can realize a magneto-optical disk which has a high recording density. As compared with the amount of reflected light of laser in the pre-pit areas, the amount of reflected light of laser in the land portions 1914 is smaller because of an influence exerted from the ditch portions on the both sides. This permits to detect the front edges of the pre-pit areas, as in the magneto-optical disk according to the embodiment 1. The magneto-optical disk and the disk drive for the same according to the embodiment 4 make it possible to execute tracking control, generation of address information, recording or reproduction of data and the like, similarly to the magneto-optical disk and the disk drive for the same according to the embodiment 1.

In the optical disk according to the present invention, the segments are arranged radially and there is no physical zone structure. In this embodiment, the disk is divided into nine imaginary zones and the closer to the outer round, the larger the frequency divide ratio of the frequency divider becomes (The closer to the outer round, the larger volume of data are recorded in one segment becomes. This is because the closer to the outer round, the recording track of one segment becomes longer.), so that a recording density per unit recording track length is made approximately constant from the inner round toward the outer round. This makes it possible to record data at a high density which is practically a top limit all the way from the inner round toward the outer round. Because of this, the closer the zone is to the outer round, the smaller the number of segments contained in one sector (This is a recording area which is necessary to record data representing one ECC block. In the embodiment 4, one sector=306,500 bits.) becomes. The magneto-optical disk according to the embodiment 4 executes recording or reproduction of data and the like, by means of any desired one of the sector allocations shown in Table 1 through Table 5 for instance.

Thus, even when the optical disk does not have a physical zone structure, by means of the imaginary zone structure, a recording density of the optical disk can be enhanced in a similar manner to the conventional techniques such as ZCAV and ZCLV. Further, since there is no physical zone structure (There is no such zone structure which can not be changed.), it is possible to provide an optical disk which is easily accessed and flexible against a future improvement in density. In addition, as compared with a conventional optical disk in which the address redundancy increases when a super resolution reproduction method is used (The proportion of address areas to the surface area size of the recording medium increases.), the redundancy of the address portions is reduced lower since the number of the addresses is not the same as the number of the sectors like in the embodiment 1.

The sector allocation information (management data) shown in Table 1 or the like is recorded in a predetermined recording area on the inner-most periphery of the optical disk according to the embodiment 4. While the type of management data stored in the predetermined recording area for the purpose of specifying a position of each sector may be any desired type, considering the ease of calculations, it is desirable to store the sector numbers at the starting points of the respective zones. As the management data are rewritten, the allocation of the sectors in the magneto-optical disk is changed.

The magneto-optical disk according to the embodiment 4 which uses a super resolution reproduction method such as the DWDD scheme is suitable as an application of the present invention since an improved capability of a recording medium and application of the present invention realize an improvement in recording density of a recording medium of an existing format without changing the value $\lambda/(2\cdot NA)$.

However, even an application of the present invention to a conventional recording medium (such as an optical disk whose recording limit is a mark length (a length of one piece of data on a recording medium) of λ/(2·NA) for example) achieves an effect such as a reduction in seek time and a high recording density.

Hence, applications of the present invention are not limited to an optical disk which uses a super resolution reproduction method.

<<Embodiment 5>>

While the recording tracks are formed in the groove portions in the magneto-optical disk according to the embodiment 1, a magneto-optical disk according to the embodiment 5 shown in FIG. 20 is a magneto-optical disk of the land/groove type in which recording tracks are formed in land portions and groove portions.

Part (a) of FIG. 20 shows a general overall structure of the magneto-optical disk according to the embodiment 5. In part (a) of FIG. 20, denoted at 2001 is an optical disk substrate, denoted at 2002 is a recording film (the reproduction layer 13, the intermediate layer 14 and the recording layer 15 in FIG. 7), denoted at 2003 is a first recording track, denoted at 2004 is a second recording track which is next to the first recording track, denoted at 2005 are segments obtained by dividing the first recording track 2003 and the second recording track 2004 into 1280 pieces, denoted at 2006 and 2013 are pre-pit areas (pre-formatted areas) which contain servo pits for tracking and address pits which express position information on the disk. As shown in the drawing, the first recording track 2003 and the second recording track 2004 are spiral areas which start and end at the pre-pit areas 2013: When the spiral recording tracks are traced from an inner round toward an outer round of the magneto-optical disk, the second recording track 2004 ends at the pre-pit areas 2013, and the first recording track 2003 starts where the second recording track 2004 ends (the pre-pit areas 2013).

In part (a) of FIG. 20, while the magneto-optical disk is a disk whose diameter is about 50 mm, a track pitch of the first recording track 2003 and the second recording track 2004 is about 0.6 μm. In part (a) of FIG. 20 which aims at describing a format structure of the magneto-optical disk, as compared to the size of the magneto-optical disk as a whole, the first recording track 2003 and the second recording track 2004 which are next to each other are shown as they are extremely enlarged.

Part (b) of FIG. 20 is a schematic enlarged view of one segment 2005.

In part (b) of FIG. 20, denoted at 2005 is a segment (which is comprised of one recording track and one pre-pit area), and denoted at 2006 is a pre-pit area (pre-formatted area). In a ditch portion 2011 having a length of 2007 and an inter-ditch portion 2014 having the length 2007, the recording tracks (data recording areas) for recording of data are formed.

The pre-pit area 2006 comprises wobble pits 2008 and 2009 for detecting a tracking signal and address pits 2010 in which address information expressing position information on the magneto-optical disk is distributed one bit each at the beginning of a segment.

In the magneto-optical disk according to the embodiment 5, the recording tracks are formed in both the land portions and the groove portions as described above, and therefore, a recording density is high. Further, the ditch portions 2011 and the inter-ditch portions 2014 which are next to each other are magnetically blocked from each other. For this reason, the magneto-optical disk according to the embodiment 5 is suitable to reproduction of the DWDD type.

The magneto-optical recording medium according to the present invention is a magneto-optical recording medium which is for recording and reproduction of a signal by the DWDD scheme at a track pitch of 1 μm or smaller (0.6 μm in the embodiment 5), and in which the wobble pits 2008 and 2009 for tracking servo of the sample servo method are shared by the adjacent tracks.

A method of fabricating the magneto-optical disk and operation principles according to the embodiment 5 will now be described. Transferred from a stamper at the time of injection, the wobble pits 2008 and 2009 and the address pits 2010 of the pre-pit areas 2006 are formed on the optical disk substrate 2001 of polycarbonate. By a sputtering method, the recording/reproduction film 2002 of the DWDD type, which is a super resolution reproduction method utilizing movement of a magnetic wall, is formed on the optical disk substrate 2001 molded by the injection method.

The recording/reproduction film 2002 of the DWDD type shown as a simplified film in part (a) of FIG. 20 comprises a recording film, which has a three-layer structure comprised of a reproduction layer, an intermediate layer and a recording layer, and a protection layer (a protective coat layer of an ultraviolet hardening resin) which is disposed on this are formed on a dielectric layer (which is the same structure as that of the recording film of the magneto-optical disk according to the embodiment 1).

The magneto-optical disk according to the present invention fabricated in this manner comprises the first recording track 2003 and the second recording track 2004 formed in a spiral shape and the like, and the recording tracks 2003 and 2004 and the like are divided each into 1280 pieces of the segments 2005 by the pre-pit areas 2006 which are disposed radially (along the radius direction of the magneto-optical disk). The pre-pit areas 2006 of the respective segments are aligned in the radius direction of the magneto-optical disk. Hence, when expressed in angular coordinates whose origin is the center of the magneto-optical disk, the pre-pit areas are located at every 360 degrees/1280 pieces=0.28125 degree on the magneto-optical disk, regardless of distances of positions of the recording tracks from the origin. One segment 2005 comprises one pre-pit area 2006 and one data recording area (the ditch portion 2011 or the inter-ditch portion 2014).

The magneto-optical disk according to the present invention is made assuming that optical constants of a light spot which is used for recording/reproduction are an optical wavelength of 660 nm and a condenser lens NA of 0.6. A half width value of a light beam in this case is λ/(2·NA) =about 0.6 μm. Considering a margin which is needed to eliminate an influence by cross light from a adjacent track during recording, deforcus, tilting of the disk, etc., the track pitch is set to 0.6 μm.

For the purpose of realizing tracking servo in a magneto-optical disk in which a track pitch is equal to or smaller than a half width value of a light beam, in the magneto-optical disk according to the present invention, the wobble pits 2008 and 2009 for tracking are formed in the pre-pit areas 2006 and either the wobble pits 2008 or 2009 are shared by adjacent recording tracks. Based on such a structure, the first recording track 2003 and the second recording track 2004 are provided alternately each other each round which have different tracking polarities (with the wobble pits 2008 and 2009 located one on the right-hand side and the other on the left-hand side to extension of the recording track in one case, and with the wobble pits 2008 and 2009 located one on the left-hand side and the other on the right-hand side thus in the opposite manner in other case).

In the pre-pit areas 2006 on the right-hand side and the other on the left-hand side to the recording track of switching point segment 2012, the fore-and-aft relationship between the wobble pits 2008 and 2009 is reversed. As a result, the second recording track 2004 switches to the first recording track 2003. This is repeated alternately, whereby the first recording track 2003 and the second recording track 2004 are disposed continuously.

The only difference of the magneto-optical disk according to the embodiment 5 from the magneto-optical disk according to the embodiment 1 is that the magneto-optical disk is a magneto-optical disk of the land/groove type in which recording tracks are formed not only in ditch portions but also in land portions. The magneto-optical disk according to the embodiment 5 can realize a magneto-optical disk which has a high recording density. The magneto-optical disk and the disk drive for the same according to the embodiment 5 make it possible to execute tracking control, generation of address information, recording or reproduction of data and the like, similarly to the magneto-optical disk and the disk drive for the same according to the embodiment 1.

In the optical disk according to the present invention, the segments are arranged radially and there is no physical zone structure. In this embodiment, the disk is divided into nine imaginary zones and the closer to the outer round, the larger the frequency divide ratio of the frequency divider becomes (The closer to the outer round, the larger volume of data are recorded in one segment becomes. This is because the closer to the outer round, the recording track of one segment becomes longer.), so that a recording density per unit recording track length is made approximately constant from the inner round toward the outer round. This makes it possible to record data at a high density which is practically a top limit all the way from the inner round toward the outer round. Because of this, the closer the zone is to the outer round, the smaller the number of segments contained in one sector (This is a recording area which is necessary to record data representing one ECC block. In the embodiment 5, one sector=306,500 bits.) becomes. The magneto-optical disk according to the embodiment 5 executes recording or reproduction of data and the like, by means of any desired one of the sector allocations shown in Table 1 through Table 5 for instance.

Thus, even when the optical disk does not have a physical zone structure, by means of the imaginary zone structure, a recording density of the optical disk can be enhanced in a similar manner to the conventional techniques such as ZCAV and ZCLV. Further, since there is no physical zone structure (There is no such zone structure which can not be changed.), it is possible to provide an optical disk which is easily accessed and flexible against a future improvement in density. In addition, as compared with a conventional optical disk in which the address redundancy increases when a super resolution reproduction method is used (The proportion of address areas to the surface area size of the recording medium increases.), the redundancy of the address portions is reduced lower since the number of the addresses is not the same as the number of the sectors like in the embodiment 1.

The sector allocation information (management data) shown in Table 1 or the like is recorded in a predetermined recording area on the inner-most periphery of the optical disk according to the embodiment 5. While the type of management data stored in the predetermined recording area for the purpose of specifying a position of each sector may be any desired type, considering the ease of calculations, it is desirable to store the sector numbers at the starting points of the respective zones. As the management data are rewritten, the allocation of the sectors in the magneto-optical disk is changed.

The magneto-optical disk according to the embodiment 5 using the DWDD scheme which is one of super resolution reproduction methods is suitable as an application of the present invention since an improved capability of a recording medium and application of the present invention realize an improvement in recording density of a recording medium of an existing format without changing the value $\lambda/(2\cdot NA)$. However, even an application of the present invention to a conventional recording medium (such as an optical disk whose recording limit is a mark length (a length of one piece of data on a recording medium) of $\lambda/(2\cdot NA)$ for example) achieves an effect such as a reduction in seek time and a high recording density.

Hence, applications of the present invention are not limited to an optical disk which uses a super resolution reproduction method.

<<Embodiment 6>>

A magneto-optical disk according to the embodiment 6 is a magneto-optical disk of a land/groove type in which recording tracks are formed in both land portions and groove portions, which is similar to the optical disk according to the embodiment 5.

In the optical disk according to the embodiment 5, the recording tracks formed in the land portions and the recording tracks formed in the groove portions are positioned alternately. In contrast, in the optical disk according to the embodiment 6, first recording tracks 2203 formed in the groove portions and second recording tracks 2204 formed in the land portions are separate recording tracks from each other, which do not intersect each other but remain parallel to each other all the way from an inner round toward an outer round.

Further, in the optical disk according to the embodiment 5, the recording tracks in the groove portions and the recording tracks in the land portions located at the same radial position from the center belong to the same zone, and a recording density in the recording tracks in the land portions and a recording density in the recording tracks in the groove portions which are provided within the same zone are equal to each other (The number of bits in data recorded in one segment is the same.). On the contrary, in the optical disk according to the embodiment 6, the recording tracks in the groove portions and the recording tracks in the land portions located at the same radial position from the center belong to different zones (There is a zone which contain only the first recording tracks 2203 formed in the groove portions and a zone which contain only the second recording tracks 2204 formed in the land portions.), and a recording density in the recording tracks in the groove portions and a recording density in the recording tracks in the land portions located at the same radial position from the center are different from each other (The number of bits in data recorded in one segment is different.).

Part (a) of FIG. 22 shows a general overall structure of the magneto-optical disk according to the embodiment 6. In part (a) of FIG. 22, denoted at 2201 is an optical disk substrate, denoted at 2202 is a recording film (the reproduction layer 13, the intermediate layer 14 and the recording layer 15 in FIG. 7), denoted at 2203 is the first recording track provided in the groove portion, denoted at 2204 is the second recording track provided in the land portion which is next to the first recording track, denoted at 2205 are segments obtained by dividing the first recording track 2203 and the second recording track 2204 into 1280 pieces, denoted at 2206 and 2213 are pre-pit areas (pre-formatted areas) which contain servo pits for tracking and address pits which express position information on the disk. As described above, the first recording track 2203 and the second recording track 2204 are separate areas from each other which are disposed parallel to each other and have a spiral shape.

In part (a) of FIG. 22, while the magneto-optical disk is a disk whose diameter is about 50 mm, a track pitch between the first recording track 2203 and the second recording track 2204 is about 0.6 μm. In part (a) of FIG. 22 which aims at describing a format structure of the magneto-optical disk, as compared to the size of the magneto-optical disk as a whole, the first recording track 2203 and the second recording track 2204 which are next to each other are shown as they are extremely enlarged.

Part (b) of FIG. 22 is a schematic enlarged view of one segment 2205.

In part (b) of FIG. 22, denoted at 2205 is a segment (which is comprised of one recording track and one pre-pit area), and denoted at 2206 is a pre-pit area (pre-formatted area). In a ditch portion 2211 having a length of 2207 and an inter-ditch portion 2214 having the length 2207, there are the first recording tracks (data recording areas) 2203 for recording of data and the second recording tracks 2204.

The pre-pit area 2206 comprises wobble pits 2208 and 2209 for detecting a tracking signal and address pits 2210 in which address information expressing position information on the magneto-optical disk is distributed one bit each at the beginning of a segment.

In the magneto-optical disk according to the embodiment 6, the ditch portion 2211 and the inter-ditch portion 2214 which are next to each other are magnetically blocked from each other. The magneto-optical disk according to the embodiment 6 is suitable to reproduction of the DWDD type.

The magneto-optical recording medium according to the present invention is a magneto-optical recording medium which is for recording and reproduction of a signal by the DWDD scheme at a track pitch of 1 μm or smaller (0.6 μm in the embodiment 6), and in which the wobble pits 2208 and 2209 for tracking servo of the sample servo method are shared by the adjacent tracks.

A method of fabricating the magneto-optical disk and operation principles according to the embodiment 6 will now be described. Transferred from a stamper at the time of injection, the wobble pits 2208 and 2209 and the address pits 2210 of the pre-pit areas 2206 are formed on the optical disk. substrate 2201 of polycarbonate. By a sputtering method, the recording/reproduction film 2202 of the DWDD type, which is a super resolution reproduction method utilizing movement of a magnetic wall, is formed on the optical disk substrate 2201 molded by the injection method.

The recording/reproduction film 2202 of the DWDD type shown as a simplified film in part (a) of FIG. 22 the same structure as that of the recording film of the magneto-optical disk according to the embodiment 1.

The magneto-optical disk according to the present invention fabricated in this manner comprises the first recording track 2203 and the second recording track 2204 formed in a spiral shape and the like, and the recording tracks 2203 and 2204 and the like are divided each into 1280 pieces of the segments 2205 by the pre-pit areas 2206 which are disposed radially (along the radius direction of the magneto-optical disk). The pre-pit areas 2206 of the respective segments are aligned in the radius direction of the magneto-optical disk. Hence, when expressed in angular coordinates whose origin is the center of the magneto-optical disk, the pre-pit areas are located at every 360 degrees/1280 pieces=0.28125 degree on the magneto-optical disk, regardless of distances of positions of the recording tracks from the origin. One segment 2205 comprises one pre-pit area 2206 and one data recording area (the ditch portion 2211 or the inter-ditch portion 2214).

The magneto-optical disk according to the present invention is made assuming that optical constants of a light spot which is used for recording/reproduction are an optical wavelength of 660 nm and a condenser lens NA of 0.6. A half width value of a light beam in this case is $\lambda/(2\cdot NA)$= about 0.6 μm. Considering a margin which is needed to eliminate an influence by cross light from a adjacent track during recording, deforcus, tilting of the disk, etc., the track pitch is set to 0.6 μm.

For the purpose of realizing tracking servo in a magneto-optical disk in which a track pitch is equal to or smaller than a half width value of a light beam, in the magneto-optical disk according to the present invention, the wobble pits 2208 and 2209 for tracking are formed in the pre-pit areas 2206 and either the wobble pits 2208 or 2209 are shared by adjacent recording tracks.

In the optical disk according to the present invention, the segments are arranged radially and there is no physical zone structure. In this embodiment, as shown in FIG. 2, the disk is divided into nine imaginary zones in accordance with a distance along the radius direction, each zone is further divided into a zone (hereinafter referred to as a "first recording track zone") which is formed by the first recording tracks 2203 (which are disposed in the ditch portions 2211) and a zone (hereinafter referred to as a "second recording track zone") which is formed by the second recording tracks 2204 (which are disposed in the inter-ditch portions 2214) (to thereby make 9×2=18 zones).

Two zones (the first recording track zone and the second recording track zone) located on the same distances along the radius direction on the disk have different frequency divide ratios. The frequency divide ratio of the frequency divider is about 20% higher in the second recording track zone than in the first recording track zone, whereby the volume of data recorded in one segment is increased. This is because marks recorded in the inter-ditch portions (land portions) 2214 are more stable than in the ditch portions (groove portions) 2211 and therefore it is possible to record without missing even a short recording mark and enhance a recording density.

The closer to the outer round, the larger the frequency divide ratio of the frequency divider is made (The closer to the outer round, the larger the volume of recording data in one segment is made. This is because the closer to the outer round, the recording track of one segment becomes longer.), so that a recording density per unit recording track length is made approximately constant from the inner round toward the outer round each in the first recording track zone and the second recording track zone.

The magneto-optical disk according to the embodiment 6 executes recording or reproduction of data and the like, by means of the sector allocation shown in Table 6 (Table 6 is an example.). In Table 6, odd zones are the first recording track zone (in which the same number of bits are recorded as in Table 1) while even zones are the second recording track zone (in which the same number of bits are recorded as in Table 2).

TABLE 6

| ZONE NUMBER | THE NUMBER OF TRACKS | TRACK NUMBER (DECIMAL SYSTEM) | THE NUMBER OF BITS PER SEGMENT (FREQUENCY DIVIDING RATIO) | RECORD-ABLE BIT NUMBER | THE NUMBER OF RECORDABLE BITS | THE NUMBER OF BITS PER SECTOR | THE NUMBER OF SECTORS | SECTOR NUMBER (DECIMAL SYSTEM) |
|---|---|---|---|---|---|---|---|---|
| 1 | 1,000 | 0–999 | 325 | 27–318 | 292 | 1,050 | 1,219 | 0–1,218 |
| 2 | 1,000 | 1,000–1,999 | 390 | 27–383 | 357 | 859 | 1,490 | 1,219–2,708 |
| 3 | 1,000 | 2,000–2,999 | 351 | 29–344 | 316 | 970 | 1,319 | 2,709–4,027 |
| 4 | 1,000 | 3,000–3,999 | 421 | 29–414 | 386 | 795 | 1,610 | 4,028–5,637 |
| 5 | 1,000 | 4,000–4,999 | 378 | 30–371 | 342 | 897 | 1,426 | 5,638–7,063 |
| 6 | 1,000 | 5,000–5,999 | 454 | 30–447 | 418 | 734 | 1,743 | 7,064–8,806 |
| 7 | 1,000 | 6,000–6,999 | 404 | 32–397 | 366 | 838 | 1,527 | 8,807–10,333 |
| 8 | 1,000 | 7,000–7,999 | 485 | 32–478 | 447 | 686 | 1,865 | 10,334–12,198 |
| 9 | 1,000 | 8,000–8,999 | 431 | 34–424 | 391 | 784 | 1,632 | 12,199–13,830 |
| 10 | 1,000 | 9,000–9,999 | 517 | 34–510 | 477 | 643 | 1,990 | 13,831–15,820 |
| 11 | 1,000 | 10,000–10,999 | 457 | 36–450 | 415 | 739 | 1,732 | 15,821–17,552 |
| 12 | 1,000 | 11,000–11,999 | 548 | 36–541 | 506 | 606 | 2,112 | 17,553–19,664 |
| 13 | 1,000 | 12,000–12,999 | 484 | 38–477 | 440 | 697 | 1,836 | 19,665–21,500 |
| 14 | 1,000 | 13,000–13,999 | 581 | 38–574 | 537 | 571 | 2,241 | 21,501–23,741 |
| 15 | 1,000 | 14,000–14,999 | 510 | 40–503 | 464 | 661 | 1,936 | 23,742–25,677 |
| 16 | 1,000 | 15,000–15,999 | 612 | 40–605 | 566 | 542 | 2,361 | 25,678–28,038 |
| 17 | 1,000 | 16,000–16,999 | 537 | 42–530 | 489 | 627 | 2,041 | 28,039–30,079 |
| 18 | 1,000 | 17,000–17,999 | 644 | 42–637 | 596 | 515 | 2,485 | 30,080–32,564 |

This makes it possible to record data at a high density which is practically a top limit all the way from the inner round toward the outer round. Because of this, the closer the zone is to the outer round, the smaller the number of segments contained in one sector (This is a recording area which is necessary to record data representing one ECC block. In the embodiment 6, one sector=306,500 bits.) becomes.

Although a conventional magneto-optical disk of the land/groove type attains a higher recording density than a magneto-optical disk or the like in which recording tracks are formed only in ditch portions, it is however definitely required to set recording densities in the respective segments in ditch portions and inter-ditch portions to a top limit recording density which is realized in the ditch portions which have a low S/N.

Since the magneto-optical disk according to this embodiment allows to set a sector structure which is not bound by a physical structure (such as the lengths of the segments) of the magneto-optical disk, the recording tracks in the land portions (the second recording track 2204) and the recording tracks in the groove portions (the first recording track 2203) may have different recording densities from each other. Hence, the magneto-optical disk according to the embodiment 6 makes it possible to record data at the top limit recording density of the ditch portions in the segments belonging to the ditch portions 2211 and at the top limit recording density of the inter-ditch portions in the segments belonging to the inter-ditch portions 2214.

The magneto-optical disk and the disk drive for the same according to the embodiment 6 make it possible to execute tracking control, generation of address information, recording or reproduction of data and the like, similarly to the magneto-optical disk and the disk drive for the same-according to the embodiment 1.

Thus, even when the optical disk does not have a physical zone structure, by means of the imaginary zone structure, a recording density of the optical disk can be enhanced in a similar manner to the conventional techniques such as ZCAV and ZCLV. Further, since there is no physical zone structure (There is no such zone structure which can not be changed.), it is possible to provide an optical disk which is easily accessed and flexible against a future improvement in density. In addition, as compared with a conventional optical disk in which the address redundancy increases when a super resolution reproduction method is used (The proportion of address areas to the surface area size of the recording medium increases.), the redundancy of the address portions is reduced lower since the number of the addresses is not the same as the number of the sectors like in the embodiment 1.

The sector allocation information (management data) shown in Table 6 is recorded in a predetermined recording area on the inner-most periphery of the optical disk according to the embodiment 6. While the type of management data stored in the predetermined recording area for the purpose of specifying a position of each sector may be any desired type, considering the ease of calculations, it is desirable to store the sector numbers at the starting points of the respective zones. As the management data are rewritten, the allocation of the sectors in the magneto-optical disk is changed.

The magneto-optical disk according to the embodiment 6 of the DWDD type is suitable as an application of the present invention since an improved capability of a recording medium and application of the present invention realize an improvement in recording density of a recording medium of an existing format without changing the value λ/(2·NA). However, even an application of the present invention to a conventional recording medium (such as an optical disk whose recording limit is a mark length (a length of one piece of data on a recording medium) of λ/(2·NA) for example) achieves an effect such as a reduction in seek time and a high recording density. When the first recording tracks formed in the ditch portions and the second recording tracks formed in the inter-ditch portions, for example, are provided as separate recording tracks and separate zones are formed in the separate recording tracks in a conventional recording medium, it is possible to record data at the top limit recording density of the ditch portions in the segments belonging to the ditch portions and at the top limit recording density of the inter-ditch portions in the segments belonging to the inter-ditch portions 2214.

Hence, applications of the present invention are not limited to an optical disk which uses a super resolution reproduction method.

<<Embodiment 7>>

FIG. 21 shows an optical disk according to the embodiment 7 of the present invention. Pre-pit areas of the optical disk according to the embodiment 7 have a different shape from that used in the optical disk according to the embodiment 1. The shape of the pre-pit areas in the optical disk according to the embodiment 1 is a shape which radially expands from the center of the optical disk toward the outer round. Hence, the lengths of the pre-pit areas (A "length" as it is herein referred to is a length which is measured along the longitudinal direction of a recording track.) is as short as possible at the inner round but is longer than necessary at the outer round.

In contrast, in the optical disk according to the embodiment 7, the pre-pit areas extend almost in a rectangular shape from the center of the optical disk toward the outer round. The lengths of the pre-pit areas are the same both at the inner round and the outer round. Either front edges or rear edges of the pre-pit areas are preferably aligned in the radius direction of the optical disk. Except for the different shape of the pre-pit areas and sector allocation based on this difference, the optical disk according to the embodiment 7 is the same as the optical disk according to the embodiment 1. Hence, the differences of the embodiment 7 from the embodiment 1 will be mainly described.

Part (a) of FIG. 21 shows a general overall structure of the magneto-optical disk according to the embodiment 7. In part (a) of FIG. 21, denoted at 1201 is an optical disk substrate, denoted at 2102 is a recording film (the reproduction layer 13, the intermediate layer 14 and the recording layer 15 in FIG. 7), denoted at 2103 is a first recording track, denoted at 2104 is a second recording track which is next to the first recording track, denoted at 2105 are segments obtained by dividing the first recording track 2103 and the second recording track 2104 into 1280 pieces, denoted at 2106 and 2113 are pre-pit areas (pre-formatted-areas) which contain servo pits for tracking and address pits which express position information on the disk. As shown in the drawing, the first recording track 2103 and the second recording track 2104 are spiral areas which start and end at the pre-pit areas 2113: When the spiral recording tracks are traced from an inner round toward an outer round of the magneto-optical disk, the second recording track 2104 ends at the pre-pit areas 2113, and the first recording track 2103 starts where the second recording track 2104 ends (the pre-pit areas 2113).

In part (a) of FIG. 21, while the magneto-optical disk is a disk whose diameter is about 50 mm, a track pitch of the first recording track 2103 and the second recording track 2104 is about 0.6 μm. In part (a) of FIG. 21 which aims at describing a format structure of the magneto-optical disk, as compared to the size of the magneto-optical disk as a whole, the first recording track 2103 and the second recording track 2104 which are next to each other are shown as they are extremely enlarged.

Part (b) of FIG. 21 is a schematic enlarged view of the pre-pit area 2106 and the like (an enlarged view of a plan view of the magneto-optical disk). In part (b) of FIG. 21, denoted at 2105 is a segment (which is comprised of one recording track and one pre-pit area), and denoted at 2106 is a pre-pit area (pre-formatted area). In ditch portions 2111 having a length 2107, there are the recording tracks (data recording areas) for recording of data. The pre-pit area 2106 comprises wobble pits 2108 and 2109 for detecting a tracking signal and address pits 2110 in which address information expressing position information on the magneto-optical disk is distributed one bit each at the beginning of a segment.

In the magneto-optical disk according to the embodiment 7, the recording tracks are disposed in the ditch portions as described above, and the two adjacent ditch portions 2111 are magnetically blocked from each other. Thus, the magneto-optical disk according to the embodiment 7 is suitable to reproduction of the DWDD type.

The magneto-optical recording medium according to the present invention is a magneto-optical recording medium which is for recording and reproduction of a signal of the DWDD type at a track pitch of 1 μm or smaller (0.6 μm in the embodiment 7), and in which the wobble pits 2108 and 2109 for tracking servo of the sample servo method are shared by the adjacent tracks. A method of fabricating the magneto-optical disk and operation principles according to the embodiment 7 are the same as those according to the embodiment 1, and therefore, will not be described.

The magneto-optical disk according to the present intention fabricated in this manner comprises the first recording track 2103 and the second recording track 2104 formed in a spiral shape and the like, and the recording tracks 2103 and 2104 and the like are divided each into 1280 pieces of the segments 2105 by the pre-pit areas 2106 which are disposed radially (along the radius direction of the magneto-optical disk). The pre-pit areas of the respective segments are arranged each in an approximately rectangular shape along the radius direction of the magneto-optical disk. Hence, when expressed in angular coordinates whose origin is the center of the magneto-optical disk, the lengths of the pre-pit areas are constant, regardless of distances of positions of the recording tracks from the origin. One segment 2105 comprises one pre-pit area 2106 and one data recording area (the inter-ditch portion 2114).

The optical disk according to the embodiment 1 has the sector allocation shown in Table 1. Since the optical disk according to the embodiment 1 comprises the pre-pit areas which radially expand, the closer to the outer round, the longer the lengths of the pre-pit areas become. Hence, with a distance toward the outer round, the larger bit numbers the recordable bits at the top in Table 1 have. To be more specific, while recordable bits among the 325 bits in total bear the bit numbers of 27 through 318 and areas covering 26+7=33 bits are assigned to the pre-pit areas in the first zone, in the ninth zone, recordable bits among the 537 bits in total bear the bit numbers of 42 through 530 and areas covering 41+7=48 bits are assigned to the pre-pit areas. In the optical disk according to the embodiment 1, since the pre-pit areas are arranged radially from the center of the optical disk and the lengths of the pre-pit areas become longer with a distance toward the outer round, the redundancy deteriorates.

On the contrary, in the optical disk according to the embodiment 7, since the pre-pit areas having the same length are arranged along the radius direction all the way from the inner round toward the outer round, the bit numbers of recordable bits at the top do not change from the inner round toward the outer round as shown in Table 7. Table 7 is a table of sector allocation in the optical disk according to the embodiment 7. Table 7 will now be compared with the table of sector allocation shown in Table 1. Except for that the range of the recordable bit numbers is changed based on the change of the shape of the pre-pit areas from a radial shape to an approximately rectangular shape (which ensures that the lengths of the pre-pit areas are the same from the inner round toward the outer round), Table 7 is the same as Table 1 with respect to the conditions such as the number of tracks assigned to each zone, the number of bits per segment (frequency divide ratio) and the volume of data in one sector.

TABLE 7

| ZONE NUMBER | THE NUMBER OF TRACKS | TRACK NUMBER (DECIMAL SYSTEM) | THE NUMBER OF BITS PER SEGMENT (FREQUENCY DIVIDING RATIO) | RECORD-ABLE BIT NUMBER | THE NUMBER OF RECORDABLE BITS | THE NUMBER OF BITS PER SECTOR | THE NUMBER OF SECTORS | SECTOR NUMBER (DECIMAL SYSTEM) |
|---|---|---|---|---|---|---|---|---|
| 1 | 2,000 | 0–1,999 | 325 | 27–318 | 292 | 1,050 | 2,438 | 0–2,437 |
| 2 | 2,000 | 2,000–3,999 | 351 | 27–344 | 318 | 964 | 2,655 | 2,438–5,092 |
| 3 | 2,000 | 4,000–5,999 | 378 | 27–371 | 345 | 889 | 2,879 | 5,093–7,971 |
| 4 | 2,000 | 6,000–7,999 | 404 | 27–397 | 371 | 827 | 3,095 | 7,972–11,066 |
| 5 | 2,000 | 8,000–9,999 | 431 | 27–424 | 398 | 771 | 3,320 | 11,067–14,386 |
| 6 | 2,000 | 10,000–11,999 | 457 | 27–450 | 424 | 723 | 3,540 | 14,387–17,926 |
| 7 | 2,000 | 12,000–13,999 | 484 | 27–477 | 451 | 680 | 3,764 | 17,927–21,690 |
| 8 | 2,000 | 14,000–15,999 | 510 | 27–503 | 477 | 643 | 3,981 | 21,691–25,671 |
| 9 | 2,000 | 16,000–17,999 | 537 | 27–530 | 504 | 609 | 4,203 | 25,672–29,874 |

While it is possible to record data covering 29339 sectors in total in the optical disk, according to Table 7, it is possible to record data covering 29875 sectors in total in one optical disk. In short, it is possible to record 29875/29339=101.8% of data in the optical disk according to the embodiment 7 in which the shape of the pre-pit areas is approximately rectangular, as compared to a conventional optical disk which comprises pre-pit areas which have a radial shape. In this manner, the optical disk according to the embodiment 7 has a recording capacity which is 1.8% larger than that of the optical disk according to the embodiment 1.

The present invention achieves an advantageous effect that it is possible to realize a recording medium having a short search time and a high recording density owing to a flexible relationship between sectors and segments.

A substantial effect is achieved particularly in a recording medium on which segments are preformatted (That is, a user can not change partitioning of segments.).

The present invention achieves an advantageous effect that in a recording medium which is formed such that a user will not be able to change (an optical disk in which partitioning of segments is established by pie-pit areas for instance), it is possible to realize a recording medium having a high recording density based on an improvement in capability of a recording film.

According to the present invention, an advantageous effect is achieved that it is possible to realize a recording medium having an even higher data capacity while complying with an existing format and accordingly maintaining a compatibility in the market.

The recording medium according to the present invention comprises position information regarding each sector in particular areas (which is preferably particular areas in an inner peripheral portion and an outer peripheral portion) on the disk medium.

According to the present invention, an advantageous effect is achieved that when a capability of a recording film of a recording medium is improved, it is possible to easily realize a recording medium having an even higher recording density by rewriting this information.

According to the present invention, an advantageous effect is achieved that since this information is recorded in the recording medium itself, even if a data recording apparatus which recorded data in the recording medium is a separate apparatus from a data reproducing apparatus which reproduces data from the recording medium, it is possible to correctly reproduce data with the data reproducing apparatus based on data which express a relationship between sectors and segments recorded in the recording medium.

According to the present invention, an advantageous effect is achieved that it is possible to realize a recording medium in which even when a defective segment or a defective bit is generated, a deterioration in recording capacity is minimized.

According to the present invention, an advantageous effect is achieved that it is possible to realize a disk drive which is capable of specifying a position of a sector on the disk medium according to the present invention, and recording data in or reproducing data from the specified sector.

According to the present invention, an advantageous effect is achieved that it is possible to provide a disk drive having a simple structure which is suitable to the recording medium according to the present invention.

According to the present invention, an advantageous effect is achieved that it is possible to realize a disk drive which is capable of recovering a function of a sector without creating a waste even despite a defective segment, etc.

According to the present invention, an advantageous effect is achieved that it is possible to realize a method of recording in or reproducing from a disk medium with which it is possible to specify a position of a sector on the disk medium according to the present invention and to record data in or reproduce data from the specified sector.

According to the present invention, an advantageous effect is achieved that it is possible to realize a method of recording in or reproducing from a disk medium with which it is possible to recover a function of a sector without creating a waste even despite a defective segment, etc.

While the foregoing has described preferred embodiments of the present invention in detail to a certain extent, the disclosure regarding the details on the structures according to the preferred embodiments could be modified, and it is possible to change a combination and order of the respective elements without deviating from the scope of the claimed invention and the idea of the invention.

INDUSTRIAL APPLICABILITY

The present invention is useful as a recording medium for recording various types of information, a control apparatus (a recording apparatus or reproducing apparatus) for the same, and a control method (a recording method or reproduction method) for the same.

The invention claimed is:

1. A disk-shaped recording medium, comprising a plurality of zones and one or more tracks, in which said tracks are radially divided into a plurality of segments at a constant angle and said segments contain a pre-pit area and a data recording area, wherein addresses which are indicative of positions on said recording medium are distributed in said pre-pit area over continuous n pieces of segments among said segments, data in a sector serving as a data rewrite unit or a data read unit are recorded as they are distributed in said data recording area over continuous m pieces of segments among said segments, and said sector is constituted always by the same number of continuous segments within one zone among said zones, and at least one value of m is a different figure from n times k (where k is any desired integer which is equal to or larger than 1).

2. The recording medium of claim 1, comprising a plurality of sectors including a first sector and a second sector, wherein the number of segments contained in said first sector is smaller than the number of segments contained in said second sector, and the volume of information recorded in said segments of said first sector is larger than the volume of information recorded in said segments of said second sector.

3. The recording medium of claim 1, having a disk-like shape and comprising a plurality of sectors, wherein the number of segments contained in one sector located in an outer round portion is smaller than the number of segments contained in one sector located in an inner round portion, and the volume of information recorded in one segment located in said outer round portion is larger than the volume of information recorded in one segment located in said inner round portion.

4. The recording medium of claim 1, comprising a plurality of zones including a first zone and a second zone, wherein the number of segments contained in one sector within said first zone is smaller than the number of segments contained in one sector within said second zone, and the volume of information recorded in said segments of said first zone is larger than the volume of information recorded in said segments of said second zone.

5. The recording medium of claim 1, comprising a plurality of zones, wherein the volume of information recorded in one segment is different between at least two zones.

6. The recording medium of claim 1, comprising a plurality of zones, wherein the number of segments contained in one sector of each zone is different between at least two zones.

7. The recording medium of claim 1, comprising information which specifies positions of said sectors on said recording medium.

8. The recording medium of claim 7, wherein said information is information based on which it is possible to derive the positions of said sectors by a calculation formula.

9. The recording medium of claim 7, wherein said information is information specifies starting points of said sectors from said addresses and the number of said segments.

10. The recording medium of claim 7, comprising sector information which contains a relationship between said addresses and said sectors, wherein said sector information comprises at least one piece of data among a sector number or segment number of a starting point of each zone and the number of said segments per sector within each zone, and a calculation formula for deriving starting positions of sectors using such data.

11. The recording medium of cliam 7, further comprising information regarding a data bit count per segment or a frequency divide ratio of an oscillator.

12. The recording medium of 10, comprising position information regarding a defective segment.

13. The recording medium of claim 1, wherein one sector comprises a spare segment.

14. The recording medium of claim 1, wherein said segments as a whole assigned to one sector have a larger information recording capacity than the volume in information of this sector.

15. The recording medium of claim 1, wherein the number of segments contained in said sector which includes a defective segment is larger than the number of segments contained in said sector which does not include a defective segment.

16. A control apparatus for a disk-shaped recording medium which comprises a plurality of zones and one or more tracks, in which said tracks are radially divided into a plurality of segments at a constant angle and said segments contain a pre-pit area and a data recording area, and in which addresses indicative of positions on said recording medium are distributed in said pre-pit area over continuous n pieces of segments among said segments, wherein said control apparatus comprises a control part which makes a head part move to said segment which is a starting position of a sector, said sector is constituted always by the same number of continuous segments within one zone among said zones, data of a sector are recorded from said starting position as they are distributed in said data recording area over continuous m pieces of segments among said segments, or data recorded as they are distributed in said data recording area over continuous m pieces of segments among said segments are read out as one sector, and at least one value of m is a different figure from n times k (where k is any desired integer which is equal to or larger than 1).

17. The control apparatus for recording medium of claim 16, wherein said recording medium comprises tracks which are arranged in a spiral arrangement or a concentric arrangement, and said control part counts the number of said segments or the number of output signals from a counter which is in synchronization to said segments along the circumferential direction from said address on said recording medium, and makes said head part move to a starting position of a sector.

18. The control apparatus for recording medium of claim 16, further comprising a signal reproducing part which reads, from said recording medium, addresses which are indicative of positions on said recording medium and sector information which expresses a relationship between said addresses and said sectors which are used as data rewrite units or data read units, wherein said sector information comprises at least one piece of data among a sector number or segment number of a starting point of each zone and the number of said segments per sector within each zone, and said control part comprises a calculating unit which derives a starting position of a sector using such data, and makes said head part move to said segment which is a starting position of a sector.

19. The control apparatus for recording medium of claim 16, comprising: an oscillator; a phase lock part which has a frequency divider, which frequency-divides an output signal from said oscillator at a frequency divide ratio which is derived based on information regarding a data bit count per segment or a frequency divide ratio of said oscillator read out from said recording medium, and which synchronizes said output signal from said oscillator to said segments; and a signal processing part which records data in said recording medium or reproduces data from said recording medium by using a clock signal which is based on said output signal from said oscillator.

20. A recording apparatus for recording medium of the control apparatus for recording medium of claim 16, comprising:

a defect position specifying part which specifies a defective segment based on information reproduced from said recording medium; and a sector allocating part which, when said defect position specifying part determines that one sector contains a defective segment, additionally allocates the same number of segments as defective segments or a larger number of segments than defective segments to said sector which contains said defective segment.

21. A recording apparatus for recording medium of the control apparatus for recording medium of claim 16, comprising:

a detector part which detects a defective segment; and a re-arranging part which re-arranges said sectors on said recording medium when said detector part detects a defective segment.

22. The control apparatus of claim 16 for a recording medium, wherein said addresses contain segment management numbers which express position information along the disk rotation direction and track numbers which express position information along the disk diameter direction, and said control part comprises a counter which is in synchronization to positions of said segments which are generated from said segment management numbers, and controls, based on a value of said counter, a starting position and an end position of recording or reproduction of said sector which is a collection of said plurality of segments and constitute rewrite units.

23. A control method for a disk-shaped recording medium which comprises a plurality of zones and one or more tracks, in which said tracks are radially divided into a plurality of segments at a constant angle and said segments contain a pre-pit area and a data recording area, and in which addresses indicative of positions on said recording medium are distributed in said pre-pit area over continuous n pieces of segments among said segments, wherein said control method comprises a controlling step of making a head part move to said segment which is a starting position of a sector, a sector is constituted always by the same number of continuous segments within one zone among said zones, data of a sector are recorded from said starting position as they are distributed in said data recording area over continuous m pieces of segments among said segments, or data recorded as they are distributed in said data recording area over continuous m pieces of segments among said segments are read out as one sector, and at least one value of m is a different figure from n times k (where k is any desired integer which is equal to or larger than 1).

24. The control method for recording medium of claim 23, wherein said recording medium comprises tracks which are arranged in a spiral arrangement or a concentric arrangement, and at said controlling step, the number of said segments or the number of output signals from a counter which is in synchronization to said segments are counted along the circumferential direction from said address on said recording medium, and said head part is made move to a starting position of a sector.

25. The control method for recording medium of claim 23, further comprising a signal reproducing step of reading, from said recording medium, addresses which are indicative of positions on said recording medium and sector information which expresses a relationship between said addresses and said sectors which are used as data rewrite units or data read units, wherein said sector information comprises at least one piece of data among a sector number or segment number of a starting point of each zone, and the number of segments per sector within each zone, and at said controlling step, a starting position of a sector is derived using said sector information and a calculation formula, and a head part is made move to said segment which is a starting position of a sector.

26. The control method for recording medium of claim 23, comprising:

a third signal reproducing step of reading, from said recording medium, information regarding a data bit count per segment or a frequency divide ratio of an oscillator;

a phase locking step of frequency-dividing an output signal from an oscillator and synchronizing thus frequency-divided signal to said segments at a frequency divide ratio which is derived based on said information read out at said third signal reproducing step; and a signal processing step of recording data in said recording medium or reproducing data from said recording medium by using a clock signal which is based on said output signal from said oscillator.

27. The recording method for recording medium of the control method for recording medium of claim 23, comprising:

a defective segment specifying step of specifying a defective segment based on information reproduced from said recording medium; and a sector allocating step of additionally allocating, when it is determined that one sector contains a defective segment at said defective segment specifying step, the same number of segments as defective segments or a larger number of segments than defective segments to said sector which contains said defective segment.

28. The recording method for recording medium of the control method for recording medium of claim 23, comprising:

a detecting step of detecting a defective segment; and a re-arranging step of re-arranging said sectors on said recording medium when a defective segment is detected at said detecting step.

* * * * *

UNITED STATES PATENT AND TRADEMARK OFFICE

CERTIFICATE OF CORRECTION

PATENT NO. : 7,224,650 B2
APPLICATION NO. : 10/415755
DATED : May 29, 2007
INVENTOR(S) : Yasumori Hino et al.

It is certified that error appears in the above-identified patent and that said Letters Patent is hereby corrected as shown below:

Title page, section (54):

The title should read:
-- RECORDING MEDIUM AND CONTROL APPARATUS AND CONTROL METHOD FOR THE SAME --;

Title page

The following "Foreign Application Priority Data" should be added: -- Nov. 7 2002 (JP) 2000-339516 --;

Column 74

Line 66, "said segments contain" should read -- each of the segments contains --;

Column 75

Line 63, "cliam" should read -- claim --;
Line 66, -- claim -- should be added before "10";

Column 76

Lines 15-16, "said segments contain" should read: -- each of the segments contains --;

Column 77

Lines 5 and 17, "A recording apparatus for recording medium of" should be deleted from the beginning of claims 20 and 21;
Line 39, "said segments contain" should read -- each of the segments contains --;

UNITED STATES PATENT AND TRADEMARK OFFICE

CERTIFICATE OF CORRECTION

PATENT NO. : 7,224,650 B2
APPLICATION NO. : 10/415755
DATED : May 29, 2007
INVENTOR(S) : Yasumori Hino et al.

It is certified that error appears in the above-identified patent and that said Letters Patent is hereby corrected as shown below:

Column 78

Lines 41 and 52, "The recording method for recording medium of" should be deleted from the beginning of claims 27 and 28.

Signed and Sealed this

Fourth Day of March, 2008

JON W. DUDAS
*Director of the United States Patent and Trademark Office*

UNITED STATES PATENT AND TRADEMARK OFFICE

CERTIFICATE OF CORRECTION

PATENT NO. : 7,224,650 B2 
APPLICATION NO. : 10/415755
DATED : May 29, 2007
INVENTOR(S) : Yasumori Hino et al.

It is certified that error appears in the above-identified patent and that said Letters Patent is hereby corrected as shown below:

Title page, section (54) and Column 1, lines 1 and 2:

The title should read:
-- RECORDING MEDIUM AND CONTROL APPARATUS AND CONTROL METHOD FOR THE SAME --;

Title page

The following "Foreign Application Priority Data" should be added: -- Nov. 7 2002 (JP) 2000-339516 --;

Column 74

Line 66, "said segments contain" should read -- each of the segments contains --;

Column 75

Line 63, "cliam" should read -- claim --;
Line 66, -- claim -- should be added before "10";

Column 76

Lines 15-16, "said segments contain" should read: -- each of the segments contains --;

Column 77

Lines 5 and 17, "A recording apparatus for recording medium of" should be deleted from the beginning of claims 20 and 21;
Line 39, "said segments contain" should read -- each of the segments contains --;

UNITED STATES PATENT AND TRADEMARK OFFICE

CERTIFICATE OF CORRECTION

PATENT NO. : 7,224,650 B2
APPLICATION NO. : 10/415755
DATED : May 29, 2007
INVENTOR(S) : Yasumori Hino et al.

It is certified that error appears in the above-identified patent and that said Letters Patent is hereby corrected as shown below:

Column 78

Lines 41 and 52, "The recording method for recording medium of" should be deleted from the beginning of claims 27 and 28.

This certificate supersedes the Certificate of Correction issued March 4, 2008.

Signed and Sealed this

First Day of April, 2008

JON W. DUDAS
*Director of the United States Patent and Trademark Office*